(12) United States Patent
Inagaki et al.

(10) Patent No.: US 9,316,773 B2
(45) Date of Patent: Apr. 19, 2016

(54) METHOD, APPARATUS, AND SYSTEM FOR PRODUCTION OF A STRETCHED FILM

(75) Inventors: Shinji Inagaki, Tokyo (JP); Daisuke Hojo, Tokyo (JP); Shimpei Hatakeyama, Tokyo (JP); Daisuke Ueno, Tokyo (JP); Hiroshi Nanbu, Tokyo (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 14/385,207

(22) PCT Filed: Mar. 19, 2012

(86) PCT No.: PCT/JP2012/057031
§ 371 (c)(1),
(2), (4) Date: Sep. 15, 2014

(87) PCT Pub. No.: WO2013/140501
PCT Pub. Date: Sep. 26, 2013

(65) Prior Publication Data
US 2015/0048548 A1 Feb. 19, 2015

(51) Int. Cl.
*B29C 55/00* (2006.01)
*G02B 5/30* (2006.01)
*B29C 55/12* (2006.01)
*B29D 7/01* (2006.01)
(Continued)

(52) U.S. Cl.
CPC .............. *G02B 5/3083* (2013.01); *B29C 55/00* (2013.01); *B29C 55/045* (2013.01); *B29C 55/12* (2013.01); *B29D 7/01* (2013.01); *B29K 2001/08* (2013.01); *B29K 2023/38* (2013.01); *B29L 2007/008* (2013.01)

(58) Field of Classification Search
CPC ...... B29C 55/00; B29C 55/04; B29C 55/045; B29C 55/12; B29C 55/14; B29C 55/143; B29C 71/02; B29C 2071/022; G02B 5/3033; G02B 5/3083; B29L 2007/008; B29D 7/01; B29K 2001/08
See application file for complete search history.

(56) References Cited

U.S. PATENT DOCUMENTS 4,104,769 A * 8/1978 Levy ....................... B29C 55/02
26/72
5,076,977 A * 12/1991 Maier ..................... G03C 1/81
264/210.5
(Continued)

FOREIGN PATENT DOCUMENTS

JP 2004-230714 A 8/2004
JP 2004-284127 A 10/2004
(Continued)

*Primary Examiner* — James Sanders
(74) *Attorney, Agent, or Firm* — Lucas & Mercanti, LLP

(57) ABSTRACT

In a stretching zone (Z2) included in a plurality of zones for performing temperature control for heating or cooling of a film, the plurality of zones being arranged in the conveyance direction of the film, the film is stretched in a direction tilted in relation to the width direction of the film. The film is heated by a heating unit (11) having a heating region (H) positioned facing the conveyed film and positioned along a direction intersecting at an intersection angle φ with the conveyance direction in the plane of the film, in at least one zone including the stretching zone (Z2) and positioned further downstream in the conveyance direction from the stretching zone (Z2). At this time the intersection angle φ of the heating region (H) is adjusted in accordance with the orientation direction of the film stretched in the stretching zone (Z2).

13 Claims, 24 Drawing Sheets

(51) Int. Cl.
*B29C 55/04* (2006.01)
*B29L 7/00* (2006.01)
*B29K 1/00* (2006.01)
*B29K 23/00* (2006.01)

(56) References Cited

U.S. PATENT DOCUMENTS 5,575,968 A * 11/1996 Seo et al. ............... 264/481

6,372,174 B1 * 4/2002 Breil .................. G01J 5/0022
                                                           219/388
2010/0002170 A1 * 1/2010 Itadani ................. B29C 55/045
                                                            349/96
2010/0255220 A1 * 10/2010 Asada ................. B29C 55/045
                                                            428/1.3

FOREIGN PATENT DOCUMENTS

JP    2007-175974 A    7/2007
JP    4779646 B2       7/2011

* cited by examiner

METHOD, APPARATUS, AND SYSTEM FOR PRODUCTION OF A STRETCHED FILM

CROSS REFERENCE TO RELATED APPLICATION

This Application is a 371 of PCT/JP2012/057031 filed on Mar. 19, 2012, which is incorporated herein by reference.

TECHNICAL FIELD

The present invention relates to a method for production of a stretched film involving stretching a film in a direction oblique to the width direction in a stretching zone, an apparatus for production of a stretched film through such stretching of a film in an oblique direction, and a system for production of a stretched film provided with such a production apparatus.

BACKGROUND ART

Stretched films produced by stretching resin are, for their optical anisotropy, used as optical films that perform various optical functions in a variety of display devices. For example, in liquid crystal display devices, a stretched film can be used as an optical compensation film for optical compensation such as coloring prevention, viewing angle enhancement, etc., or a stretched film can be bonded to a polarizer so that the stretched film is used as a phase-difference film that serves also as a polarizer protection film, to mention a few known designs.

On the other hand, in recent years, as new types of display devices, self-luminous display devices such as organic EL (electroluminescence) image display devices have been attracting much attention. Self-luminous display devices have more margin for suppression of electric power consumption than liquid crystal display devices, which require backlight to be constantly on. Moreover, with self-luminous display devices such as organic EL image display devices where light sources corresponding to different colors are lit respectively, there is no need to provide color filters, which may lead to lower contrast, and thus it is possible to obtain higher contrast.

However, in an organic EL image display device, to enhance light extraction efficiency, a reflector such as a plate of aluminum is provided on the rear side of the display. Thus, when external light that has entered the display is reflected on the reflector, the image may disadvantageously have lower contrast.

To prevent reflection of external light and thereby to enhance bright/dim contrast, a stretched film is bonded to a polarizer to form a circular polarizing plate, and this circular polarizing plate is used on the front side of the display, according to a known design. Here, the circular polarizing plate is formed by bonding together the polarizer and the stretched film such that the in-plane slow axis of the stretched film is inclined at a desired angle relative to the transmission axis of the polarizer.

However, a common polarizer (polarizing film) is obtained through high-factor stretching in the transport direction, and its transmission axis is aligned with the width direction. Moreover, a conventional phase-difference film is produced by longitudinal stretching or lateral stretching and, in principle, the in-plane slow axis points in a direction at 0° or 90° relative to the length direction of the film. Thus, to obtain a desired inclination angle between the transmission axis of the polarizer and the slow axis of the stretched film, there is no choice but to adopt a batch method involving cutting a long polarizing film and/or a stretched film into pieces at a particular angle and then bonding together such pieces one by one. This disadvantageously results in poor productivity and low product yields due to contamination with shavings.

As a solution, there have been proposed various methods for production of a long phase-difference film that permit a film to be stretched in a direction at a desired angle relative to (in a direction oblique to) the length direction and that thus permit the direction of the slow axis to be controlled to be an arbitrary direction neither at 0° or 90° relative to the length direction of the film. For example, according to the production method disclosed in Patent Document 1, a resin film is dispensed from a direction different from the winding direction of the film after stretching, and is transported with both end portions of the resin film held with a pair of holding members. The transport direction of the resin film is changed on the way and thereby the resin film is stretched in an oblique direction. In this way, a long stretched film is produced that has a slow axis at a desired angle more than 0° but less than 90° relative to the length direction.

By use of such a stretched film having a slow axis inclined relative to the length direction, it is possible to produce a circular polarizing plate by bonding together a long polarizing film and a stretched film on a roll to roll basis instead of bonding together by the conventional batch method. This dramatically enhances the productivity of the circular polarizing plate, and greatly improves its yield.

Incidentally, in a stretching apparatus for obliquely stretching a film (a stretched film production apparatus), the film is passed through, in the order named, a preheating zone, a stretching zone, and a heat-fixing zone where temperature control is performed individually, and the film is stretched in the stretching zone. Here, when the film transport speed is increased with a view to producing a stretched film at high speed (for example, when the film is transported at 30 m/min.), the air in an upstream-side zone is drawn into a downstream-side zone as the film is transported, causing unevenness in temperature inside those zones (in particular, in the vicinity of the film), and this unevenness in temperature causes variations in the optical values (orientation angle and in-plane retardation Ro) of the film. Thus, when the obliquely stretched film is applied to a circular polarizing plate for external light reflection prevention in an image display device with very high contrast, such as a large-screen organic EL television (OLED-TV), reflected external light leaks through the circular polarizing plate to different degrees from place to place over the display screen during display of black, that is, so-called unevenness in the amount of reflected light occurs.

In this connection, according to Patent Document 1, the angle between the width direction of a partition wall partitioning between zones neighboring in the film transport direction and the film transport direction is made variable, and in addition the interval of the gap in the partition wall (the gap through which the film passes) in the up/down direction of the film is made adjustable within a predetermined range. Thus, according to Patent Document 1, even when the film is obliquely stretched such that the orientation axis (slow axis) is inclined at a certain angle (for example, 15° or 45°) relative to the width direction, the orientation axis can be oriented with high accuracy. However, Patent Document 1 makes no mention of heating in the vicinity of the film. Thus, when the film transport speed is increased, unevenness in temperature in the vicinity of the film cannot be suppressed, and thus variations in optical values cannot be suppressed.

The example presented in Patent Document 1 assumes that the film transport speed equals 10 m/min., and also in this respect, the production method of Patent Document 1 is not considered to be ready for increased film transport speeds.

Thus, to suppress unevenness in the amount of reflected light during display of black on an organic EL television, it is necessary, during high-transport-speed production of a film for application to a circular polarizing plate in such an organic EL television, to suppress unevenness in temperature in the vicinity of the film and thereby suppress variations in optical values, for each film having a different orientation direction.

LIST OF CITATIONS

Patent Literature

Patent Document 1: JP-B-4779646 (see, among others, claim 1, paragraphs [0008], [0018], and [0057], and FIG. 6)

SUMMARY OF THE INVENTION

Technical Problem

Against the background discussed above, an object of the present invention is to provide a method and an apparatus for production of a stretched film that, even when it is produced by transporting a film at high speed, can suppress unevenness in temperature in the orientation direction in the vicinity of the film for each film having a different orientation direction and that can thereby realize satisfactory optical properties, and a system for production of a stretched film that is provided with such a production apparatus.

Means for Solving the Problem

The above object of the present invention is achieved with the following configurations.

1. A method for production of a stretched film, involving stretching a film in a direction oblique to a width direction in a stretching zone included in a plurality of zones arranged in a film transport direction where temperature control is performed to heat or cool the film, the method including:

a heating step of heating the film by a heating portion having a heating region, the heating region being located in at least one of the stretching zone and any zone located on a downstream side thereof with respect to a transport direction so as to face the film being transported and in addition to extend along a direction intersecting the transport direction at an intersection angle $\phi$ in a plane of the film; and an adjusting step of adjusting the intersection angle $\phi$ of the heating region according to an orientation direction of the film stretched in the stretching zone.

2. The method described at 1 above, wherein, in the adjusting step, the intersection angle $\phi$ of the heating region is adjusted such that the orientation direction of the stretched film is substantially parallel to the intersection direction of the heating region with respect to the film transport direction.

3. The method described at 1 or 2 above, wherein, in the adjusting step, the intersection angle $\phi$ of the heating region is adjusted in a fashion coordinated with movement, in accordance with the orientation direction of the stretched film, of a partition wall having a gap through which the film can pass and provided between the zone where the heating portion is arranged and a zone on an upstream side of said zone.

4. The method described at 3 above, wherein the partition wall moves substantially parallel to the orientation direction of the stretched film.

5. The method described at any one of 1 to 4 above, wherein, in the stretching zone, both end portions of the film in the width direction are held by respective holding members, the film is transported while the holding members are moved, and the film transport direction is changed meanwhile, so that the film is stretched in the direction oblique to the width direction.

6. The method described at 5 above, wherein, in the stretching zone, the film is obliquely stretched while the film is transported at a speed of 15 m/min. to 150 m/min.

7. An apparatus for production of a stretched film, including a plurality of zones arranged in a film transport direction where temperature control is performed to heat or cool the film, the apparatus stretching the film in a direction oblique to a width direction in a stretching zone included in the plurality of zones, the apparatus further including:

a heating portion for heating the film by a heating region located in at least one of the stretching zone and any zone located on a downstream side thereof with respect to a transport direction so as to face the film being transported and in addition to extend along a direction intersecting the transport direction at an intersection angle $\phi$ in a plane of the film; and an adjustment mechanism for adjusting the intersection angle $\phi$ of the heating region according to an orientation direction of the film stretched in the stretching zone.

8. The apparatus described at 7 above, wherein the adjustment mechanism adjusts the intersection angle $\phi$ of the heating region such that the orientation direction of the stretched film is substantially parallel to the intersection direction of the heating region with respect to the film transport direction.

9. The apparatus described at 7 or 8 above, wherein the adjustment mechanism adjusts the intersection angle $\phi$ of the heating region in a fashion coordinated with movement, in accordance with the orientation direction of the stretched film, of a partition wall having a gap through which the film can pass and provided between the zone where the heating portion is arranged and a zone on an upstream side of said zone.

10. The apparatus described at 9 above, wherein the partition wall moves substantially parallel to the orientation direction of the stretched film.

11. The apparatus described at 9 or 10 above, wherein the heating portion is located on a downstream side of, and immediately behind, the partition wall with respect to the film transport direction.

12. The apparatus described at any one of 7 to 11 above, wherein the heating region of the heating portion is formed by arranging at least one stick-form lamp heater such that a longitudinal direction thereof runs along a direction intersecting the film transport direction at an intersection angle $\phi$.

13. The apparatus described at any one of 7 to 11 above, wherein the heating region of the heating portion is formed by arranging a plurality of stick-form lamp heaters parallel to one another such that a longitudinal direction thereof runs along the film transport direction and in addition that a direction of a line through ends of at least two of the lamp heaters runs along a direction intersecting the film transport direction at an intersection angle $\phi$.

14. The apparatus described at any one of 7 to 11 above, wherein the heating region of the heating portion is formed by arranging a panel heater such that a side edge thereof runs along a direction intersecting the film transport direction at an intersection angle $\phi$.

15. The apparatus described at any one of 7 to 11 above, wherein the heating portion includes:

a punched plate nozzle in which a plurality of blowout holes are formed two-dimensionally to blow out hot air therethrough; and a wind shield plate having an opening extending in one direction, the wind shield plate being provided on a blowout-hole side of the punched plate nozzle so as to shield, in a region other than the opening, part of the hot air blown out through the plurality of blowout holes, and wherein the heating region is formed by arranging the wind shield plate such that the one direction in which the opening extends runs along a direction intersecting the film transport direction at an intersection angle ϕ.

16. The apparatus described at any one of 7 to 11 above, wherein the heating portion includes:

a slit nozzle in which a single blowout hole is formed to blow out hot air therethrough; and a wind shield plate having an opening extending in one direction, the wind shield plate being provided on a blowout-hole side of the slit nozzle so as to shield, in a region other than the opening, part of the hot air blown out through the blowout hole, and wherein the heating region is formed by arranging the wind shield plate such that the one direction in which the opening extends runs along a direction intersecting the film transport direction at an intersection angle ϕ.

17. The apparatus described at any one of 7 to 11 above, wherein the heating portion includes a slit nozzle having as the heating region a slit extending in one direction so as to heat the film by blowing out hot air through the slit, and wherein the slit nozzle is arranged such that the one direction in which the slit extends runs along a direction intersecting the film transport direction at an intersection angle ϕ.

18. The apparatus described at any one of 7 to 17 above, wherein, in the stretching zone, both end portions of the film in the width direction are held by respective holding members, the film is transported while the holding members are moved, and the film transport direction is changed meanwhile, so that the film is stretched in the direction oblique to the width direction.

19. A system for production of a stretched film, including:
an apparatus according to any one of 7 to 18 above; and
a film dispensing portion for dispensing a film to be stretched to the apparatus.

Advantageous Effects of the Invention

Owing to the heating portion being arranged so as to face the film being transported in, out of a plurality of zones where temperature control is performed, at least one of the stretching zone and any zone on the downstream side thereof, the film can be heated from its vicinity by the heating portion. Thus, even in a case where a stretched film is produced by transporting a film at high speed, it is possible to suppress unevenness in temperature in the vicinity of the film resulting from the air in an upstream-side zone being drawn into a downstream-side zone as the film is transported. Thus, it is possible to suppress variations in optical values (orientation angle and in-plane retardation Ro) of the film due to such unevenness in temperature.

In addition, the heating region of the heating portion is provided along a direction intersecting the film transport direction at the intersection angle ϕ, and by adjusting the intersection angle ϕ of the heating region according to the orientation angle of the stretched film, even in a case where each film has a different orientation direction, it is possible to adjust the intersection angle ϕ for each film, and to heat the film evenly in the orientation direction. Thus, it is possible, for each film having a different orientation direction, to obtain a film having satisfactory optical properties with suppressed variations in optical values.

DESCRIPTION OF EMBODIMENTS

Figure 1:
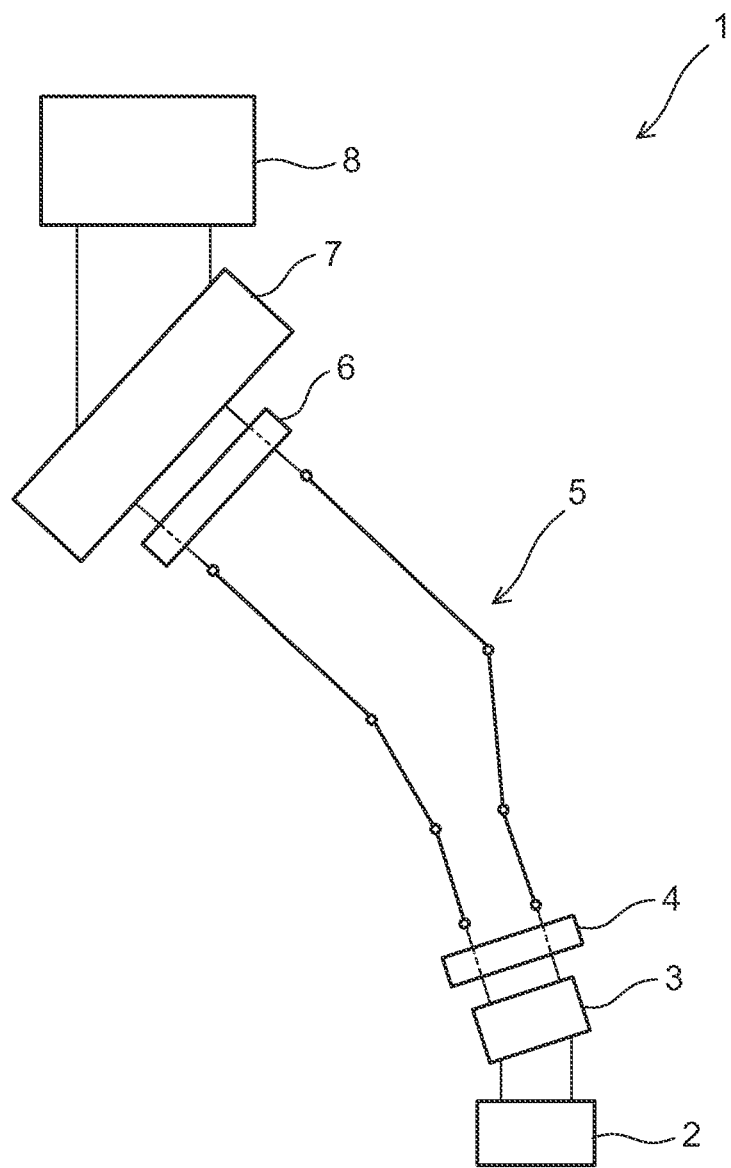
FIG. 1 is a plan view schematically showing an outline configuration of a long obliquely stretched film production system according to one embodiment of the present invention.

Hereinafter, an embodiment of the present invention will be described in detail. The present invention, however, is not limited by the embodiment in any way. In the following description, wherever no distinction is needed between a film before stretching and a film after stretching, these are collectively referred to as a "film"; wherever distinction is needed between the two, the former is referred to as a "long film" or a "film before stretching," and the latter is referred to as a "stretched film" or a "film after stretching."

A method of producing a stretched film (long stretched film) according to the embodiment is a method of, by stretching a long film obliquely, producing a stretched film having an in-plane slow axis at an arbitrary angle relative to the width direction of the film after stretching.

Here, a "long" film denotes a film that has a length at least five times its width or more, and preferably a length ten times its width or more, and can typically be one having such a length as to be stored or transported in a form wound in a roll (a film roll). With a method of producing a long film, it is possible, by continuously producing a film, to produce films in desired lengths. A method of producing a long stretched film can involve first forming a long film, then winding it around a core into a wound material (a full-width long film roll), and then feeding the long film from the wound material into an oblique stretching step to produce an obliquely stretched film, or can involve, without winding up the long film after film formation, feeding it from the film formation step continuously into the oblique stretching step to produce an obliquely stretched film. Continuously performing the film formation step and the oblique stretching step is preferable, because then it is possible to feed back the film thickness and optical values of the stretched film to change the film formation conditions so as to obtain a desired long stretched film.

By the method of producing a stretched film according to the embodiment, a long stretched film having a slow axis at an angle of more than 0° but less than 90° relative to the width direction of the film is produced. Here, an angle relative to the width direction of a film is an angle in the plane of the film. A slow axis normally occurs in the stretching direction or in a direction perpendicular to the stretching direction. Accordingly, with the method according to the embodiment, by performing stretching at an angle more than 0° but less than 90° relative to the width direction of the film, it is possible to produce a long stretched film having such a slow angle. The angle between the width direction of the long stretched film and the slow angle, that is, the orientation angle, can be set at a desired angle in the range of more than 0° but less than 90°.

Through intensive studies undertaken to achieve the above object, the inventors have found out that the object is achieved by heating the vicinity of a film evenly in the orientation angle in at least one of a stretching zone, where the film is obliquely stretched, and any zone on the downstream side thereof. Further studies based on the findings have led the inventors to the completion of the present invention.

Specifically, according to an embodiment of the present invention, a method for production of a stretched film, involving stretching a film in a direction oblique to a width direction in a stretching zone included in a plurality of zones arranged in a film (long film) transport direction where temperature control is performed to heat or cool the film, includes: a heating step of heating the film by a heating portion having a heating region, the heating region being located in at least one of the stretching zone and any zone located on a downstream side thereof with respect to a transport direction so as to face the film being transported and in addition to extend along a direction intersecting the transport direction at an intersection angle $\phi$ in a plane of the film; and an adjusting step of adjusting the intersection angle $\phi$ of the heating region according to an orientation direction of the film stretched in the stretching zone.

According to another embodiment of the present invention, an apparatus for production of a stretched film, including a plurality of zones arranged in a film (long film) transport direction where temperature control is performed to heat or cool the film, the apparatus stretching the film in a direction oblique to a width direction in a stretching zone included in the plurality of zones, further includes: a heating portion for heating the film by a heating region located in at least one of the stretching zone and any zone located on a downstream side thereof with respect to a transport direction so as to face the film being transported and in addition to extend along a direction intersecting the transport direction at an intersection angle $\phi$ in a plane of the film; and an adjustment mechanism for adjusting the intersection angle $\phi$ of the heating region according to an orientation direction of the film stretched in the stretching zone.

<Long Film>

First, a long film as a target of stretching according to the embodiment will be described.

There is no particular restriction on a long film as a target of stretching by an apparatus (described in detail later) for producing a stretched film according to the embodiment. Any film formed of thermoplastic resin will do. For example, in cases where the film after stretching is used for optical purposes, a film that is transparent at desired wavelengths is preferred. Examples of such resin include polycarbonate resin, polyether sulfone resin, polyethylene terephthalate resin, polyimide resin, polymethyl methacrylate resin, polysulfone resin, polyarylate resin, polyethylene resin, polyvinyl chloride resin, olefin polymer resin having an alicyclic structure (alicyclic olefin polymer resin), and cellulose ester resin.

Among these, preferred from the viewpoints of transparency and mechanical strength are polycarbonate resin, alicyclic olefin polymer resin, and cellulose ester resin. Among these, more preferred for easy phase difference adjustment when formed into an optical film are alicyclic olefin polymer resin and cellulose ester resin. Accordingly, compositions based on alicyclic olefin polymer resin and cellulose ester resin will be discussed below.

[Alicyclic Olefin Polymer Resin]

Examples of alicyclic olefin polymer resin include cyclic olefin random multicomponent copolymers disclosed in JP-A-H05-310845, hydrogenated polymers disclosed in JP-A-H05-97978, and thermoplastic dicyclopentadiene open-ring polymers and hydrogenated products thereof disclosed in JP-A-H11-124429.

Alicyclic olefin polymer resin will now be described more specifically. Alicyclic olefin polymer resin is a polymer having an alicyclic structure such as a saturated alicyclic hydrocarbon (cycloalkane) structure or an unsaturated alicyclic hydrocarbon (cycloalkene) structure. There is no particular restriction on the number of carbon atoms constituting the alicyclic structure; however, with the number of carbon atoms typically in the range of 4 to 30, preferably in the range of 5 to 20, and more preferably in the range of 5 to 15, an excellent balance of mechanical strength, heat resistance, and film formability is suitably obtained.

The proportion of the repeating units containing the alicyclic structure in alicyclic olefin polymer resin is arbitrary, preferably 55% by weight or more, more preferably 70% by weight or more, and particularly preferably 90% by weight or more. With the proportion of the repeating units in those ranges, an optical material, such as a phase-difference film, obtained from a long obliquely stretched film (hereinafter also referred to as a stretched film) according to the embodiment advantageously has enhanced transparency and heat resistance.

Examples of alicyclic olefin polymer resin include norbornene resin, monocyclic olefin resin, cyclic conjugated diene resin, vinyl alicyclic hydrocarbon resin, and hydrogenated products thereof. Among these, norbornene resin is suitably used for good transparency and formability.

Examples of norbornene resin include an open-ring polymer of a monomer having a norbornene structure, an open-ring copolymer of a monomer having a norbornene structure and another monomer, a hydrogenated product of those; and an addition polymer of a monomer having a norbornene structure, an addition copolymer of a monomer having a norbornene structure and another monomer, and a hydrogenated product of those or the like. Among these, an open-ring (co)polymer of a monomer having a norbornene structure is particularly suitably used from the viewpoints of transparency, formability, heat resistance, low hygroscopicity, dimensional stability, light weight, etc.

Examples of monomers having a norbornene structure include bicyclo[2.2.1]hept-2-ene (with the trivial name norbornene), tricyclo[4.3.0.1 2,5]deca-3,7-diene (with the trivial name dicyclopentadiene), 7,8-benzotricyclo[4.3.0.1 2,5]deca-3-ene (with the trivial name methanotetrahydrofluorene), tetracyclo[4.4.0.1 2,5.1 7,10]dodeca-3-ene (with the trivial name tetracyclododecene), and derivatives of these compounds (for example, those having a substituent group on the ring). Here, examples of the substituent group include alkyl groups, alkylene groups, and polar groups. Of these substituent groups, a plurality of the same species or different species can be bonded to the ring. A single species of monomer having a norbornene structure can be used alone, or two or more species of such monomers can be used in combination.

Examples of polar groups include heteroatoms and atomic groups including heteroatoms. Examples of heteroatoms include oxygen atom, nitrogen atom, sulfur atom, silicon atom, and halogen atoms. Specific examples of polar groups include carboxyl group, carbonyloxylcarbonyl group, epoxy group, hydroxyl group, oxy group, ester group, silanol group, silyl group, amino group, nitryl group, and sulfone group.

Example of other monomers usable in open-ring copolymerization with a monomer having a norbornene structure include monocyclic olefins, such as cyclohexene, cycloheptene, and cyclooctene, and derivatives thereof; and cyclic conjugated dienes, such as cyclohexadiene and cycloheptadiene, and derivatives thereof.

An open-ring polymer of a monomer having a norbornene structure, or an open-ring copolymer of a monomer having a norbornene structure with another monomer capable with copolymerization therewith, can be obtained through (co)polymerization of the monomers in the presence of a well-known open-ring copolymerization catalyst.

Examples of other monomers capable of addition copolymerization with a monomer having a norbornene structure include α-olefins with carbon numbers of 2 to 20, such as ethylene, propylene, and 1-butene, and derivatives thereof; cycloolefins, such as cyclobutene, cyclopentene, and cyclohexene, and derivatives thereof; and non-conjugated dienes, such as 1,4-hexadiene, 4-methyl-1,4-hexadiene, and 5-methyl-1,4-hexadiene. Of these monomers, a single species can be used alone, or two or more species can be used in combination. Among those, an α-olefin is preferred, and ethylene is more preferred.

An addition polymer of a monomer having a norbornene structure, or an addition copolymer of a monomer having a norbornene structure with another monomer capable with copolymerization therewith, can be obtained through (co)polymerization of the monomers in the presence of a well-known addition copolymerization catalyst.

A hydrogenated product of an open-ring monomer having a norbornene structure, a hydrogenated product of an open-ring copolymer of a monomer having a norbornene structure with another monomer capable with copolymerization therewith, a hydrogenated product of an addition polymer of a monomer having a norbornene structure, or a hydrogenated product of an addition copolymer of a monomer having a norbornene structure with another monomer capable with copolymerization therewith, can be obtained by adding a well-known hydrogenation catalyst containing a transition metal, such as nickel or palladium, to a solution of those polymers and hydrogenating preferably 90% or more of the unsaturated carbon-carbon bonds.

Preferable norbornene resins are those having, as repeating units, an X:bicyclo[3.3.0]octane-2,4-diyl-ethylene structure and a Y:tricyclo[4.3.0.1 2,5]decane-7,9-diyl-ethylene structure, wherein the content of those repeating units is 90% by weight or more out of all the repeating units of the norbornene resin and the ratio X:Y of the X content to the Y content by weight is 100:0 to 40:60. When such resin is used, an optical material obtained from a stretched film according to the embodiment exhibits no dimensional change for a long period and offers excellent stability in optical properties.

The molecular weight of the norbornene resin can be selected to suit the purpose in mind, and is, in terms of a polyisoprene-equivalent (or, where toluene is used as a solvent, polystyrene-equivalent) weight-average molecular weight (Mw) as measured by gel permeation chromatography using cyclohexane (or, where the thermoplastic resin does not dissolve in it, toluene) as a solvent, typically in the range of 10,000 to 100,000, preferably 15,000 to 80,000, and more preferably 20,000 to 50,000. With the weight-average molecular weight in those ranges, an optical material obtained from a stretched film according to the embodiment suitably offers an excellent balance of mechanical strength and formability.

The glass transition temperature of the norbornene resin can be selected to suit the purpose in mind, and is preferably 80° C. or more, and more preferably in the range of 100° C. to 250° C. With the glass transition temperature in those ranges, an optical material obtained from a stretched film according to the embodiment develops no deformation or stress during use under high temperatures, and exhibits excellent durability.

The molecular weight distribution (weight-average molecular weight (Mw) divided by number-average molecular weight (Mn)) of the norbornene resin is subject to no particular restriction, but is typically in the range of 1.0 to 10.0, preferably in the range of 1.1 to 4.0, and more preferably in the range of 1.2 to 3.5.

The absolute value of the photoelastic coefficient C of the norbornene resin is preferably $10 \times 10^{-12}$ Pa$^{-1}$ or less, more preferably $7 \times 10^{-12}$ Pa$^{-1}$ or less, and particularly preferably $4 \times 10^{-12}$ Pa$^{-1}$ or less. The photoelastic coefficient C is a quantity given by $C = \Delta n/\sigma$, where $\Delta n$ represents birefringence and $\sigma$ represents stress. With the photoelastic coefficient C of the thermoplastic resin within those ranges, the film has less variation of retardation Ro in the in-plane direction of the film as will be described later.

The thermoplastic resin used in the embodiment can be blended with appropriate amounts of any of additives such as a colorant, like a pigment or a dye, a fluorescent brightener, a dispersant, a heat stabilizer, a light stabilizer, an ultraviolet absorber, an antistat, an antioxidant, a lubricant, and a solvent.

The content of residual volatile components in the stretched film of the norbornene resin is subject to no particular restriction, but is preferably 0.1% by weight or less, further preferably 0.05% by weight or less, and particularly preferably 0.02% by weight or less. With the content of residual volatile components in those ranges, improved dimensional stability is obtained, and the retardation Ro in the in-plane direction of the film and the retardation Rt in the film thickness direction have less secular variation. Moreover, it is possible to suppress deterioration of a phase-difference film obtained from a stretched film according to the embodiment, and thus, when one is applied to a polarizing plate in a liquid crystal display device or to a circular polarizer plate in an organic EL display device, it is possible to maintain stable and satisfactory display for a long period. Residual volatile components are substances with molecular weights of 200 or less that are contained in minute amounts in the film, and include, for example, residual monomers and solvents. The content of residual volatile components can be quantitatively determined, as the total of substances with molecular weights of 200 or less contained in the film, through analysis of the film by gas chromatography.

The saturated water absorption of the stretched film of the norbornene resin is preferably 0.03% by weight or less, more preferably 0.02% by weight or less, and particularly preferably 0.01% by weight or less. With the saturated water absorption within those ranges, the retardation Ro and Rt have less secular variation. It is also possible to suppress deterioration of a phase-difference film obtained from a stretched film according to the embodiment, and when one is applied to a polarizing plate in a liquid crystal display device or to a circular polarizing plate in an organic EL display device, it is possible to maintain stable and satisfactory display for a long period.

The saturated water absorption is a percentage of the increase in the mass of a sample piece of a film after, as compared with before, the film is immersed in water at a given temperature for a given length of time. It is usually measured with the sample immersed in water at 23° C. for 24 hours. The saturated water absorption of a stretched film according to the embodiment can be adjusted within the above-mentioned ranges, for example, by reducing the amount of polar groups in the thermoplastic resin. It is, however, preferable that the resin contain no polar group.

Preferred methods of forming a film of preferred norbornene resin as described above are solution flow casting (solution film formation) and melt flow casting (such as melt extrusion), which will be described later. Melt extrusion includes inflation using a die, and preferred from the viewpoints of productivity and excellent thickness accuracy is inflation using a T-die.

In extrusion using a T-die, by a process as disclosed in JP-A-2004-233604 for stably keeping thermoplastic resin in a melted state when brought into contact with a cooling drum, it is possible to produce a long film with satisfactorily small variation in optical properties such as retardation and orientation angle.

Specifically, examples of such processes include—(1) a process where, when a long film is produced by melt extrusion, thermoplastic resin in sheet form extruded from a die is drawn out in close contact with a cooling drum under a pressure of 50 kPa or less; (2) a process where, when a long film is produced by melt extrusion, the path from the die opening to the first-contact cooling drum with a cover member, and the distance from the cover member to the die opening or to the first-contact cooling drum is controlled to be 100 mm or less; (3) a process where, when a long film is produced by melt extrusion, the temperature in the atmosphere within 10 mm or less of thermoplastic resin in sheet form extruded from the die opening is raised to a predetermined temperature; and (4) a process where, when a long film is produced by melt extrusion, thermoplastic resin in sheet form extruded from the die opening is blown with a wind the difference of the speed of which from the drawing speed of the first-contact cooling drum is 0.2 m/s or less.

[Cellulose Ester Resin]

Examples of preferred cellulose ester resin films include those containing cellulose acylate fulfilling Formulae (1) and (2) below and in addition containing a compound expressed by General Formula (A) below.

$$2.0 \leq Z1 < 3.0 \qquad \text{Formula (1):}$$

$$0 \leq X < 3.0 \qquad \text{Formula (2):}$$

(In Formulae (1) and (2), Z1 represents the total degree of substitution by acyl group in cellulose acylate, and X represents the sum of the degrees of substitution by propionyl group and butyryl group in cellulose acylate.)

[Chemical Formula 1]

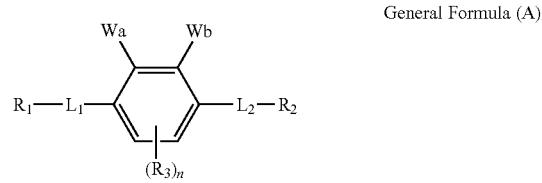

General Formula (A)

Now, General Formula (A) will be described in detail. In General Formula (A), $L_1$ and $L_2$ each independently represent a single-bond or divalent ligand. Examples of $L_1$ and $L_2$ include the following structures (where R represents a hydrogen atom or a substituent).

[Chemical Formula 2]

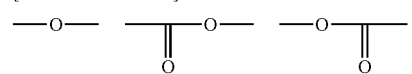

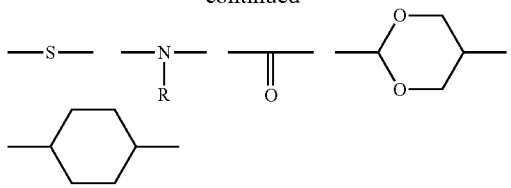

Preferred as L₁ and L₂ are —O—, —COO—, and —OCO—.

R₁, R₂, and R₃ each independently represent a substituent. Specific examples of substituents represented by R₁, R₂, and R₃ include halogen atoms (fluorine atom, chlorine atom, bromine atom, iodine atom, etc.), alkyl groups (methyl group, ethyl group, n-propyl group, isopropyl group, tert-butyl group, n-octyl group, 2-ethylhexyl group, etc.), cycloalkyl groups (cyclohexyl group, cyclopentyl group, 4-n-dodecyl-cyclohexyl group, etc.), alkenyl groups (vinyl group, aryl group, etc.), cycloalkenyl groups (2-cyclopentene-1-yl, 2-cyclohexene-1-yl group, etc.), alkynyl groups (ethynyl group, propargyl group, etc.), aryl groups (phenyl group, p-tolyl group, naphthyl group, etc.), heterocyclic groups (2-furyl group, 2-thienyl group, 2-pyrimidinyl group, 2-benzothiazolyl group, etc.), cyano group, hydroxyl group, nitro group, carboxyl group, alkoxy groups (methoxy group, ethoxy group, isopropoxy group, tert-butoxy group, n-octyloxy group, 2-methoxyethoxy group, etc.), aryloxy groups (phenoxy group, 2-methylphenoxy group, 4-tert-butylphenoxy group, 3-nitrophenoxy group, 2-tetradecanoyl amino phenoxy group, etc.), acyloxy groups (formyloxy group, acetyloxy group, pivaroyloxy group, stearoyloxy group, benzoyloxy group, p-methoxyphenylcarbonyloxy group, etc.), amino groups (amino group, methylamino group, dimethylamino group, anilino group, N-methyl-anilino group, diphenylamino group, etc.), acylamino groups (formylamino group, acetylamino group, pivaroylamino group, lauroylamino group, benzoylamino group, etc.), alkyl and arylsulfonylamino groups (methylsulfonylamino group, butylsulfonylamino group, phenylsulfonylamino group, 2,3,5-trichlorophenylsulfonylamino group, p-methylphenylsulfonylamino group, etc.), mercapto group, alkylthio groups (methylthio group, ethylthio group, n-hexadecylthio group, etc.), arylthio groups (phenylthio group, p-chlorophenylthio group, m-methoxyphenylthio group, etc.), sulfamoyl groups (N-ethylsulfamoyl group, N-(3-dodecyloxypropyl)sulfamoyl group, N,N-dimethylsulfamoyl group, N-acetylsulfamoyl group, N-benzoylsulfamoyl group, N—(N, phenylcarbamoyl)sulfamoyl group, etc.), sulfo group, acyl groups (acetyl group, pivaroylbenzoyl group, etc.), and carbamoyl groups (carbamoyl group, N-methylcarbamoyl group, N,N-dimethylcarbamoyl group, N,N-di-n-octylcarbamoyl group, N-(methylsulfonyl)carbamoyl group, etc.)

Preferred as R₁ and R₂ are substituted or non-substituted phenyl groups and substituted or non-substituted cyclohexyl groups, more preferably phenyl groups having a substituent and cyclohexyl groups having a substituent, and particularly preferably phenyl groups having a substituent at position 4 and cyclohexyl groups having a substituent at position 4.

Preferred as R₃ are hydrogen atom, halogen atoms, alkyl groups, alkenyl groups, aryl groups, heterocyclic groups, hydroxyl group, carboxyl group, alkoxy groups, aryloxy groups, acyloxy groups, cyano group, and amino group, and more preferably hydrogen atom, halogen atoms, alkyl groups, cyano group, and alkoxy groups.

Wa and Wb each represent a hydrogen atom or a substituent, where
(I) Wa and Wb can be bonded together to form a ring; or
(II) at least one of Wa and Wb can have a ring structure; or
(III) at least one of Wa and Wb can be alkenyl group or alkynyl group.

Specific examples of substituents represented by Wa and Wb include halogen atoms (fluorine atom, chlorine atom, bromine atom, iodine atom, etc.), alkyl groups (methyl group, ethyl group, n-propyl group, isopropyl group, tert-butyl group, n-octyl group, 2-ethylhexyl group, etc.), cycloalkyl groups (cyclohexyl group, cyclopentyl group, 4-n-dodecyl-cyclohexyl group, etc.), alkenyl groups (vinyl group, aryl group, etc.), cycloalkenyl groups (2-cyclopentene-1-yl, 2-cyclohexene-1-yl group, etc.), alkynyl groups (ethynyl group, propargyl group, etc.), aryl groups (phenyl group, p-tolyl group, naphthyl group, etc.), heterocyclic groups (2-furyl group, 2-thienyl group, 2-pyrimidinyl group, 2-benzothiazolyl group, etc.), cyano group, hydroxyl group, nitro group, carboxyl group, alkoxy groups (methoxy group, ethoxy group, isopropoxy group, tert-butoxy group, n-octyloxy group, 2-methoxyethoxy group, etc.), aryloxy groups (phenoxy group, 2-methylphenoxy group, 4-tert-butylphenoxy group, 3-nitrophenoxy group, 2-tetradecanoyl amino phenoxy group, etc.), acyloxy groups (formyloxy group, acetyloxy group, pivaroyloxy group, stearoyloxy group, benzoyloxy group, p-methoxyphenylcarbonyloxy group, etc.), amino groups (amino group, methylamino group, dimethylamino group, anilino group, N-methyl-anilino group, diphenylamino group, etc.), acylamino groups (formylamino group, acetylamino group, pivaroylamino group, lauroylamino group, benzoylamino group, etc.), alkyl and arylsulfonylamino groups (methylsulfonylamino group, butylsulfonylamino group, phenylsulfonylamino group, 2,3,5-trichlorophenylsulfonylamino group, p-methylphenylsulfonylamino group, etc.), mercapto group, alkylthio groups (methylthio group, ethylthio group, n-hexadecylthio group, etc.), arylthio groups (phenylthio group, p-chlorophenylthio group, m-methoxyphenylthio group, etc.), sulfamoyl groups (N-ethylsulfamoyl group, N-(3-dodecyloxypropyl)sulfamoyl group, N,N-dimethylsulfamoyl group, N-acetylsulfamoyl group, N-benzoylsulfamoyl group, N—(N, phenylcarbamoyl)sulfamoyl group, etc.), sulfo group, acyl groups (acetyl group, pivaroylbenzoyl group, etc.), and carbamoyl groups (carbamoyl group, N-methylcarbamoyl group, N,N-dimethylcarbamoyl group, N,N-di-n-octylcarbamoyl group, N-(methylsulfonyl)carbamoyl group, etc.).

Any of the above-enumerated substituents can be substituted with any other of them.

(I) In a case where Wa and Wb are bonded together to form a ring, it is preferable that the ring be a nitrogen-containing five-membered ring or a sulfur-containing five-membered ring. It is particularly preferable that the compound expressed by General Formula (A) be a compound expressed by General Formula (1) or (2) below.

[Chemical Formula 3]

General Formula (1)

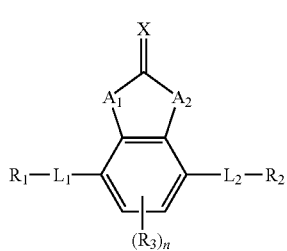

In General Formula (1), A₁ and A₂ each independently represent —O—, —S—, —NRx-(where Rx represent a hydrogen atom or a substituent), or —CO—. Examples of substituents represented by Rx are the same as the specific examples of substituents represented by above-mentioned Wa and Wb. Preferred for Rx is a hydrogen atom, an alkyl group, an aryl group, or a heterocyclic group.

In General Formula (1), X represents a non-metallic atom of an element of groups 14 to 16. Preferred for X is =O, =S, =NRc, or =C(Rd)Re. Here, Rc, Rd, and Re each represent a substituent, of which examples are the same as the specific examples of substituents represented by above-mentioned Wa and Wb. $L_1$, $L_2$, $R_1$, $R_2$, $R_3$, and n are the same as those in General Formula (A).

[Chemical Formula 4]

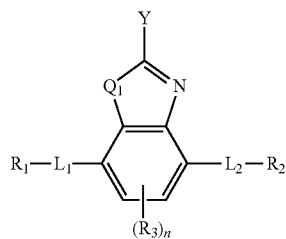

General Formula (2)

In General Formula (2), $Q_1$ represents —O—, —S—, —NRy-(where Ry represents a hydrogen atom or a substituent), —CRaRb— (where Ra and Rb each represent a hydrogen atom or a substituent), or —CO—. Here, Ry, Ra, and Rb each represent a substituent, of which examples are the same as the specific examples of substituents represented by Wa and Wb above.

Y represents a substituent. Examples of the substituent represented by Y are the same as the specific examples of substituents represented by above-mentioned Wa and Wb. Preferred for Y is aryl group, heterocyclic group, alkenyl group, or alkynyl group.

Examples of aryl groups represented by Y include phenyl group, naphthyl group, anthryl group, phenanthryl group, biphenyl group, etc., among which phenyl group and naphthyl group are preferred, and phenyl group is more preferred.

Example of heterocyclic groups include heterocyclic groups having at least one heteroatom such as a nitrogen atom, oxygen atom, sulfur atom, or the like, that is, furyl group, pyrrolyl group, thienyl group, pyridinyl group, thiazoryl group, benzothiazolyl group, etc., preferred among these being furyl group, pyrrolyl group, thienyl group, pyridinyl group, and thiazoryl group.

Any of these aryl groups and heterocyclic groups can have at least one substituent. Examples of such substituents include halogen atoms, alkyl groups with carbon numbers of 1 to 6, cyano group, nitro group, alkylsulfinyl groups with carbon numbers of 1 to 6, alkylsulfonyl groups with carbon numbers of 1 to 6, carboxyl group, fluoroalkyl groups with carbon numbers of 1 to 6, alkoxy groups with carbon numbers of 1 to 6, alkylthio groups with carbon numbers of 1 to 6, N-alkylamino groups with carbon numbers of 1 to 6, N,N-dialkylamino groups with carbon numbers of 2 to 12, N-alkylsulfamoyl groups with carbon numbers of 1 to 6, N,N-dialkylsulfamoyl groups with carbon numbers of 2 to 12.

$L_1$, $L_2$, $R_1$, $R_2$, $R_3$, and n are the same as those in General Formula (A).

(II) In a case where, in General Formula (A), at least one of Wa and Wb has a ring structure, specific examples are preferably expressed by General Formula (3) below.

[Chemical Formula 5]

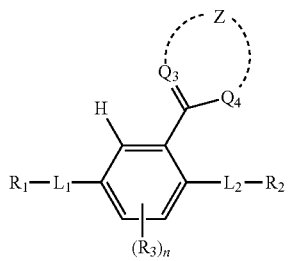

General Formula (3)

In General Formula (3), Q3 represents =N— or =CRz- (where Rz represents a hydrogen atom or a substituent), and Q4 represents an atom of a non-metallic element of group 14 to 16. Z represents a non-metallic atom group that forms a ring together with Q3 and Q4.

The ring formed by $Q_3$, $Q_4$, and Z can be further annelated with another ring. It is preferable that the ring formed by $Q_3$, $Q_4$, and Z be a nitrogen-containing five- or six-membered ring annelated with a benzene ring.

$L_1$, $L_2$, $R_1$, $R_2$, $R_3$, and n are the same as those in General Formula (A).

(III) In a case where at least one of Wa and Wb is an alkenyl group or an alkynyl group, it is preferable that they be a vinyl group or an ethynyl group having a substituent.

Among compounds expressed by General Formulae (1), (2), and (3) above, particularly preferred are those expressed by General Formula (3).

Compounds expressed by General Formula (3) excel those expressed by General Formula (1) in heat resistance and light resistance, and excel those expressed by General Formula (2) in solubility in organic solvents and compatibility with polymers.

An adequately adjusted amount of a compound expressed by General Formula (A) can be mixed to obtain desired wavelength dispersion and ooze resistance, a preferred amount of it mixed in the cellulose derivative being in the range of 1 to 15% by mass, and particularly preferably in the range of 2% to 10% by mass. Within these ranges, the cellulose derivative has satisfactory wavelength dispersion and ooze resistance.

Compounds expressed by General Formulae (A), (1), (2), and (3) can be obtained by well-known processes. Specifically, they can be synthesized by the processes described in Journal of Chemical Crystallography (1997); 27(9); 512-526), AJP-A-2010-31223, JP-A-2008-107767, etc.

(Cellulose Acylate)

A cellulose acylate film according to the embodiment contains cellulose acylate as a main component. For example, a cellulose acylate film according to the embodiment contains, preferably, 60% to 100% by mass of cellulose acylate in the total mass (100% by mass) of the film. The total degree of substitution by acyl group in cellulose acylate is 2.0 or more but less than 3.0, and more preferably in the range of 2.2 to 2.7.

Examples of cellulose acylate include esters of cellulose with an aliphatic carboxylic acid and/or an aromatic carboxylic acid each with a carbon number of 2 to about 22, particularly preferred being esters of cellulose with a low fatty acid with a carbon number of 6 or less.

An acyl group bonded to a hydroxyl group in cellulose can be straight-chained or branched, can form another ring, and can be substituted by another substituent. For a given degree of substitution, the greater the carbon number, the lower birefringence. Thus, it is preferable to select from acyl groups with carbon numbers of 2 to 6, and the sum of the degrees of substitution by propionyl group and butyryl group is 0 or more but less than 3.0. It is preferable that, in the form of cellulose acylate, the carbon number be in the range of 2 to 4, and more preferably in the range of 2 to 3.

Specifically, as cellulose acylate, it is possible to use an ester of cellulose with mixed fatty acids, such as cellulose acetate propionate, cellulose acetate butyrate, cellulose acetate propionate butyrate, and cellulose acetate phthalate, where not only an acetyl group but also a propionate group, butyrate group, or phtharyl group is bonded. A butyryl group forming butyrate can be straight-chained or branched.

In the embodiment, particularly preferably used as cellulose acylate is cellulose acetate, cellulose acetate butyrate, or cellulose acetate propionate.

It is preferable that the cellulose acylate described above fulfill both formulae (i) and (ii) below.

$$2.0 \leq X+Y<3.0 \qquad \text{Formula(i):}$$

$$0 \leq X<3.0 \qquad \text{Formula(ii):}$$

In these formulae, Y represents the degree of substitution by acetyl group, and X represents the degree of substitution by propionyl group, butyryl group, or a mixture thereof.

To obtain desired optical properties, resins with different degrees of substitution may be mixed. In that case, it is preferable that the mix ratio be 1:99 to 99:1 by mass.

Particularly preferred species of cellulose acylate among those mentioned above is cellulose acetate propionate. With cellulose acetate propionate, it is preferable that $0 \leq Y \leq 2.5$ and in addition that $0.5 \leq X<3.0$ (where $2.0 \leq X+Y<3.0$), and it is more preferable that $0.5 \leq Y \leq 2.0$ and in addition that $1.0 \leq X \leq 2.0$ (where $2.0 \leq X+Y<3.0$). The degree of substitution by acyl group can be measured in compliance with ASTM-D817-96, which is one of the standards formulated and promulgated by ASTM (American Society for Testing and Materials).

It is preferable that cellulose acylate have a number-average molecular weight in the range of 60000 to 300000, because then the obtained film has high mechanical strength. It is more preferable to use cellulose acylate having a number-average molecular weight in the range of 70000 to 200000.

The weight-average molecular weight (Mw) and the number-average molecular weight (Mn) of cellulose acylate can be measured by gel permeation chromatography (GPC). The measurement conditions are as follows. This measurement method is applicable equally to other polymers in the embodiment.

Solvent: methylene chloride;
Colum: Shodex K806, K805, and K803G (manufactured by Showa Denko K.K.), three columns connected together;
Column Temperature: 25° C.;
Sample Concentration: 0.1% by mass;
Detector: RI Model 504 (manufactured by GL Sciences Inc.);
Pump: L6000 (manufactured by Hitachi, Ltd.);
Flow Rate: 1.0 ml/minute;
Calibration Curve: Calibration curves for 13 samples of standard polystyrene STK standard polystyrene (manufactured by Tosoh Corporation) Mw=1000000 to 500 are used; with 13 samples used at approximately equal intervals.

It is preferable that the residual sulfuric acid content in cellulose acylate be in the range of 0.1 to 45 ppm by mass in terms of sulfur element. The content is considered to be in the form of salts. With a residual sulfuric acid content over 45 ppm by mass, breakage tends to be more likely during heat stretching and during slitting after heat stretching. It is more preferable that the residual sulfuric acid content be in the range of 1 ppm to 30 ppm by mass. The residual sulfuric acid content can be measured by a method stipulated in ASTM-D817-96.

It is preferable that the free acid content in cellulose acylate be in the range of 1 to 500 ppm by mass. Within this range, just as mentioned above, breakage is advantageously less likely. It is preferable that the free acid content be in the range of 1 to 100 ppm by mass, because then breakage is still less likely, and particularly preferably in the range of 1 to 70 ppm by mass. The free acid content can be measured by a method stipulated in ASTM-D817-96.

By cleaning the synthesized cellulose acylate more thoroughly than when used in solution flow casting, it is advantageously possible to control the residual alkali earth metal content, the residual sulfuric acid content, and the residual acid content within the above-mentioned ranges.

It is preferable that the cellulose acylate, when formed into a film, have as few bright spot defects as possible. Bright spot defects are spots (defects) at which, when two polarizing plates are placed in a crossed-nicols arrangement with an optical film or the like placed in between and light is shone from behind one polarizer plate, light leaking from behind is observed on the other polarizer plate. For bright spots with diameters of 0.01 mm or more, it is preferable that the number of bright spot defects be 200/cm$^2$ or less, more preferably 100/cm$^2$ or less, still more preferably 50/cm$^2$ or less, even more preferably 30/cm$^2$ or less, particularly preferably 10/cm$^2$ or less, and most preferably zero.

Also for bright spots with diameters of 0.005 to 0.01 mm or less, it is preferable that the number of bright spot defects be 200/cm$^2$ or less, more preferably 100/cm$^2$ or less, still more preferably 50/cm$^2$ or less, even more preferably 30/cm$^2$ or less, particularly preferably 10/cm$^2$ or less, and most preferably zero.

There is no particular restriction on cellulose as a source material for cellulose acylate, examples including cotton linters, wood pulp, and kenaf. Cellulose acylate obtained from those can be mixed in arbitrary proportions.

Cellulose acylate can be produced by a well-known process. Specifically, it can be synthesized, for example, by the process described in JP-A-H10-45804.

Cellulose acylate is also affected by trace-amount metal components in it. Such trace-amount metal components are considered to be related to water used in the production process, and it is preferable that a component that can be a kernel of insolubility be contained as little as possible. In particular, metal ions such as iron, calcium, and magnesium can produce insoluble products by forming salts with polymer decomposition products that may contain organic acid groups, and it is preferable that such components be contained as little as possible. A calcium (Ca) component easily forms coordination compounds (that is, complexes) with acid components such as carbonic acids and sulfonic acids and with many ligands, and may form scum (insoluble sediment, dregs) derived from many insoluble calcium compounds; it is thus preferable that calcium be contained as little as possible.

Specifically, for an iron (Fe) component, it is preferable that its content in cellulose acylate be 1 ppm or less by mass. For a calcium (Ca) component, it is preferable that its content in cellulose acylate be 60 ppm or less by mass, and more preferably 0 to 30 ppm by mass. For a magnesium (Mg) component, since its excessive content produces insoluble products, it is preferable that its content in cellulose acylate be 0 to 70 ppm by mass, and particularly preferably 0 to 20 ppm by mass.

The contents of metal components, such as the contents of an iron (Fe) component, a calcium (Ca) component, and a magnesium (Mg) component, can be analyzed by decomposing cellulose acylate in a bone-dried state with sulfuric nitric acid on a microdigest wet decomposer, then pre-processing it by alkali fusion, and then analyzing on an ICP-AES (inductively coupled plasma atomic emission spectrometer).

(Additives)

A long stretched film obtained by a production method according to the embodiment can contain, as necessary, any polymer component other than a cellulose ester mentioned later. It is preferable that the mixed polymer component be compatible with a cellulose ester, and that, in the form of a film, it have a transmittance of 80% or more, more preferably 90% or more, and particularly preferably 92% or more.

Examples of additives that can be added to the dope include a plasticizer, an ultraviolet absorber, a retardation adjuster, an antioxidant, a deterioration inhibitor, a release assistant, a surface-active agent, a dye, and fine particles. In the embodiment, an additive other than fine particles can be added during preparation of a cellulose ester solution, or can be added during preparation of a fine particle-dispersed liquid. It is preferable to add a plasticizer, an antioxidant, an ultraviolet absorber, etc. to a polarizing plate for use in a liquid crystal display device in order to give it heat resistance and moisture resistance.

It is preferable that the content of those compounds in a cellulose ester be 1 to 30% by mass, and more preferably 1 to 20% by mass. To suppress bleeding out etc. during stretching and drying, it is preferable that those compounds have a vapor pressure of 1400 Pa or less at 200° C.

Those compounds can be added along with a cellulose ester and a solvent during preparation of a cellulose ester solution, or can be added during or after preparation of the solution.

(Retardation Adjuster)

As a compound that is added to control retardation, it is possible to use an aromatic compound having two or more aromatic rings as disclosed in European Patent No. 911,656 A2.

It is also possible to use two or more species of aromatic compounds. It is particularly preferable that such aromatic rings of aromatic compounds include, in addition to an aromatic hydrocarbon ring, an aromatic hetero ring. In general, aromatic hetero rings are unsaturated hetero rings. Particularly preferred among them is 1,3,5-triazine ring (Polymer or Oligomer)

In the embodiment, it is preferable that a cellulose ester film include a cellulose ester and a polymer or oligomer of a vinyl compound having a substituent selected from the group of carboxyl group, hydroxyl group, amino group, amide group, and sulfonic acid group, and having a weight-average molecular weight in the range of 500 to 200,000. It is preferable that the content ratio by mass of the cellulose ester to the polymer or oligomer be in the range of 95:5 to 50:50.

(Matting Agent)

In the embodiment, as a matting agent, fine particles can be contained in a stretched film. This makes the stretched film, in a case where it is a long film, easy to transport and wind up.

It is preferable that the matting agent be primary particles or secondary particles with a particle diameter of 10 nm to 0.1 µm. A preferred matting agent is approximately spherical primary particles with an ellipticity of 1.1 or less.

Preferred fine particles contain silicon, and particularly preferably silicon dioxide. Examples of fine particles of silicon dioxide preferred in the embodiment include those manufactured by Nippon Aerosil Co., Ltd. under the product names Aerosil R972, R972V, R974, R812, 200, 200V, 300, 8202, OX50, and TT600. Preferred among these are Aerosil 200V, R972, R972V, R974, R202, and R812. Examples of polymer fine particles include particles of silicone resin, fluorine resin, and acrylic resin. Preferred is silicone resin, in particular one having a three-dimensional net-like structure. Examples of such resins include Tospearl 103, Tospearl 105, Tospearl 108, Tospearl 120, Tospearl 145, Tospearl 3120, and Tospearl 240 (manufactured by Toshiba Silicone Co., Ltd.).

Preferred as fine particles of silicon dioxide are those with a primary particle average diameter of 20 nm or less and an apparent specific gravity of 70 g/L or more. It is more preferable that the average primary particle diameter be 5 to 16 nm, particularly preferably 5 to 12 nm. The smaller the average primary particle diameter, advantageously, the lower the haze. It is preferable that the apparent specific gravity be 90 to 200 g/L or more, and more preferably 100 to 200 g/L or more. The greater the apparent specific gravity, advantageously, the easier it is to prepare a fine particle-dispersed liquid at a high concentration, and the less likely haze or agglomeration results.

In the embodiment, a preferred amount of the matting agent added is, per square meter of a long stretched film, 0.01 to 1.0 g, more preferably 0.03 to 0.3 g, and particularly preferably 0.08 to 0.16 g.

(Other Additives)

It is possible to add inorganic fine particles, such as kaolin, talc, diatomaceous earth, quartz, calcium carbonate, barium sulfate, titanium oxide, or alumina, and a heat stabilizer, such as a salt of an alkaline-earth metal such as calcium or magnesium. It is possible to further add a surface-active agent, a release assistant, an antistat, a flame-retardant, a lubricant, an oily agent, etc.

(Tension Softening Point)

In the embodiment, a cellulose ester resin film is expected to withstand use in higher-temperature environments. Accordingly, the cellulose ester resin film has a tension softening point of, preferably, 105° C. to 145° C., because it then has satisfactory heat resistance, and more preferably 110° C. to 130° C.

In one specific method of measuring the tension softening point, for example, a Tensilon tester (model RTC-1225A manufactured by Orientec Co., Ltd.) is used: a piece sized 120 mm (long)×10 mm (wide) is cut out of a sample film; while the piece is held under a tension of 10 N, temperature is raised at a speed of 30° C./min; when the tension becomes 9 N, temperature is measured three times, and the average is taken.

(Rate of Dimensional Change)

In a case where a cellulose ester resin film in the embodiment is used in an organic EL image display device, to prevent a dimensional change due to moisture absorption from causing problems such as uneven thickness, variation in phase difference value, diminished contrast, or uneven color, it is preferable that the cellulose ester resin film have a dimensional change rate (%) less than 0.5%, and more preferably less than 0.3%.

(Defects)

It is preferable that a cellulose ester resin film in the embodiment have as few defects in the film as possible. Here, defects refers to voids (bubble defects) in the film which result from rapid vaporization of a solvent in a drying step during solution film formation, and to foreign matter (foreign matter defects) that is present in the solution for film formation or that lodges in the film during film formation.

Specifically, it is preferable that the number of defects with a diameter of 5 µm or more in the plane of the film be 1 or less/10 square centimeters, more preferably 0.5 or less/10 square centimeters, and still more preferably 0.1 or less/10 square centimeters.

When a defect is circular, the diameter of the circle is the diameter of the defect. Otherwise, the area of a defect is determined by the method described below through observation under a microscope, and the maximum diameter of the area (the diameter of the circumcircle) is taken as the diameter of the defect.

When a defect is a bubble or a particle of foreign matter, the area of the defect is the size of the shadow of the defect when it is observed under a differential interference microscope with transmitted light. When a defect is a change in the surface shape, such as a scratch or a transferred scratch on a roll, the size of the defect is determined through observation under a differential interference microscope with reflected light.

In observation with reflected light, if the size of a defect is unclear, observation is performed with aluminum or platinum deposited on the surface. For high-productivity production of a film with high quality as expressed by such a frequency of defects, it is effective to subject the polymer solution to high-precision filtering immediately before flow casting, to improve the cleanness around flow casting equipment, and to set the conditions for drying after flow casting stepwise such that drying proceeds efficiently but with suppressed bubble development.

If the number of defects is more than 1/10 square centimeters, when the film is exposed to tension, for example, during working in post-processing, the film may break with a defect acting as the starting point, leading to diminished productivity. If a defect has a diameter of 5 μm or more, it may be visually recognizable through observation using a polarizing plate, and may form a bright spot when the film is used in the optical member.

(Breaking Elongation)

A cellulose ester resin film according to the embodiment has a breaking elongation of preferably 10% or more, and more preferably 20% or more, in at least one direction as measured in compliance with JIS-K7127-1999, which is one of the standards formulated by JIS (Japanese Industrial Standards Committee).

There is no particular restriction on the upper limit of breaking elongation; in practical terms, however, it is about 250%. For higher breaking elongation, it is effective to suppress defects in the film resulting from foreign matter or bubble formation.

(Full-Spectrum Transmittance)

A cellulose ester resin film according to the embodiment has a full-spectrum transmittance of preferably 90% or more, and more preferably 93% or more. A practical upper limit of full-spectrum transmittance is about 99%. To obtain excellent transparency as expressed by such full-spectrum transmittance, it is effective to avoid introducing an additive or a copolymer component that absorbs visible light, and to eliminate foreign matter in the polymer by high-precision filtering so as to reduce diffusion and absorption of light inside the film. It is also effective to reduce the surface roughness of members that make contact with the film during film formation (such as a cooling roll, a calendar roll, a drum, a belt, an application base material in solution film formation, and a transport roll) so as to reduce the surface roughness of the film surface, thereby to reduce diffusion and reflection of light at the surface of the film.

<Film Formation of a Long Film>

A long film according to the embodiment, formed of the resin described above, can be produced by solution flow casting or melt flow casting as described below. These film formation processes will be described below one by one. Although the following description deals with cases where, as a long film, a cellulose ester resin film is produced, it applies equally to film formation of any other resin film.

[Solution Flow Casting]

From the viewpoints of suppressing film coloring, suppressing foreign-matter defects, suppressing optical defects such as dye lines, and excellent film flatness and transparency, it is preferable to produce a long film by solution flow casting.

(Organic Solvent)

As an organic solvent useful in forming a dope in a case where a cellulose ester resin film according to the embodiment is produced by solution flow casting, any solvent can be used with no restriction so long as both cellulose acetate and other additives dissolve in it.

An example of a chlorinated organic solvent is methylene chloride. Examples of non-chlorinated solvents include methyl acetate, ethyl acetate, amyl acetate, acetone, tetrahydrofurane, 1,3-dioxolane, 1,4-dioxane, cyclohexanone, ethyl formate, 2,2,2-trifluoroethanol, 2,2,3,3-hexafluoro-1-propanol, 1,3-difluoro-2-propanol, 1,1,1,3,3,3-hexafluoro-2-methyl-2-propanol, 1,1,1,3,3,3-hexafluoro-2-propanol, 2,2,3,3,3-pentafluoro-1-propanol, and nitroethane. Preferred among these are methylene chloride, methyl acetate, ethyl acetate, and acetone.

It is preferable that the dope contain, in addition to the above-mentioned solvent, 1 to 40% by mass of a straight-chained or branched aliphatic alcohol with a carbon number of 1 to 4. A high content of the alcohol in the dope causes gelation of the web, allowing easy release from a metal support member; on the other hand, a low content of the alcohol promotes dissolution of cellulose acetate in a non-chlorinated organic solvent.

Particularly preferred is a dope composition prepared by dissolving at least a total of 15 to 45% by mass of three materials, namely acrylic resin, cellulose ester resin, and acrylic particles, in a solvent containing methylene chloride and a straight-chained or branched aliphatic alcohol with a carbon number of 1 to 4.

Examples of straight-chained or branched aliphatic alcohols with carbon numbers of 1 to 4 include methanol, ethanol, n-propanol, iso-propanol, n-butanol, sec-butanol, and tert-butanol. Preferred among these for dope stability, a comparatively low boiling point, and fast drying is ethanol.

(Solution Flow Casting)

A cellulose ester resin film according to the embodiment can be produced by solution flow casting. Solution flow casting involves a step of preparing a dope by dissolving resin and additives in a solution, a step of flow-casting the dope on a metal support member in the shape of a belt or a drum, a step of drying the flow-cast dope in the form of a web, a step of releasing from the metal support member, a step of stretching or width keeping, a step of further drying, and a step of winding up the finished film.

The higher the concentration of cellulose acetate in the dope, advantageously the lower the drying burden after flow casting on the metal support member. An excessively high concentration, however, leads to an increased burden in filtering, inviting lower filtering precision. To strike a good balance, the concentration is preferably 10 to 35% by mass, and more preferably 15 to 25% by mass. Suitably used as the metal support member for flow casting is one having a mirror-finished surface, and suitably used as the metal support member is a stainless steel belt or a cast drum having its surface finished by plating.

The surface temperature of the metal support member in the flow casting step is set at −50° C. or higher but below a temperature at which the solvent boils and forms bubbles. The higher the temperature of the support member, advantageously the faster the web dries, but an excessively high temperature causes bubble formation in the web or degraded flatness.

A preferred temperature of the support member is determined as desired in the range of 0 to 100° C., and more preferably in the range of 5 to 30° C. Another preferred method is to cool the web to gelate it so that it is released from the drum in a state containing a large proportion of residual solvent. There is no particular restriction on the method of controlling the temperature of the metal support member; it is possible to adopt a method involving blowing heated or cooled wind on, or to bring heated water in contact with, the underside of the metal support member. Using heated water is preferred, because it allows efficient transfer of heat and takes less time until the temperature of the metal support member becomes constant.

In a case where heated wind is used, with consideration given to a drop in the temperature of the web ascribable to latent heat of vaporization of the solvent, wind heated to over the boiling point of the solvent can be used such that, while wind at a temperature higher than the target temperature is used, bubble formation is prevented.

It is particularly preferable to perform drying efficiently by varying the temperature of the support member and the temperature of the drying wind between flow casting and releasing.

For a cellulose ester resin film to exhibit satisfactory flatness, it is preferable that the amount of residual solvent at the time that the web is released from the metal support member be in the range of 10 to 150% by mass, more preferably 20 to 40% by mass or 60 to 130% by mass, and particularly preferably 20 to 30% by mass or 70 to 120% by mass. Here, the amount of residual solvent is defined by the following formula.

Amount of Residual Solvent (% by mass)=[$(M-N)/N$]×100

Here, M represents the mass (g) of the sample collected at an arbitrary time point during or after the production of the web or the film, and N represents the mass (g) after heating of M at 115° C. for one hour.

In the step of drying the cellulose ester resin film, it is preferable to release the web from the metal support member and then further dry it such that the amount of residual solvent is 1% or less by mass, more preferably 0.1% or less by mass, and particularly preferably 0 to 0.01% or less by mass.

Typically adopted in the step of drying the film is a method where the web is dried while being transported, such as a roll drying method (where the web is dried by being passed between a large number of rolls arranged under and over it) or a tenter method.

[Melt Flow Casting]

Melt flow casting is preferred from the viewpoint of ease of reducing retardation Rt in the thickness direction of the film after oblique stretching, which will be described later, and from other view points such as a reduced amount of residual volatile components and hence excellent dimensional stability. Melt flow casting involves heating a composition containing resin and additives such as a plasticizer up to a temperature at which it exhibits fluidity, and then flow-casting the melt containing fluid cellulose acetate to form a film. Processes involving melt flow casting can be classified into melt extrusion (formation), press molding, inflation, injection molding, blow molding, draw molding, etc. Among these, melt extrusion is preferred because it produces a film with excellent mechanical strength, surface accuracy, etc. In general, it is preferable that the plurality of source materials to be used in melt extrusion be previously blended and kneaded and pelletized.

Pelletizing can be performed by a well-known method. For example, dry cellulose acetate, plasticizer, and other additives are fed from a feeder into an extruder; then, on a single-axis or two-axis extruder, the mixture is blended and kneaded, and is extruded from a die in the form of a strand, which is then cooled with water or air, and is then cut into pellets.

The additives can be mixed before feeding into the extruder, or can be fed from separate feeders. For even mixing, it is preferable that additives added in small amounts, such as particles and antioxidant, be mixed beforehand for even mixing.

It is preferable that the extruder be operated with a suppressed shearing force, and that, to prevent deterioration of resin (reduced molecular weight, coloring, or gel formation), working proceed in a pelletizable fashion and at as low a temperature as possible. For example, on a two-axis extruder, it is preferable to rotate the two axes in the same direction by use of deep-groove screws. For even blending and kneading, a meshed-together type is preferred.

By use of the pellets obtained as described above, film formation is performed. Needless to say, unpelletized source materials in powder form as they are can be fed from a feeder into the an extruder to perform film formation.

On a single-axis or two-axis extruder, the pellets described above are subjected to extrusion at a melt temperature of about 200 to 300° C.; the melt is then subjected to filtering with a leaf-disc filter or the like to remove foreign matter, is then flow-cast into a film from a T-die; the film is then nipped between a cooling roll and an elastic touch roll so as to set on the cooling roll.

It is preferable that the feeding of the pellets from the feed hopper into the extruder be performed under vacuum, under reduced pressure, or under an environment of an inert gas to prevent decomposition due to oxidation or the like.

It is preferable that extrusion be performed at a stable flow rate with a gear pump or the like introduced. Suitably used as a filter for foreign matter removal is a stainless fiber sintered filter. A stainless fiber sintered filter is formed by compressing a complex tangle of stainless fibers and then sintering the contact spots to form a single piece. It is possible to vary its density by varying the fiber thickness and the degree of compression, and thereby to adjust filtering precision.

Additives such as plasticizer and particles can be previously mixed with resin, or can be kneaded in the middle of the extruder. For even addition, it is preferable to use a mixing device such as a static mixer.

When the film is nipped between the cooling roll and the elastic touch roll, it is preferable that the touch roll-side temperature of the film be equal to or higher than the film's Tg (glass transition temperature) but equal to or lower than Tg+110° C. As a roll having a surface of an elastic material for use for such a purpose, a well-known roll can be used.

An elastic touch roll is also referred to as a nip rotary member. As an elastic touch roll, a commercially available one can be used.

When the film is released from the cooling roll, it is preferable to control the tension so as to prevent deformation of the film.

A long film produced by any of the film formation processes described above can be a single-layer film, or a stacked film having two or more layers. A stacked film can be obtained by a well-known process such as co-extrusion molding, co-flow casting, film lamination, or application. Of these, co-extrusion molding and co-flow casting are preferred.

<Specifications of a Long Film>

A long film according to the embodiment has a thickness of preferably 30 to 200 μm, and more preferably 40 to 150 μm. In the embodiment, the thickness unevenness σm in the flow direction (transport direction) of the long film fed to the stretching zone, which will be described later, needs to be preferably less than 0.30 μm, more preferably less than 0.25 μm, and still more preferably less than 0.20 μm from the viewpoint of keeping constant the drawing tension of the film at the entrance of the oblique stretching tenter, which will be descried later, and from the viewpoint of stabilizing optical properties such as orientation angle and retardation. If the thickness unevenness σm in the flow direction of the long film is 0.30 μm or more, variation in optical properties such as retardation and orientation angle degrades notably.

As a long film, a film having a thickness gradient in the width direction can be fed. The thickness gradient of a long film can be found empirically by stretching a film whose thickness gradient is varied experimentally such that the film thickness at the position where stretching in post-processing is complete is most even. The thickness gradient of a long film can be adjusted, for example, such that the thickness at the end with the larger thickness is about 0.5 to 3% more than at the end with the smaller thickness.

The width of a long film is subject to no particular restriction, and can be in the range of 500 to 4000 mm, and preferably in the range of 1000 to 2000 mm.

A preferred modulus of elasticity at the stretching temperature during oblique stretching of the long film, as expressed in terms of Young's modulus, is equal to or more than 0.01 MPa but equal to or less than 5000 MPa, and more preferably equal to or more than 0.1 MPa but equal to or less than 500 MPa. If the modulus of elasticity is too low, the shrinkage ratio during and after stretching is so low that creases are hard to remove. If the modulus of elasticity is too high, the tension applied during stretching is so high that increased mechanical strength is required in the parts that hold both side edge portions of the film, increasing the burden on the tenter in post-processing.

As a long film, a non-oriented film can be used, or a pre-oriented film can be fed. If necessary, a long film can be oriented in an arcuate, that is, so-called bow-shaped, distribution in the width direction. In short, the orientation state of the long film can be adjusted such that a desired film orientation is obtained at the position where stretching in post-processing is complete.

<Long Obliquely Stretched Film Production System>

Next, prior to a description of a long obliquely stretched film production apparatus which stretches the long film described above in a direction oblique to the width direction, a description will be given of an entire long obliquely stretched film production system which is provided with such a production apparatus.

(Outline of the System)

Figure 2:
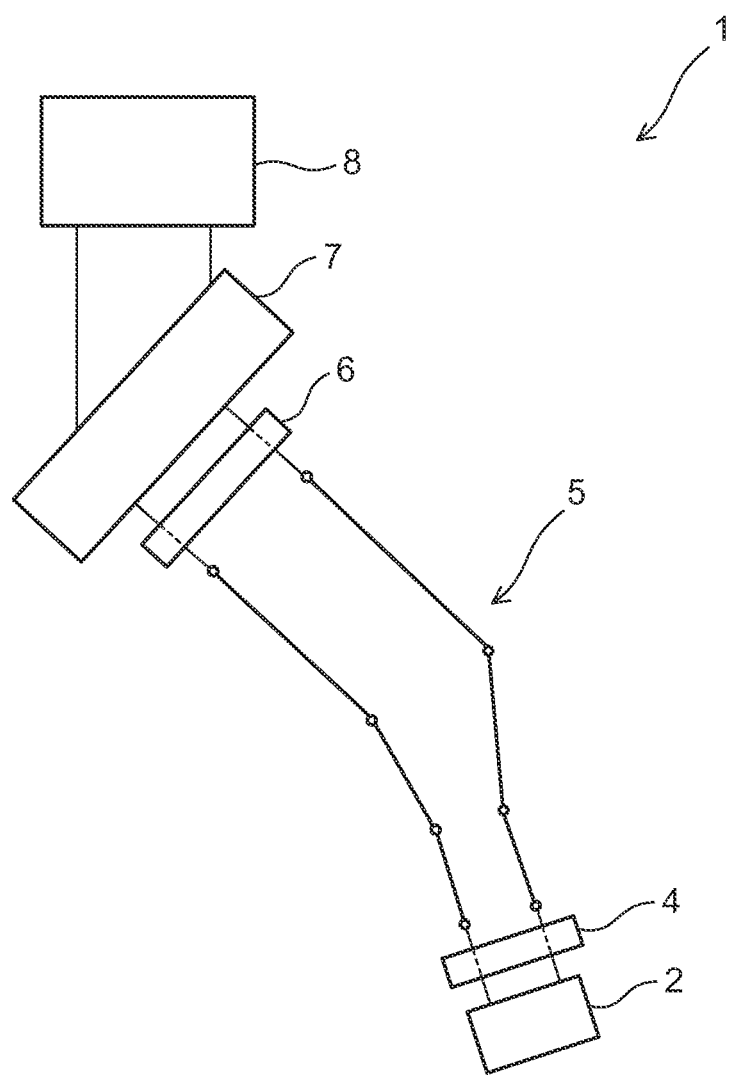
FIG. 2 is a plan view schematically showing another configuration of the above production system.
Figure 3:
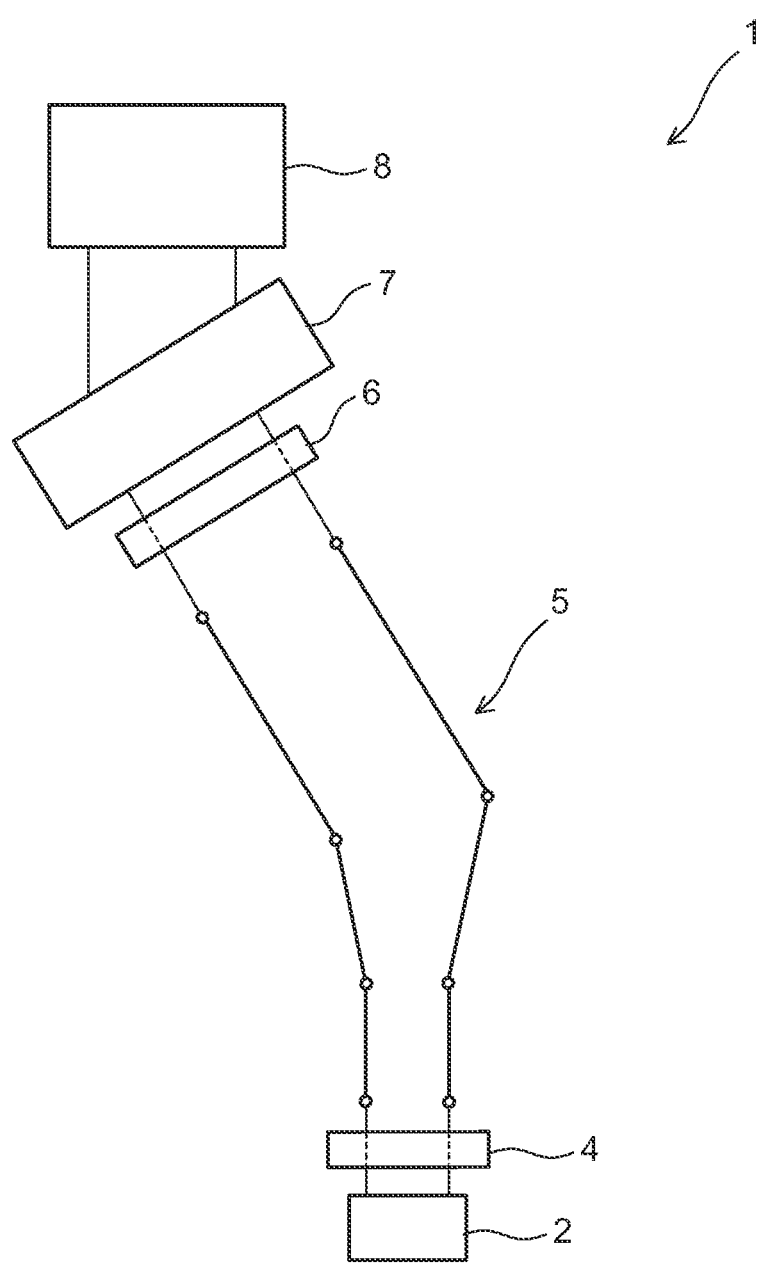
FIG. 3 is a plan view schematically showing yet another configuration of the above production system.

FIG. 1 is a plan view schematically showing an outline configuration of a stretched film production system 1. FIG. 2 is a plan view schematically showing another configuration of the production system 1, and FIG. 3 is a plan view schematically showing yet another configuration of the production system 1. As shown in FIG. 1, the production system 1 according to the embodiment is provided with, from the upstream side with respect to the transport direction of the long film, a film dispensing portion 2, a transport direction changing portion 3, a guide roll 4, a stretching portion 5, a guide roll 6, a transport direction changing portion 7, and a film winding portion 8. The stretching portion 5 is a long obliquely stretched film production apparatus according to the embodiment, and will be described in detail later.

The film dispensing portion 2 dispenses the long film described above as a target of stretching toward the stretching portion 5. The film dispensing portion 2 can be configured as a separate unit from, or can be configured integrally with, the long film formation apparatus. In the former case, the long film after film formation is first wound around a core into a roll (a full-width long film roll), which is then loaded on the film dispensing portion 2, so that the long film is dispensed from the film dispensing portion 2. On the other hand, in the latter case, the film dispensing portion 2 feeds the long film after film formation, without ever winding it up, to the stretching portion 5.

The transport direction changing portion 3 changes the transport direction of the long film dispensed from the film dispensing portion 2 to a direction toward the entrance of the stretching portion 5 as an oblique stretching tenter. The transport direction changing portion 3 is configured to include, for example, a turn bar which changes the transport direction by turning over the film while transporting it, and a rotary table which permits the turn bar to turn in a plane parallel to the film.

By changing the transport direction of the long film in the transport direction changing portion 3 as described above, it is possible to reduce the width of the production system 1 as a whole, and also to finely control the film dispensing position and angle, making it possible to produce a long stretched film with little variation in film thickness and optical values. By configuring the film dispensing portion 2 and the transport direction changing portion 3 to be movable (slidable, rotatable), it is possible to effectively prevent improper clamping of the film by left and right clips (holding members) which hold the film at both end portions in the width direction in the stretching portion 5.

The film dispensing portion 2 can be configured to be slidable and rotatable such that it can dispense the long film at a predetermined angle relative to the entrance of the stretching portion 5. In that case, as shown in FIGS. 2 and 3, the provision of the transport direction changing portion 3 can be omitted.

At least one guide roll 4 is provided on the upstream side of the stretching portion 5 to stabilize the path of the long film in motion. The guide roll 4 can be composed of a pair of upper and lower rolls sandwiching the film, or can be composed of a plurality of pairs of rolls. The guide roll 4 closest to the entrance of the stretching portion 5 is a follower roll which guides the motion of the film, and is rotatably pivoted on unillustrated bearings. As the material for the guide roll 4, any well-known material can be used. To prevent the film from being scratched, it is preferable to apply a ceramic coating on the surface of the guide roll 4, or to reduce the weight of the guide roll 4 as by using a light metal such as aluminum plated with chromium.

It is preferable that one of the rolls provided on the upstream side of the guide roll 4 closest to the entrance of the stretching portion 5 be brought in pressed contact with a rubber roll to form a nip. Such a nip roll helps suppress variation in the dispensing tension in the film flow direction.

At the pair of bearings at both (left and right) ends of the guide roll 4 closest to the entrance of the stretching portion 5, there are provided a first and a second tension detection device as film tension detection devices for detecting the tension occurring in the film at that roll. As the film tension detection devices, for example, load cells can be used. As load cells, well-known ones of a tension type or a compression type can be used. A load cell is a device that detects a load acting on a point of application by converting it into an electrical signal with a strain gauge fitted to a strain producing member.

Provided at the left and right bearings of the guide roll 4 closest to the entrance of the stretching portion 5, the load cells detect, at the left and right sides independently, the force that the film in motion acts on the roll, that is, the tension occurring near both side edges of the film in the film movement direction. The strain gauges can be fitted directly to the support member constituting the bearings of the roll such that, based on the strain occurring in the support member, the load, that is, the film tension, is detected. It is assumed that the relationship between the occurring strain and the film tension is previously measured and known.

When the position and the transport direction of the film fed from the film dispensing portion 2 or the transport direction changing portion 3 to the stretching portion 5 is deviated from the position and the transport direction toward the entrance of the stretching portion 5, in proportion to the amount of the deviation, a difference arises in the tension near both side edges of the film at the guide roll 4 closest to the entrance of the stretching portion 5. Thus, by detecting this difference in tension by the provision of the film tension detecting devices described above, it is possible to discriminate the degree of the deviation. That is, if the transport position and the transport direction of the film are proper (if they are the position and direction toward the entrance of the stretching portion 5), the load that acts on the guide roll 4 is roughly even at both ends in the axial direction; if they are not proper, a difference arises in the film tension between the left and right sides.

Thus, by appropriately adjusting the position and transport direction (the angle relative to the entrance of the stretching portion 5) of the film, for example, by means of the transport direction changing portion 3 described above such that the tension of the film is equal between the left and right sides at the guide roll 4 closest to the entrance of the stretching portion 5, it is possible to stabilize the holding of the film by the holding members at the entrance of the stretching portion 5, and to reduce the incidence of troubles such as unexpected release from the holding members. It is also possible to stabilize the physical properties in the width direction of the film after oblique stretching by the stretching portion 5.

At least one guide roll 6 is provided on the downstream side of the stretching portion 5 to stabilize the path of the film (long obliquely stretched film) in motion after oblique stretching by the stretching portion 5.

The transport direction changing portion 7 changes the transport direction of the film after stretching transported from the stretching portion 5 to a direction toward the film winding portion 8.

Here, to allow for fine adjustment of the orientation angle (the direction of the in-plane slow axis of the film) and product variation, it is necessary to adjust the angle between the film movement direction at the entrance of the stretching portion 5 and the film movement direction at the exit of the stretching portion 5. For this angle adjustment, it is necessary to change, by the transport direction changing portion 3, the movement direction of the film after film formation so as to direct the film to the entrance of the stretching portion 5, and/or to change, by the transport direction changing portion 7, the movement direction of the film having left the exit of the stretching portion 5 so as to direct the film back in the direction of the film winding portion 8.

It is preferable to perform film formation and oblique stretching continuously from the viewpoints of productivity and yield. In a case where the film formation step, the oblique stretching step, and the winding step are performed continuously, the movement direction of the film is changed by the transport direction changing portion 3 and/or the transport direction changing portion 7 such that the film movement direction is aligned between the film formation step and the winding step. That is, as shown in FIGS. 1 and 3, the movement direction (dispensing direction) of the film dispensed from the film dispensing portion 2 and the movement direction (winding direction) of the film immediately before being wound up in the film winding portion 8 are aligned with each other, and this helps reduce the width of the apparatus as a whole with respect to the film movement direction.

Incidentally, the film movement direction does not necessarily have to be aligned between the film formation step and the winding step. However, to obtain a layout where the film dispensing portion 2 and the film winding portion 8 do not interfere with each other, it is preferable to change the movement direction of the film by the transport direction changing portion 3 and/or the transport direction changing portion 7.

The transport direction changing portions 3 and 7 described above can be implemented by a well-known method, as by use of an air flow roll or an air turn bar.

The film winding portion 8 winds up the film transported from the stretching portion 5 via the transport direction changing portion 7, and is composed of a winder device, an accumulation device, a drive device, or the like. The film winding portion 8 is preferably so configured as to be slidable in the lateral direction to allow adjustment of the film winding position.

The film winding portion 8 is so configured as to allow fine control of the film drawing position and angle to permit the film to be drawn at a predetermined angle relative to the exit of the stretching portion 5. This makes it possible to obtain a long stretched film with little variation in film thickness and optical values. It is also possible to effectively prevent development of creases in the film, and to improve film windability, permitting a long film to be wound up. In the embodiment, the drawing tension T (N/m) is adjusted in the range 100 N/m<T<300 N/m, and preferably in the range 150 N/m<T<250 N/m.

With the above-mentioned drawing tension equal to or less than 100 N/m, sags and creases are likely to develop in the film, and also the retardation and the profile of the orientation angle in the film width direction are degraded. On the other hand, with the drawing tension equal to or more than 300 N/m, variation of the orientation angle in the film width direction is degraded, and thus the width yield (the production yield in the width direction) is degraded.

In the embodiment, it is preferable to control the variation of the above-mentioned drawing tension T with an accuracy of less than ±5%, and preferably less than ±3%. With the variation of the above-mentioned drawing tension T±5% or more, larger variation results in optical properties in the width direction and in the flow direction (transport direction). According to one method of controlling the variation of the above-mentioned drawing tension T within the above-mentioned ranges, the load acting on the first roll (guide roll 6) on the exit side of the stretching portion 5, that is, the film tension, is measured, and so that this may have a constant value, the rotation speed of the drawing roll (the winding roll in the film winding portion 8) is controlled by a commonly practiced PID control method. According to one example of a method of measuring the above-mentioned load, a load cell is fitted to a bearing of the guide roll 6, and the load that acts on the guide roll 6, that is, the tension of the film, is measured. As the load cell, a well-known one of a tension type or a compression type can be used.

The film after stretching is released from the holding by the holding members of the stretching portion 5, and is then discharged from the exit of the stretching portion 5. The both ends (at both sides) of the film, which have been held by the holding members, are then trimmed off, and the film is then continuously wound around a core (winding roll) into a roll of a long stretched film. The trimming can be performed as necessary.

Before the long stretched film is wound up, to prevent blocking of the film with itself, the long stretched film may be overlaid with a masking film so that the two are wound up together, or the winding may be performed while tape or the like is applied to at least one end (preferably, both ends) of the long stretched film which overlaps itself as the film is wound up. There is no particular restriction on the masking film so long as it can protect the long stretched film, examples including a polyethylene terephthalate film, a polyethylene film, and a polypropylene film.

(Details of the Stretching Portion)

Figure 4:
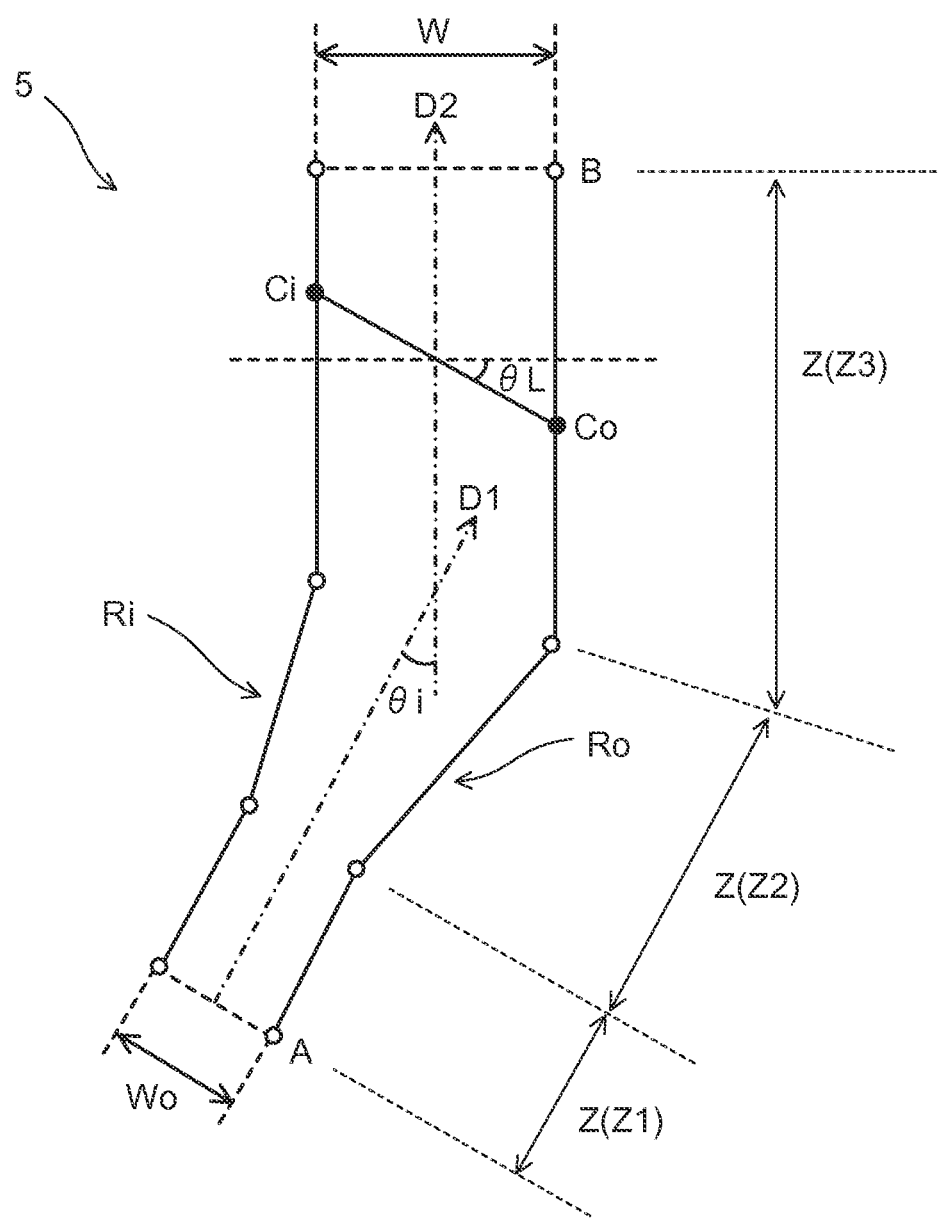
FIG. 4 is a plan view schematically showing an example of a rail pattern in a stretching portion in the above production system.

Next, the stretching portion 5 mentioned above will be described in detail. FIG. 4 is a plan view schematically showing an example of a rail pattern of the stretching portion 5. This is merely one example, and is not meant to limit the present invention in any way.

The production of a long stretched film according to the embodiment is performed by use of, as the stretching portion 5, a tenter (an oblique stretcher) capable of oblique stretching. The tenter is a device that heats the long film to an arbitrary temperature at which it can be stretched and that stretches it obliquely. The tenter is provided with a heating zone Z, a pair of left-hand and right-hand rails Ri and Ro, and a number of holding members Ci and Co which move along the rails Ri and Ro to transport the film (in FIG. 4, only one pair of holding members is illustrated). The heating zone Z will be described in detail later. The rails Ri and Ro are each composed of a plurality of rail segments coupled together by couplers (in FIG. 4, white circles represent an example of couplers). The holding members Ci and Co are composed of clips that hold both ends of the film in the width direction.

In FIG. 4, the dispensing direction D1 of the long film differs from the winding direction D2 of the long stretched film after stretching, and has a dispensing angle $\theta i$ relative to the winding direction D2. The dispensing angle $\theta i$ can be an arbitrary angle in the range more than 0° but less than 90°.

With the dispensing direction D1 and the winding direction D2 different as described above, the tenter has a rail pattern that is non-symmetrical left to right. The rail pattern can be adjusted manually or automatically according to the orientation angle $\theta$, the stretching factor, etc. to be given to the long stretched film to be produced. In the oblique stretcher used in a production method according to the embodiment, preferably, the positions of each of the rail segments and rail couplers constituting the rails Ri and Ro can be set freely so that the rail pattern can be changed freely.

In the embodiment, the holding members Ci and Co of the tenter are so configured as to move at constant speed while keeping constant intervals from those running ahead of and behind themselves. The movement speed of the holding members Ci and Co can be selected as desired, and is typically in the range of 1 to 150 m/minute, and preferably in the range of 15 to 150 m/minute. The difference in movement speed between the pair of left-hand and right-hand holding members Ci and Co is typically 1% or less, preferably 0.5% or less, and more preferably 0.1% or less. This is because, if there is a difference in movement speed between the left and right sides at the exit of the stretching step, creaks develop and siding occurs at the exit of the stretching step, and therefore the speed of the left and right holding members needs to be substantially equal. In common tenter devices and the like, speed variation of the order of a second or less occurs according to the cycle of the cogs of a sprocket for driving a chain, the frequency of the driving motor, etc., and this often produces variation of several %. This, however, does not correspond to what is referred to as a difference in speed in the embodiment of the present invention.

In the oblique stretcher used in a production method according to the embodiment, in particular at a location where the film is transported obliquely, the rails, which restrict the loci of the holding members, are often required to have a large curvature. With a view to preventing interference of holding members with one another due to a sharp bend and preventing local concentration of stress, it is preferable that, in the bent portion, the loci of the holding members describe curves.

As described above, it is preferable that an oblique stretching tenter used to give a long film an oblique orientation be one that can set the orientation angle of the film freely by varying the rail pattern in many ways, that can align the orientation axis (slow axis) of the film evenly between the left and right sides over the entire film width direction with high accuracy, and that in addition can control film thickness and retardation with high accuracy.

Next, stretching operation in the stretching portion 5 will be described. The long film is held at both ends thereof by the left and right holding members Ci and Co, and is transported through the heating zone Z as the holding members Ci and Co move. The left and right holding members Ci and Co are located in an entrance portion of the stretching portion 5 (at position A in the drawing), opposite each other in a direction substantially perpendicular to the film movement direction (dispensing direction D1); move on the rails Ri and Ro respectively, which are non-symmetrical left to right; and release the film, which they have been holding, in an exit portion (position B in the drawing) where stretching ends. The film released from the holding members Ci and Co is wound up around a core in the above-described film winding portion 8. The paired rails Ri and Ro each have an endless continuous track, and thus the holding members Ci and Co having released the film in the exit portion of the tenter then move along outer rails and return to the entrance portion successively.

Here, since the rails Ri and Ro are non-symmetrical left to right, in the example shown in FIG. 4, as the left and right holding members Ci and Co, which are located opposite each other at position A in the diagram, move along the rails Ri and Ro, the holding member Ci moving along the rail Ri comes to run ahead of the holding member Co moving along the rail Ro.

Specifically, of the holding members Ci and Co, which are located opposite each other in a direction substantially perpendicular to the dispensing film direction D1 at position A in the drawing, one holding member Ci reaches position B first, at which time point the straight line through the holding members Ci and Co is inclined at angle $\theta L$ relative to a direction substantially perpendicular to the film winding direction D2. With this behavior, the long film is stretched obliquely at an angle of $\theta L$ relative to the width direction. Here, "substantially perpendicular" denotes being at an angle in the range of 90±1°.

Next, the heating zone Z mentioned above will be described in detail. The heating zone Z of the stretching portion 5 is composed of a plurality of zones that are arranged one next to the other along the transport direction of the film (a long film or a stretched film) and where temperature control is performed for heating or cooling the film. In this embodiment, the heating zone Z has a preheating zone Z1, a stretching zone Z2, and a heat-fixing zone Z3. In this embodiment, a heating portion for heating the vicinity of the film is provided in the stretching zone Z2 and/or in the heat-fixing zone Z3, and the position of the heating region of this heating portion can be adjusted by an adjustment mechanism. This will be described later. In the stretching portion 5, the film held by the holding members Ci and Co passes through the preheating zone Z1, the stretching zone Z2, and the heat-fixing zone Z3 in this order.

The preheating zone Z1 is a zone located in an entrance portion of the heating zone Z where the holding members Ci and Co holding both ends of the film move while keeping a constant interval left to right (in the film width direction).

The stretching zone Z2 is a zone where the interval between the holding members Ci and Co holding both ends of the film widens until it becomes equal to a predetermined interval. Meanwhile, oblique stretching as described above is performed; as necessary, before or after oblique stretching, longitudinal or lateral stretching may also be performed.

The heat-fixing zone Z3 is a zone following the stretching zone Z2 where the interval between the holding members Ci and Co is constant again and where the holding members Ci and Co at both ends move parallel to each other.

Incidentally, the film after stretching may, after passing through the heat-fixing zone Z3, further pass through a zone (cooling zone) the temperature inside which is set to be equal to or less than the glass transition temperature Tg (° C.) of the thermoplastic resin forming the film. Here, shrinkage due to cooling may be taken into consideration by adopting a rail pattern that previously narrows the interval between the opposite holding members Ci and Co.

With respect to the glass transition temperature Tg of the thermoplastic resin, it is preferable to set the temperature in the preheating zone Z1 in the range of Tg to Tg+30° C., the temperature in the stretching zone Z2 in the range of Tg to Tg+30° C., and the temperature in the heat-fixing zone Z3 in the range of Tg−30 to Tg° C.

To control film thickness unevenness in the width direction, in the stretching zone Z2, a temperature difference may be introduced in the width direction. To introduce a temperature difference in the width direction in the stretching zone Z2, it is possible to use well-known methods such as one in which nozzles for blowing heated wind into the thermostatic chamber are opened to different degrees in the width direction, and one in which heating is controlled with heaters arranged side by side in the width direction. The lengths of the preheating zone Z1, the stretching zone Z2, and the heat-fixing zone Z3 are selected arbitrarily. With respect to the length of the stretching zone Z2, the length of the preheating zone Z1 is typically 100 to 150% and the length of the heat-fixing zone Z3 is typically 50 to 100%.

Let the width of the film before stretching be Wo (mm) and the width of the film after stretching be W (mm), then the stretching factor R (W/Wo) in the stretching step is preferably 1.3 to 3.0, and more preferably 1.5 to 2.8. With the stretching factor within these ranges, thickness unevenness in the width direction of the film is advantageously small. In the stretching zone Z2 of the oblique stretching tenter, introducing a difference in the stretching temperature in the width direction makes it possible to more satisfactorily suppress width-direction thickness unevenness. Incidentally, the above-mentioned stretching factor R is equal to the factor (W2/W1) by which the interval W1 between the clips at both ends when starting to hold in the entrance portion of the tenter widens to the interval W2 in the exit portion of the tenter.

<Quality of a Long Stretched Film>

In a long stretched film obtained by a production method according to the embodiment, it is preferable that the orientation angle θ be inclined, for example, in the range of more than 0° but less than 90° relative to the winding direction, and that, in the width direction, over a width of at least 1300 mm, the variation of the in-plane retardation Ro be 2 nm or less and the variation of the orientation angle θ be 0.5° or less.

That is, in a long stretched film obtained by a production method according to the embodiment, it is preferable that the variation of the in-plane retardation Ro be, over at least 1300 mm in the width direction, 2 nm or less, and preferably 1 nm or less. By controlling the variation of the in-plane retardation Ro within the above-mentioned range, when a long stretched film is bonded to a polarizer to form a circular polarizing plate and this is applied to an organic EL image display device, it is possible to suppress unevenness in the amount of reflected light due to leakage of reflected external light during display of black. Also, when a long stretched film is used, for example, as a phase-difference film in a liquid crystal display device, it is possible to obtain satisfactory display quality.

In a long stretched film obtained by a production method according to the embodiment, it is preferable that the variation of the orientation angle θ be, over at least 1300 mm in the width direction, 0.5° or less, preferably 0.3° or less, and particularly preferably 0.1° or less. When a long stretched film with a variation more than 0.5° in the orientation angle θ is bonded to a polarizer to form a circular polarizing pate and this is installed in an image display device such as an organic EL image display device, light leakage occurs, possibly leading to lowered contrast between bright and dim.

For the in-plane retardation Ro of a long stretched film obtained by a production method according to the embodiment, an optimum value is selected according to the design of the display device in which it is used. Incidentally, Ro has the value calculated by taking the difference between the refractive index nx in the in-plane slow axis direction and the refractive index ny in a direction perpendicular to the slow axis in the plane and then multiplying the difference by the average thickness d of the film, that is, $(Ro=(nx-ny) \times d)$.

The average thickness of a long stretched film obtained by a production method according to the embodiment is, from the viewpoints of mechanical strength etc., preferably 10 to 80 μm, more preferably 15 to 60 μm, and particularly preferably 20 to 50 μm. The width-direction thickness unevenness in the long stretched film, since this affects windability, is preferably 3 μm or less, and more preferably 2 μm or less.

<Circular Polarizing Plate>

In a circular polarizing plate according to the embodiment, a polarizing plate protection film, a polarizer, and a λ/4 phase-difference film are stacked in this order, and the angle between the slow axis of the λ/4 phase-difference film and the absorption axis (or transmission axis) of the polarizer is 45°. The just-mentioned polarizing plate protection film, polarizer, and λ/4 phase-difference film correspond respectively to a protection film 313, a polarizer 312, and a λ/4 phase-difference film 311 in FIG. 5. In the embodiment, it is preferable that a long film as a polarizing plate protection film, a long film as a polarizer, and a long film as a λ/4 phase-difference film (long stretched film) are formed by being stacked in this order.

In a circular polarizing plate according to the embodiment, used as the polarizer is one produced by stretching polyvinyl alcohol doped with iodine or a dichroic dye, and it can be produced in a form bonded in the structure (λ/4 phase-difference film)/(polarizer). The polarizer has a film thickness in the range of 5 to 40 μm, preferably 5 to 30 μm, and particularly preferably 5 to 20 μm.

The polarizer can be produced by a common method. It is preferable that an alkali-saponified λ/4 phase-difference film be bonded, by use of a water solution of fully saponified polyvinyl alcohol, to one side of a polarizer produced by immersion-stretching a polyvinyl alcohol film in an iodine solution.

The polarizing plate can further be formed by bonding a releasable film on the side of the polarizer opposite from the polarizing plate protection film. The protection film and the releasable film are used for the purpose of protecting the polarizing plate during product inspection, shipment, etc. of the polarizing plate.

<Organic EL Image Display Device>

Figure 5:
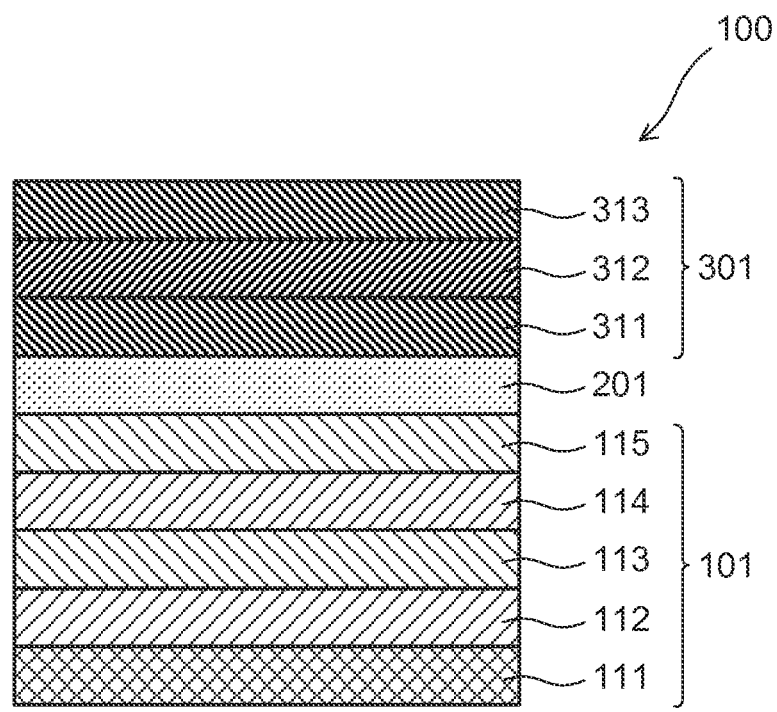
FIG. 5 is a sectional view showing an outline configuration of an organic EL image display device according to the above embodiment.

FIG. 5 is a sectional view showing an outline configuration of an organic EL image display device 100 according to the embodiment. This, however, is not meant to limit the configuration of the organic EL image display device 100.

The organic EL image display device 100 is formed by forming a circular polarizing plate 301 on top of an organic EL element 101 via an adhesive layer 201. The organic EL element 101 is formed by forming a metal electrode 112, a light emission layer 113, a transparent electrode (such as ITO) 114, and a sealing layer 115 in this order on top of a substrate 111 of glass, polyimide, or the like. The metal electrode 112 may be composed of a reflective electrode and a transparent electrode.

The circular polarizing plate 301 is composed of a λ/4 phase difference plate 311, a polarizer 312, and a protection film 313 stacked in this order from the organic EL element 101 side, and the polarizer 312 is held between the λ/4 phase difference plate 311 and the protection film 313. The circular polarizing plate 301 is built by bonding together the polarizer 312 and the λ/4 phase difference plate 311 formed of the long stretched film of the embodiment such that the angle between the transmission axis of the former and the slow axis of the latter equals 45° (or 135°).

It is preferable that a hardening layer be stacked on the protection film 313. The hardening layer not only prevents scratches on the surface of the organic EL image display device but also prevents warping ascribable to the circular polarizing plate 301. A reflection prevention layer may be formed further on the hardening layer. The organic EL element 101 itself has a thickness of about 1 μm.

In the configuration described above, when a voltage is applied to the metal electrode 112 and the transparent electrode 114, electrons and holes are injected into the light emission layer 113 from whichever of the metal electrode 112 and the transparent electrode 114 act as a cathode and an anode respectively. In the light emission layer 113, the electrons and the holes recombine to cause light emission of visible light corresponding to the light emission characteristics of the light emission layer 113. The light produced in the light emission layer 113 is directly, or after being reflected on the metal electrode 112, extracted via the transparent electrode 114 and the circular polarizing plate 301.

In general, in an organic EL image display device, on a transparent substrate, a metal electrode, a light emission layer, and a transparent electrode are stacked in this order to form an element (organic EL element) as a light-emitting body. Here, the light emission layer is a stack of various organic thin films, and as such stacks, various combinations are known, including, for example a stack of a hole injection layer of a triphenylamine derivative or the like and a light emission layer of a fluorescent organic solid such as anthracene, a stack of such a light emission layer and an electron injection layer of a perylene derivative, and a stack of such a hole injection layer, a light emission layer, and an electron injection layer.

An organic EL image display device emits light according to the following principle: applying a voltage to the transparent electrode and the metal electrode causes holes and electrons to be injected into the light emission layer; the energy produced as the holes and the electrons recombine excites a fluorescent substance; the excited fluorescent substance radiates light while returning to the ground state. Here, the mechanism of recombination is the same as in common diodes, and as will be expected from this fact, the current and the light emission intensity exhibit, with respect to the applied voltage, a marked non-linearity accompanied by a rectifying property.

In an organic EL image display device, to allow extraction of light from the light emission layer, at least one electrode needs to be transparent, and typically a transparent electrode formed of a transparent electrically conductive material such as indium tin oxide (ITO) is used for the anode. On the other hand, to facilitate electron injection and increase light emission efficiency, it is advisable to use for the cathode a substance with a small work function, and typically a metal electrode of Mg—Ag, Al—Li, or the like is used.

In an organic EL image display device configured as described above, the light emission layer is formed as a very thin film with a thickness of about 10 nm. Thus, the light emission layer, like the transparent electrode, fully transmits light. As a result, when no light is being emitted, the light that enters through the front side of the transparent substrate is transmitted through the transparent electrode and the light emission layer and is then reflected from the metal electrode to exit back to the front side of the transparent substrate. Thus, when viewed from the outside, the display surface of the organic EL image display device appears to be a mirror surface.

A circular polarizing plate according to the embodiment is suitable in an organic EL image display device where such reflection of external light particularly poses a problem.

Specifically, when the organic EL element 101 is not emitting light, the external light, such as of indoor lighting, that enters the organic EL element 101 is half absorbed by the polarizer 312 of the circular polarizing plate 301, and is half transmitted as linear polarized light to enter the λ/4 phase difference plate 311. The light that has entered the λ/4 phase difference plate 311 is, by being transmitted through the λ/4 phase difference plate 311, converted into circular polarized light owing to the polarizer 312 and the λ/4 phase difference plate 311 being arranged such that the transmission axis of the former and the slow axis of the latter intersect each other at 45° (or 135°).

The circular polarized light that has exited from the λ/4 phase difference plate 311 is, when reflected on the mirror surface of the metal electrode 112, converted to have a 180 degrees inverted phase, and is thus reflected as circular polarized light of the opposite rotation. The reflected light is, by entering the λ/4 phase difference plate 311, converted into linear polarized light perpendicular to the transmission axis (parallel to the absorption axis) of the polarizer 312, and is thus totally absorbed by the polarizer 312 so as not to emerge outside. Thus, the circular polarizing plate 301 can reduce reflection of external light on the organic EL element 101.

<Details of the Heating Portion and the Adjustment Mechanism>

Next, the heating portion and the adjustment mechanism provided in the heating zone Z of the stretching portion 5 described above will be described in detail. The following description deals with an example where the adjustment mechanism adjusts a later-described intersection angle φ of the heating region in a fashion coordinated with movement of a partition wall that partitions the heating zone Z. However, the adjustment mechanism may instead be so configured as to adjust the intersection angle φ without coordination with (independently of) movement of the partition wall.

Figure 6:
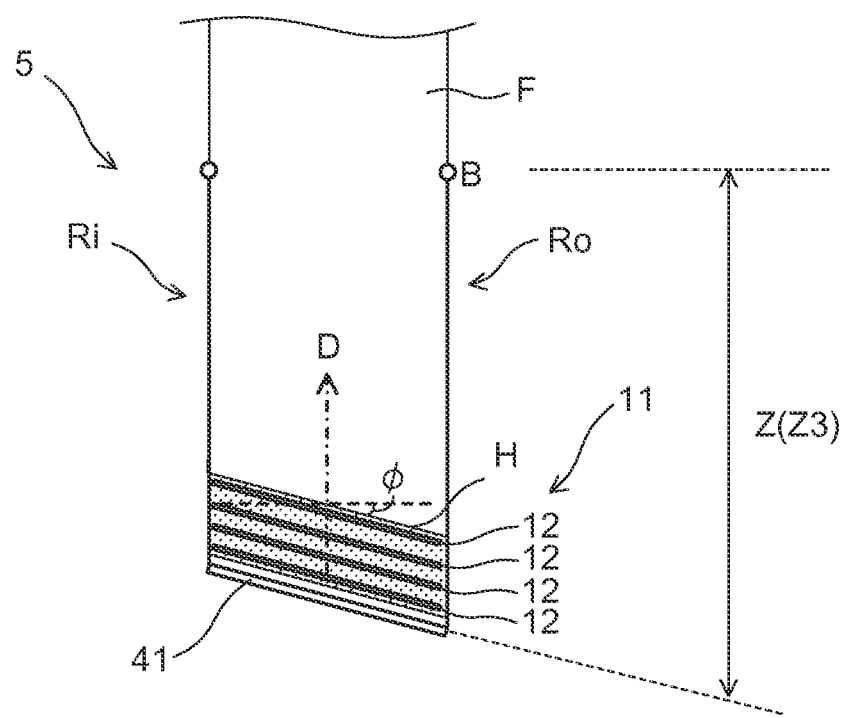
FIG. 6 is a plan view showing a configuration of a heating portion provided in the above stretching portion.

FIG. 6 is a plan view showing a configuration of a heating portion 11 in this embodiment. In this embodiment, a heating portion 11 that heats the transported film F (here, a film after stretching) in a planar region is provided in the heat-fixing zone Z3. In the following description, this planar region is referred to as a heating region H. The heating region H is located to face the transported film F (the surface of the film F), and is located along a direction intersecting the transport direction D at an intersection angle φ (°) in the plane of the film F. The intersection angle φ is an angle larger than 0° but smaller than 90° relative to the transport direction D of the film F.

In this embodiment, the heating region H is formed to be planar, for example, by arranging four stick-form lamp heaters 12 side by side (parallel to one another) in the transport direction D of the film F so as to face the transported film F, with the length direction of the lamp heaters 12 running in a direction intersecting the transport direction D of the film F at the intersection angle φ. The number of lamp heaters 12 forming the heating region H is not limited to four as just mentioned; with at least one lamp heater, the heating region H can be formed. Used as the lamp heaters 12 are, for example, halogen lamps that emit light (electromagnetic waves) in an infrared region.

The heating portion 11 is located, with respect to the transport direction of the film F, on the downstream side of, and immediately behind, a partition wall 41 that partitions between two zones consecutive in the transport direction D of the film F. In this embodiment, the heating portion 11 is arranged in the heat-fixing zone Z3, and thus is located immediately behind (on the downstream side of) a partition wall 41 that partitions between the stretching zone Z2 and the heat-fixing zone Z3. A position immediately behind a partition wall 41 denotes a position where the film F transported from the stretching zone Z2 to the heat-fixing zone Z3 through a later-described gap t (see FIG. 7) in the partition wall 41 can be heated as soon as it enters the heat-fixing zone Z3. The distance between the heating portion 11 and the partition wall 41 can be set according to the heating capacity (wattage), size, etc. of the lamp heaters 12. One possible purpose of heating by the heating portion 11 in the heat-fixing zone Z3 is to alleviate a sharp change (drop) in temperature resulting from the air inside the stretching zone Z2 being drawn into the heat-fixing zone Z3.

Figure 7:
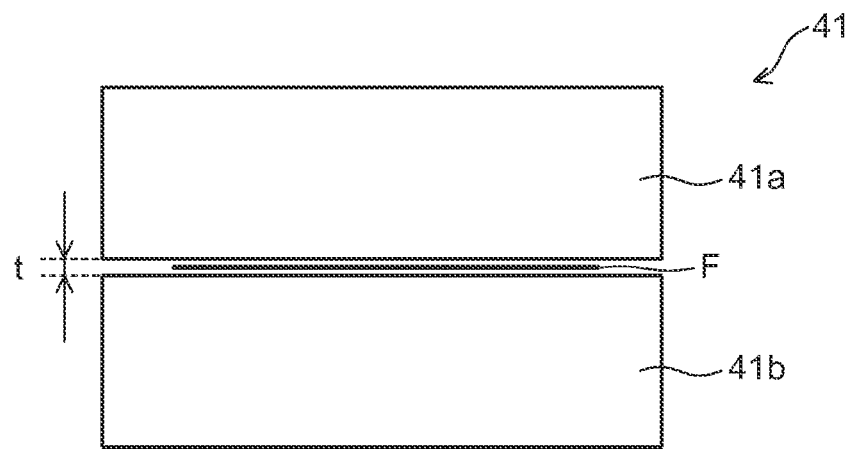
FIG. 7 is a front view of a partition wall partitioning between neighboring zones in the above stretching portion, as seen from a downstream side with respect to a film transport direction.

FIG. 7 is a front view of the partition wall 41 as seen from the downstream side with respect to the transport direction of the film F. The partition wall 41 is formed by arranging two partition portions 41a and 41b side by side in the up/down direction (the direction perpendicular to the surface of the film F) with a gap t left in between, the gap t being such that the film F can pass therethrough. The gap t can be changed by adjusting the positions of the two partition portions 41a and 41b in the up/down direction according to the thickness of the film F.

The partition wall 41 can also be moved according to the orientation direction of the film F. For example, in a case where the orientation direction of the film F stretched in the heat-fixing zone Z3 forms an angle of 15° relative to the transport direction D (the orientation angle θ=15°), the partition wall 41 rotates such that it too is inclined at an angle of 15° relative to the transport direction D (see FIG. 12). Likewise, in a case where the orientation direction of the film F forms an angle of 45° relative to the transport direction D (the orientation angle θ=45°), the partition wall 41 rotates such that it too is inclined at an angle of 45° relative to the transport direction D (see FIG. 13). That is, the partition wall 41 moves such that it is substantially parallel to the orientation direction of the stretched film F. Here, "substantially parallel" implies not only the partition wall 41 being precisely parallel to the orientation direction but the partition wall 41 intersecting the orientation direction at an angle within the range of ±10° (preferably, ±5°).

Owing to the partition wall 41 being movable according to the orientation direction of the film F, it is possible to control the temperature of the film F by forming a zone space suitable for each film F having a different orientation direction. In particular, owing to the partition wall 41 being movable so as to be parallel to the orientation direction of the film F, no crossing between two consecutive zones occurs in the orientation direction. This helps suppress an uneven temperature distribution in the orientation direction in the heat-fixing zone Z3.

Figure 8:
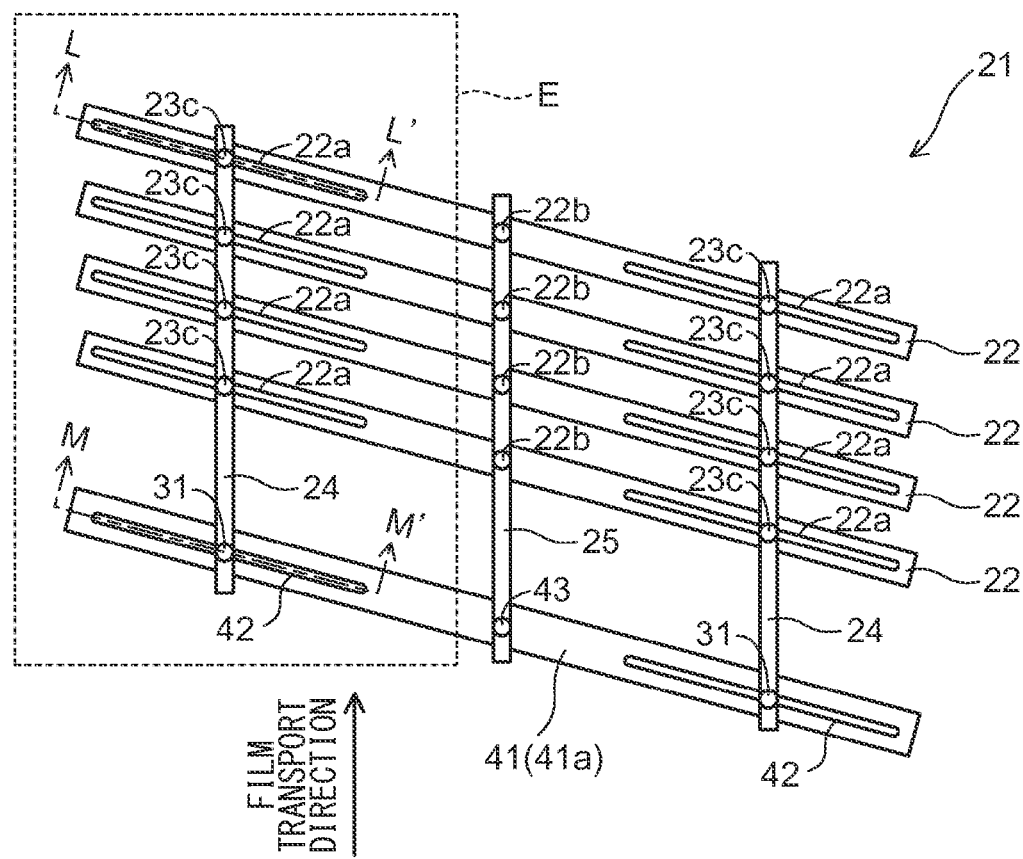
FIG. 8 is a plan view showing an outline configuration of an adjustment mechanism provided in the above stretching portion.
Figure 9:
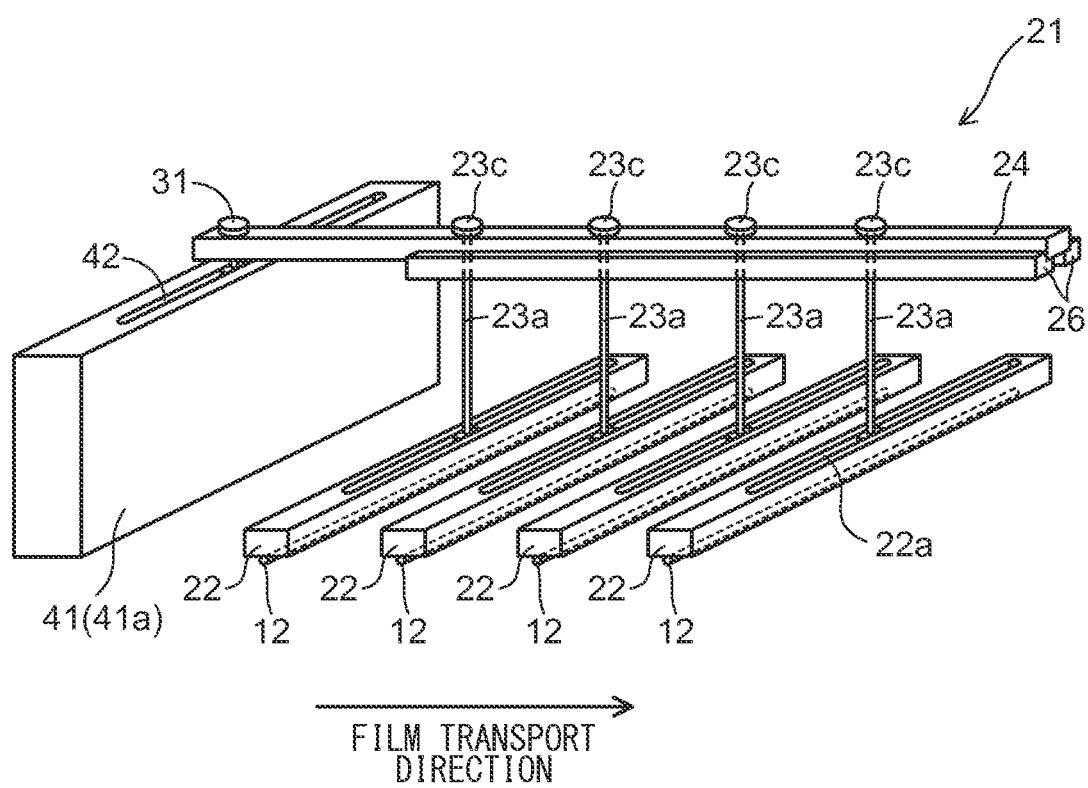
FIG. 9 is a perspective view of part E in FIG. 8.
Figure 10:
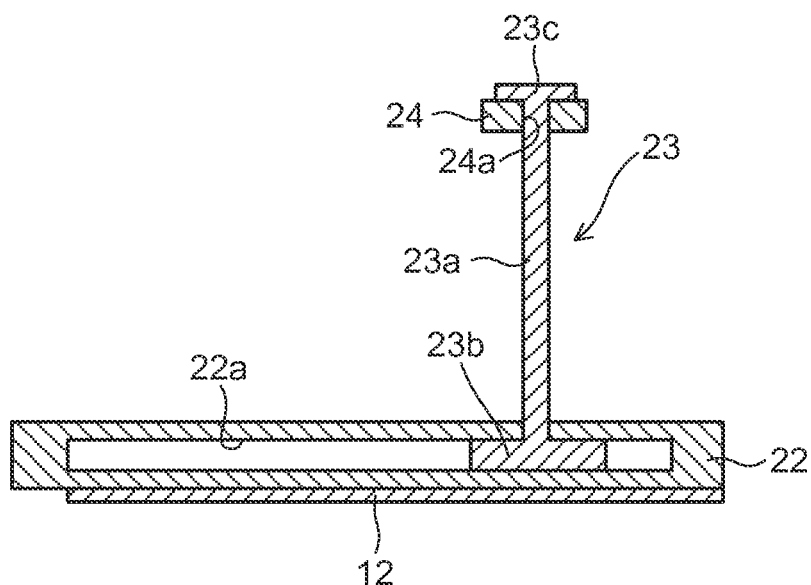
FIG. 10 is a sectional view along line L-L' in FIG. 8, as seen from the direction indicated by arrows.
Figure 11:
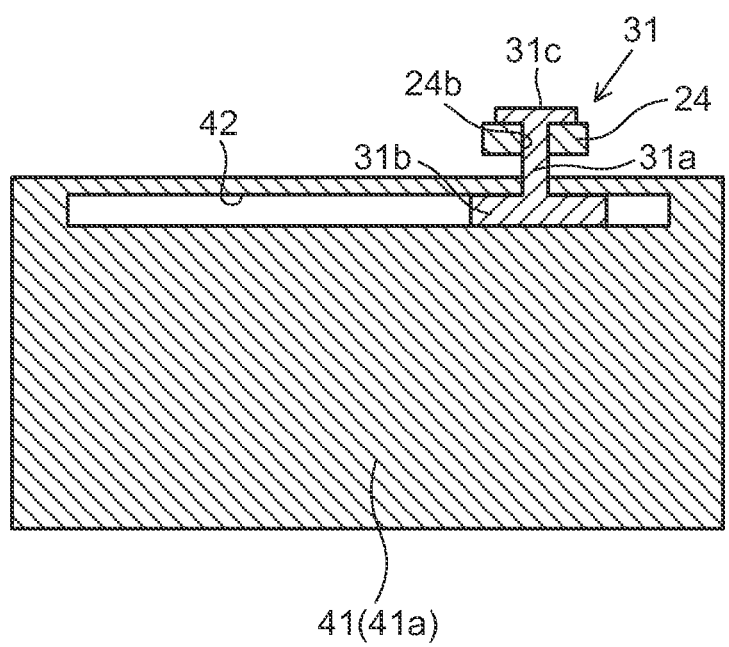
FIG. 11 is a sectional view along line M-M' in FIG. 8, as seen from the direction indicated by arrows.

Next, the adjustment mechanism will be described. FIG. 8 is a plan view showing an outline configuration of an adjustment mechanism 21 provided in the stretching portion 5, and FIG. 9 is a perspective view of part E in FIG. 8. FIG. 10 is a sectional view along line L-L' in FIG. 8 as seen from the direction indicated by arrows, and FIG. 11 is a sectional view along line M-M' in FIG. 8 as seen from the direction indicated by arrows. The adjustment mechanism 21 is a mechanism for adjusting the above-mentioned intersection angle φ of the heating region H according to the orientation direction of the film F stretched in the stretching zone Z2. The adjustment mechanism 21 has support members 22, suspension elements 23, and support elements 24 and 25.

The support member 22 supports a lamp heater 12, and is formed in the shape of a beam elongate in the direction in which the stick-form lamp heater 12 extends. The four lamp heaters 12 are fitted to, and supported on, the bottom faces of the corresponding support members 22 via fitting elements (not shown). In a top portion of the support member 22, on each side of a central portion thereof in the elongate direction, a groove 22a is provided in which a larger-diameter portion 23b (see FIG. 10) of a suspension element 23 is slidably fitted. The groove 22a is so formed that its opening width in the direction perpendicular to the elongate direction is smaller than the width of the larger-diameter portion 23b, and this prevents the larger-diameter portion 23b from popping out of the groove 22a. One end of the groove 22a in the elongate direction may be left open, so that at that end the larger-diameter portion 23b of the suspension element 23 is removably fitted into the groove 22a.

The suspension element 23 permits a support member 22 to suspend from a support element 24. A suspension element 23 is provided on each side of a central portion of a support member 22 in the elongate direction. The suspension element 23 is composed of a rod-shaped element 23a having larger-diameter portions 23b and 23c coupled to both ends thereof. The rod-shaped element 23a penetrates the support element 24 in the up/down direction. The larger-diameter portion 23b is located in one (lower) end portion of the rod-shaped element 23a, in a state fitted in the groove 22a of the support member 22. The larger-diameter portion 23c is provided in the other (upper) end portion of the rod-shaped element 23a, in contact with the top face of the support element 24. The larger-diameter portion 23c has a larger diameter than a through hole 24a in the support element 24 for the rod-shaped element 23a, and this prevents the suspension element 23 from slipping out of the support element 24.

The support elements 24 support the suspension elements 23 corresponding to the individual support members 22, and are formed, one on each side of central portions of the support members 22 in the elongate direction, in an elongate shape extending in the transport direction of the film F. Each support element 24 is slidable in the transport direction along guide elements 26 extending in the transport direction. The guide elements 26 are provided so as not to interfere with the suspension elements 23.

The support elements 24 are each coupled to the partition wall 41 via a fastener 31. In a top portion of the partition wall 41, at each side in the direction along the support members 22, a groove 42 is provided in which a larger-diameter portion 31b (see FIG. 11) of the fastener 31 is fitted so as to be slidable in the elongate direction. The opening width of the groove 42 in the direction perpendicular to the elongate direction is made smaller than the width of the larger-diameter portion 31b, and this prevents the larger-diameter portion 31b from popping out of the groove 42. One end of the groove 42 may be left open, so that at that end the larger-diameter portion 31b of the fastener 31 is removably fitted in the groove 42.

The fastener 31 is composed of a rod-shaped element 31a having larger-diameter portions 31b and 31c coupled to both ends thereof. The rod-shaped element 31a penetrates the support element 24. The larger-diameter portion 31b is located in one (lower) end portion of the rod-shaped element 31a, in a state fitted in the groove 42 in the partition wall 41. The larger-diameter portion 31c is provided in the other (upper) end portion of the rod-shaped element 31a, in contact with the top face of the support element 24. The larger-diameter portion 31c has a larger diameter than a through hole 24b in the support element 24 for the rod-shaped element 31a, and this prevents the fastener 31 from slipping out of the support element 24.

The support element 25 is located between, and parallel to, the support elements 24 and 24 at both sides, and is coupled to support members 22 via rotation pivot portions 22b respectively. The rotation pivot portion 22b serves as an axis about which the support member 22 rotates in the plane along the film F, and is provided in a central portion of the support member 22 in the elongate direction so as to penetrate the support element 25. In an end portion of the rotation pivot portion 22b closer to the support element 25, a retainer may be provided that prevents the rotation pivot portion 22b from slipping out of the support element 25. The support element 25 is coupled to the partition wall 41 via a rotation pivot portion 43. The rotation pivot portion 43 serves as a pivot about which the partition wall 41 rotates.

In the stretching portion 5 described above, when the film F is transported into the heat-fixing zone Z3, the heating portion 11 heats the film F (a heating step). At this time, the adjustment mechanism 21 adjusts the intersection angle φ of the heating region H of the heating portion 11 according to the orientation direction of the film F stretched in the stretching zone Z2 (an adjusting step). This will be described specifically below.

Figure 12:
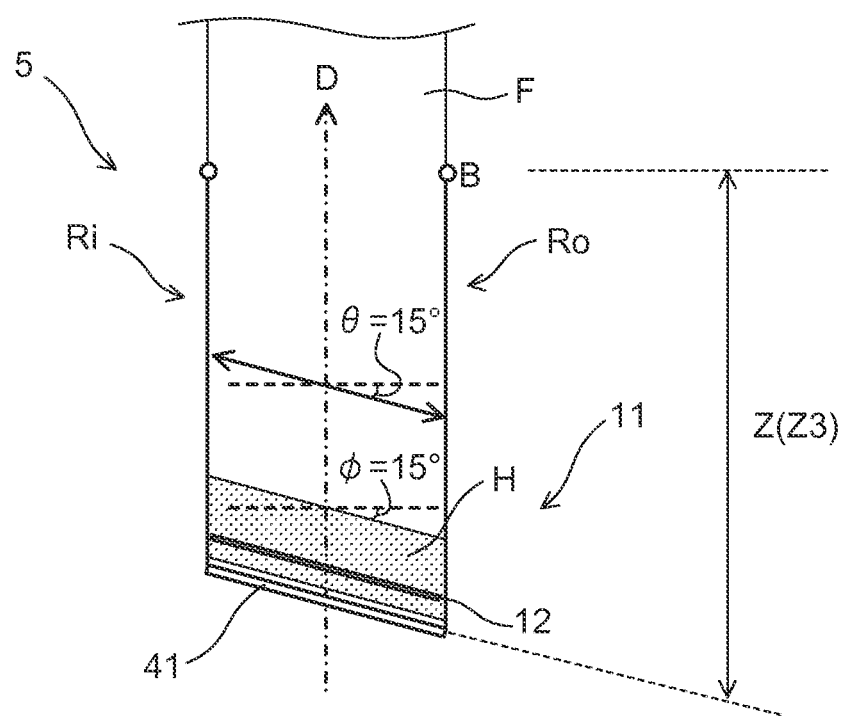
FIG. 12 is an explanatory diagram schematically showing a heating region in the above heating portion as observed when the orientation angle θ of a stretched film equals 15°.

FIG. 12 shows the heating region H as observed when the orientation angle θ of the stretched film F equals 15°, that is, when the orientation angle of the slow axis of the film F forms an angle of 15° relative to the width direction. In FIG. 12, for convenience' sake, only one lamp heater 12 is shown as constituting the heating region H of the heating portion 11 (the other lamp heaters 12 are omitted from illustration). When the orientation angle of the film F equals 15° in this way, the partition wall 41 moves, by the action of an unillustrated driving mechanism, so as to be substantially parallel to the orientation direction of the film F as described above. That is, the partition wall 41 rotates so as to form an angle of 15° relative to the width direction of the film F.

Then, as the partition wall 41 so moves, as shown in FIG. 8, the support element 24 located at one side in the width direction of the partition wall 41 is, via the fastener 31 at one side, pushed downstream with respect to the transport direction of the film F, and slides in that direction (downstream with respect to the transport direction) along the guide elements 26. On the other hand, the support element 24 located at the other side in the width direction of the partition wall 41 is, via the fastener 31 at the other side, pushed upstream with respect to the transport direction of the film F, and slides in that direction (upstream with respect to the transport direction) along the guide elements 26. Consequently, an external force acts, in the same direction as the partition wall 41 rotates, on the individual support members 22 via the respective suspension elements 23, and thus the support members 22, along with the lamp heaters 12, rotate about the rotation axis portions 22b through the same angle as the partition wall 41. As a result, the intersection angle φ of the heating region H becomes equal to the orientation angle θ, namely 15°.

Figure 13:
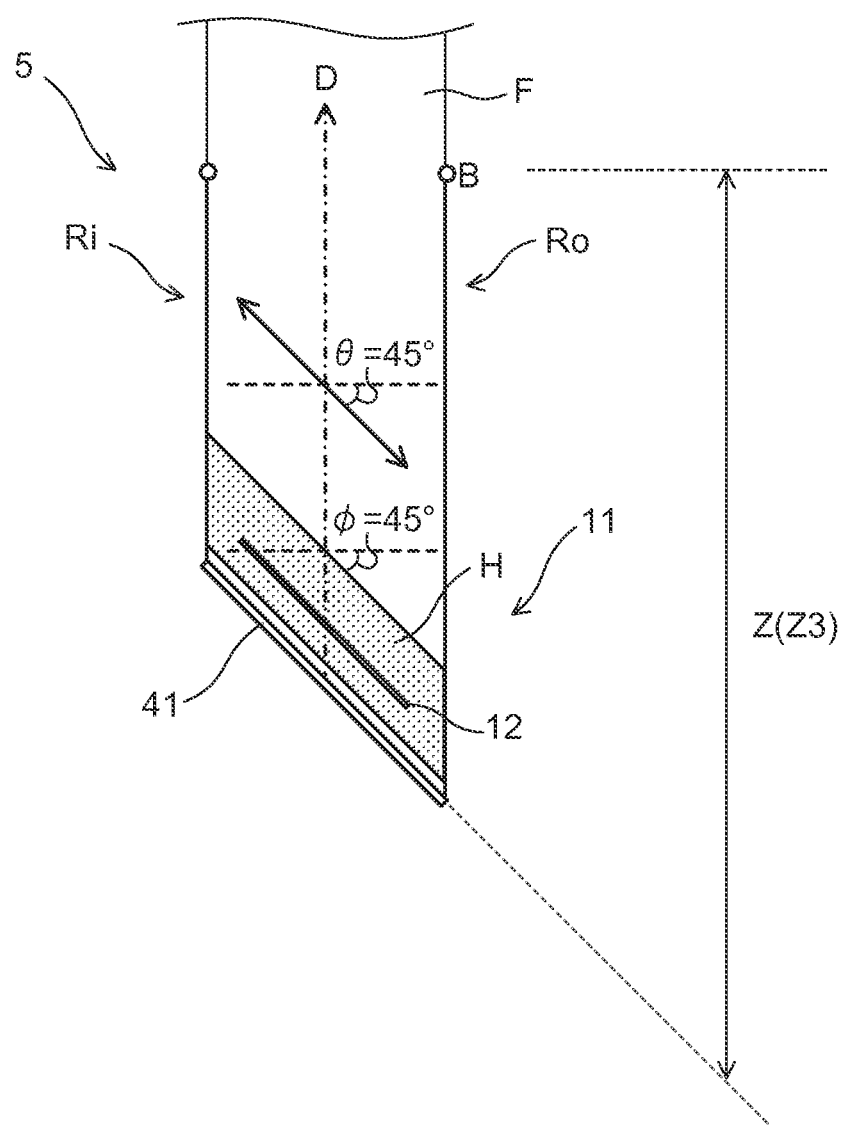
FIG. 13 is an explanatory diagram schematically showing a heating region in the above heating portion as observed when the orientation angle θ of a stretched film equals 45°.

FIG. 13 shows the heating region H as observed when the orientation angle θ of the stretched film F equals 45°, that is, when the orientation angle of the slow axis of the film F forms an angle of 45° relative to the width direction. When the orientation angle of the film F equals 45° in this way, the partition wall 41 moves, by the action of an unillustrated driving mechanism, so as to be substantially parallel to the orientation direction of the film F as described above. That is, the partition wall 41 rotates so as to form an angle of 45° relative to the width direction of the film F.

Figure 14:
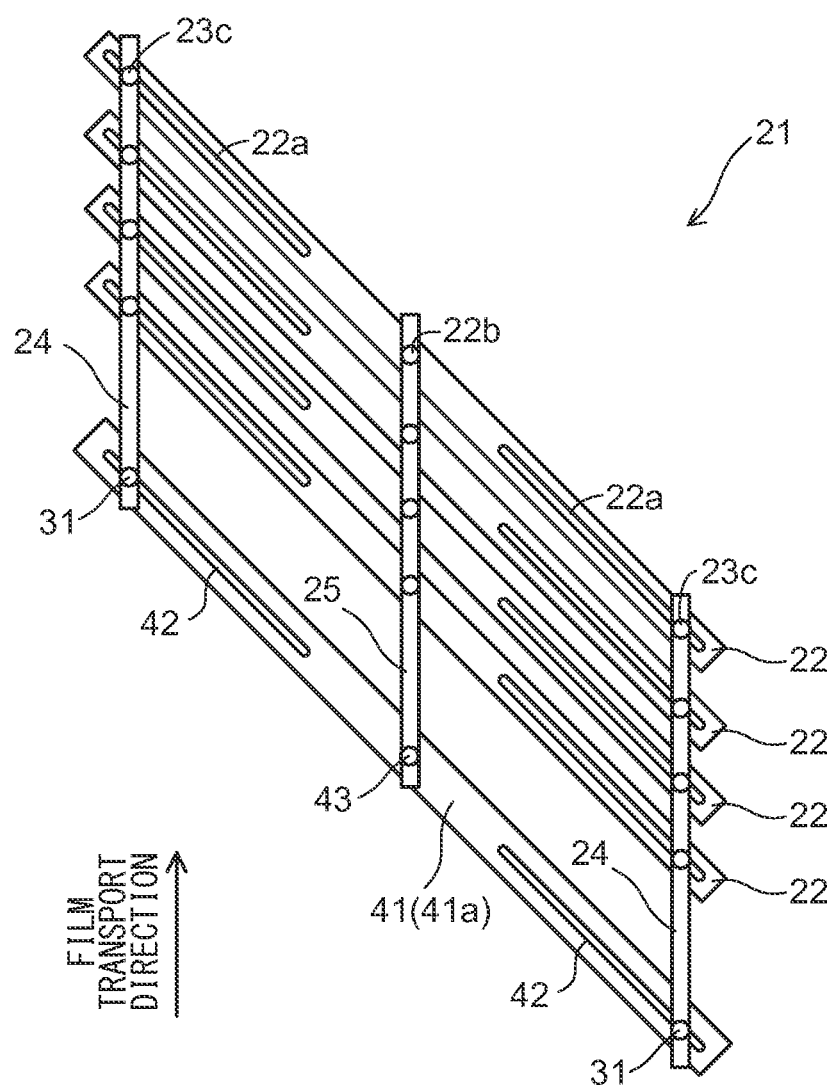
FIG. 14 is a plan view showing a state of the above adjustment mechanism as observed when the orientation angle θ of a stretched film equals 45°.

FIG. 14 is a plan view showing the state of the adjustment mechanism 21 when the orientation angle θ of the film F equals 45°. As the partition wall 41 moves as described above, the support element 24 located at one side in the width direction of the partition wall 41 is, via the fastener 31 at one side, pushed further downstream with respect to the transport direction of the film F, and slides further in that direction. On the other hand, the support element 24 located at the other side in the width direction of the partition wall 41 is, via the fastener 31 at the other side, pushed further upstream with respect to the transport direction of the film F, and slides further in that direction. Consequently, while the suspension elements 23 slide outward in the elongate direction inside the grooves 22a in the support members 22, the support members 22, along with the lamp heaters 12, rotate about the rotation axis portions 22b through the same angle as the partition wall 41. As a result, the intersection angle φ of the heating region H becomes equal to the orientation angle θ, namely 45°.

As described above, owing to the heating portion 11 being arranged to face the transported film F inside the heat-fixing zone Z3 in the stretching portion 5, the film F can be heated in the vicinity thereof by the heating portion 11. Thus, even in a case where the film F is transported at high speed, it is possible to suppress unevenness in temperature in the vicinity of the film F resulting from the air inside the stretching zone Z2 being drawn into the downstream-side heat-fixing zone Z3 as the film F is transported. It is thus possible to suppress variations in optical values (such as orientation angle and retardation Ro) of the film F due to such unevenness in temperature.

In addition, the adjustment mechanism 21 adjusts the intersection angle φ of the heating region H according to the orientation angle of the stretched film F. Thus, even in a case where each film F has a different orientation angle, the intersection angle φ can be adjusted to suit each film F so that the film F is heated evenly in the orientation direction by the heating portion 11. Thus, even in a case where the film F (stretched film) is produced at high speed, it is possible, for each film F having a different orientation direction, to suppress variations in optical values of the film F and produce a film having satisfactory optical properties. As a result, even when an obliquely stretched film F is applied to a circular polarizing plate for external light reflection prevention in a large-screen organic EL image display device, it is possible to suppress unevenness in the amount of reflected external light during display of black.

In particular, in this embodiment, as described above, the intersection angle φ of the heating region H is adjusted to be equal to the orientation angle θ of the film F by the adjustment mechanism 21, so that the orientation direction of the stretched film F is parallel to the intersection direction of the heating region H relative to the transport direction D of the film F. Thus, the film F can be heated reliably evenly in the orientation direction by the heating region H. Incidentally, this effect can be obtained when the orientation direction of the stretched film F is substantially parallel to the intersection direction of the heating region H relative to the transport direction D of the film F. Here, "substantially parallel" implies not only the orientation direction being precisely parallel to the intersection direction but one intersecting the other at an angle in the range of ±10° (preferably, ±5°).

Moreover, in this embodiment, the adjustment mechanism 21 adjusts the intersection angle φ of the heating region H in a fashion coordinated with the operation of the partition wall 41 moving (rotating) according to the orientation direction of the stretched film F. This eliminates the need to control the movement of the partition wall 41 and the adjustment of the intersection angle φ independently, and thus facilitates the control for heating the film F.

Moreover, the heating portion 11 is located immediately behind (on the downstream side of) the partition wall 41, and thus as soon as the film F advances from an upstream-side zone (for example, the stretching zone Z2) to a downstream-side zone (for example, the heat-fixing zone Z3), the film F can be heated immediately. It is thus possible to reliably suppress unevenness in temperature in the vicinity of the film F resulting from the air inside an upstream-side zone being drawn into a downstream-side zone as the film F is transported, and thereby to reliably suppress variations in optical values of the film F.

Moreover, the heating region H in the heating portion 11 is formed by arranging at least one stick-form lamp heater 12 along a direction intersecting the transport direction D of the film F at the intersection angle φ. By arranging the lamp heater 12 in that way, it is possible to easily realize a heating region H that is formed so as to extend in a desired direction (in a direction intersecting the transport direction D at the intersection angle φ).

Moreover, in this embodiment, the stretching portion 5 is so configured that, in the stretching zone Z2, both width-direction end portions of a film (a long film) is held with the holding members Ci and Co and, while the holding members Ci and Co are moved, the film is transported and meanwhile the transport direction of the film is changed, thereby to stretch the film in a direction oblique to the width direction. In a case where a film is obliquely stretched by such a method, variation in the orientation angle tends to occur in the width direction. In particular, when the transport speed of the film is relatively high, as in the range from 15 m/min. to 150 m/min., due to the air inside an upstream-side zone being drawn into a downstream-side zone as the film is transported, unevenness in temperature is likely to occur in the vicinity of the film, and variation in the orientation angle as mentioned above more tends to occur. Thus, the configuration of this embodiment, which can suppress variations in optical values resulting from unevenness in temperature during high-speed transport, is extremely effective when oblique stretching is performed by the above-mentioned method, and is particularly effective when the film is transported at a speed in the above-mentioned range.

Incidentally, the configuration of the stretching portion 5 is not limited to one involving oblique stretching by the above-mentioned method, and can instead be one involving simultaneous two-axis stretching as disclosed in JP-A-2008-23775. Simultaneous two-axis stretching is a method in which both width-direction end portions of a dispensed long film are held with holding members; while the holding members are moved, the long film is transported; while the transport direction of the long film is kept constant, the movement speed of one holding member is made different from the movement speed of the other, and thereby the long film is stretched in an oblique direction with respect to the width direction. Also where the stretching portion 5 is configured to achieve oblique stretching by such simultaneous two-axis stretching, by applying the heating portion 11 and the adjustment mechanism 21 described above, it is possible to obtain the effect of the embodiment. Also in a configuration where stretching is performed as disclosed in JP-A-2011-11434, by applying the heating portion 11 and the adjustment mechanism 21 described above, it is possible to obtain the effect of the embodiment.

<Other Configurations of the Heating Portion>

Figure 15:
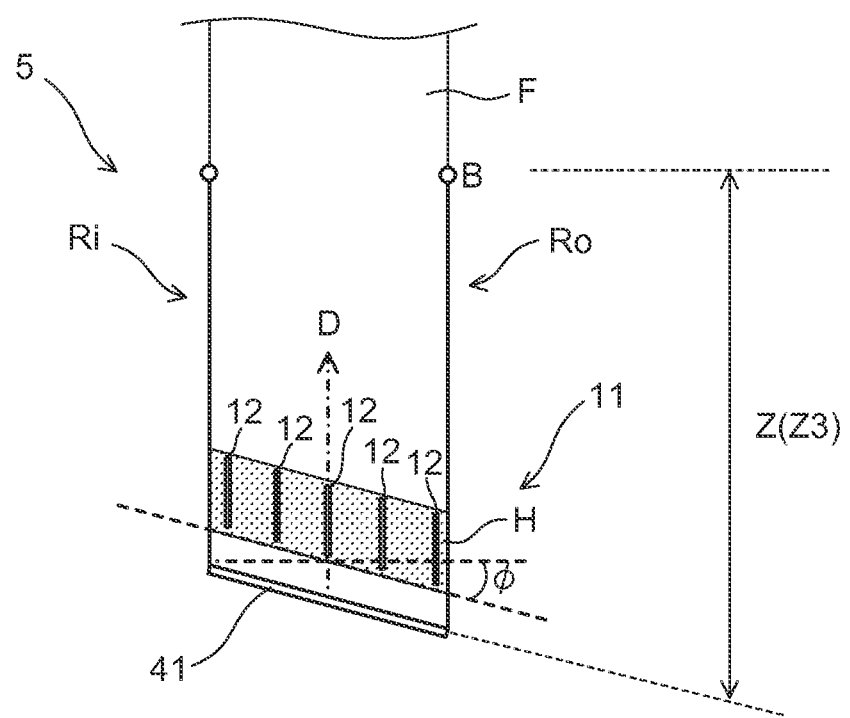
FIG. 15 is a plan view showing another configuration of the above heating portion.

FIG. 15 is a plan view showing another configuration of the heating portion 11. As shown there, the heating region H of the heating portion 11 may instead be formed by arranging a plurality of stick-form lamp heaters 12 (for example, five of them as shown) side by side (in the width direction of the film) such that their elongate direction runs along the transport direction D of the film F and in addition that the line through the (upstream-side) ends of at least two lamp heaters 12 runs along a direction intersecting the transport direction D of the film F at the intersection angle φ. Also by arranging a plurality of lamp heaters 12 in this way, it is possible to realize a heating region H that is formed so as to extend in a desired direction (in a direction intersecting the transport direction at the intersection angle φ).

Figure 16:
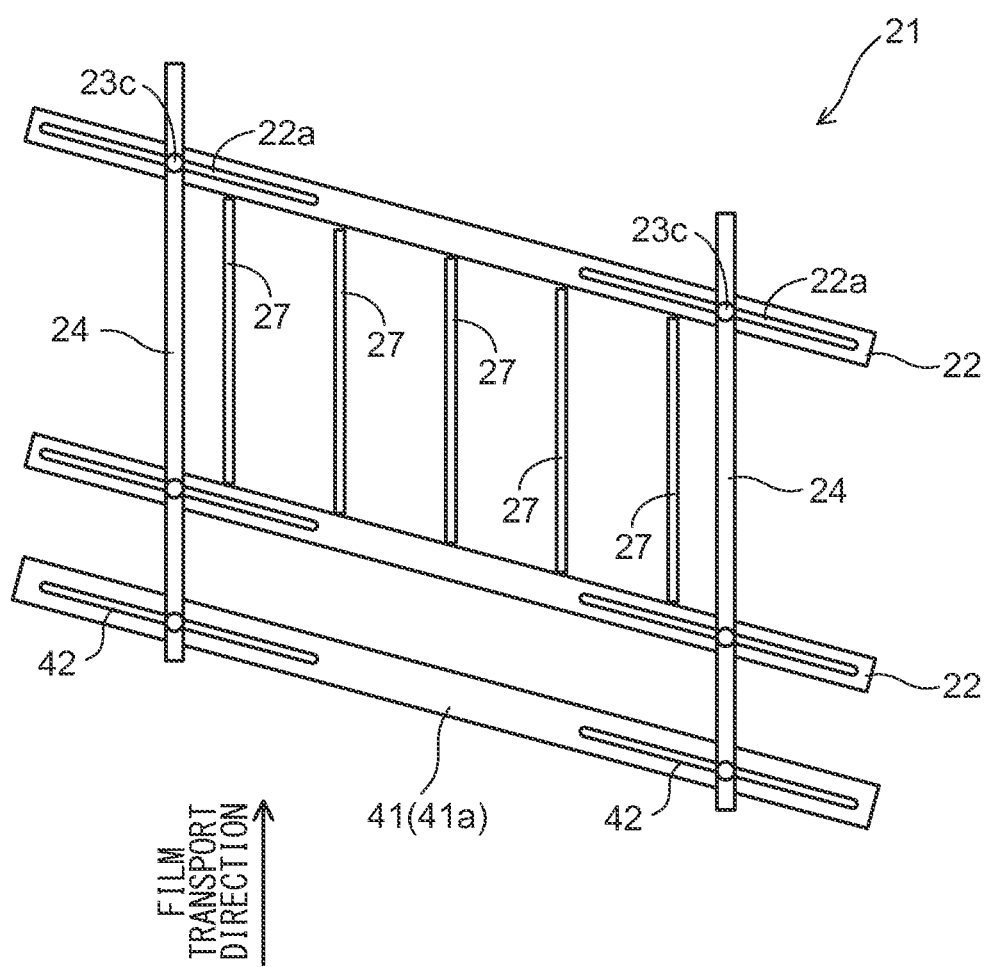
FIG. 16 is a plan view of an adjustment mechanism for adjusting an intersection angle of a heating region of the heating portion in FIG. 15 as observed when the intersection angle equals 15°.
Figure 17:
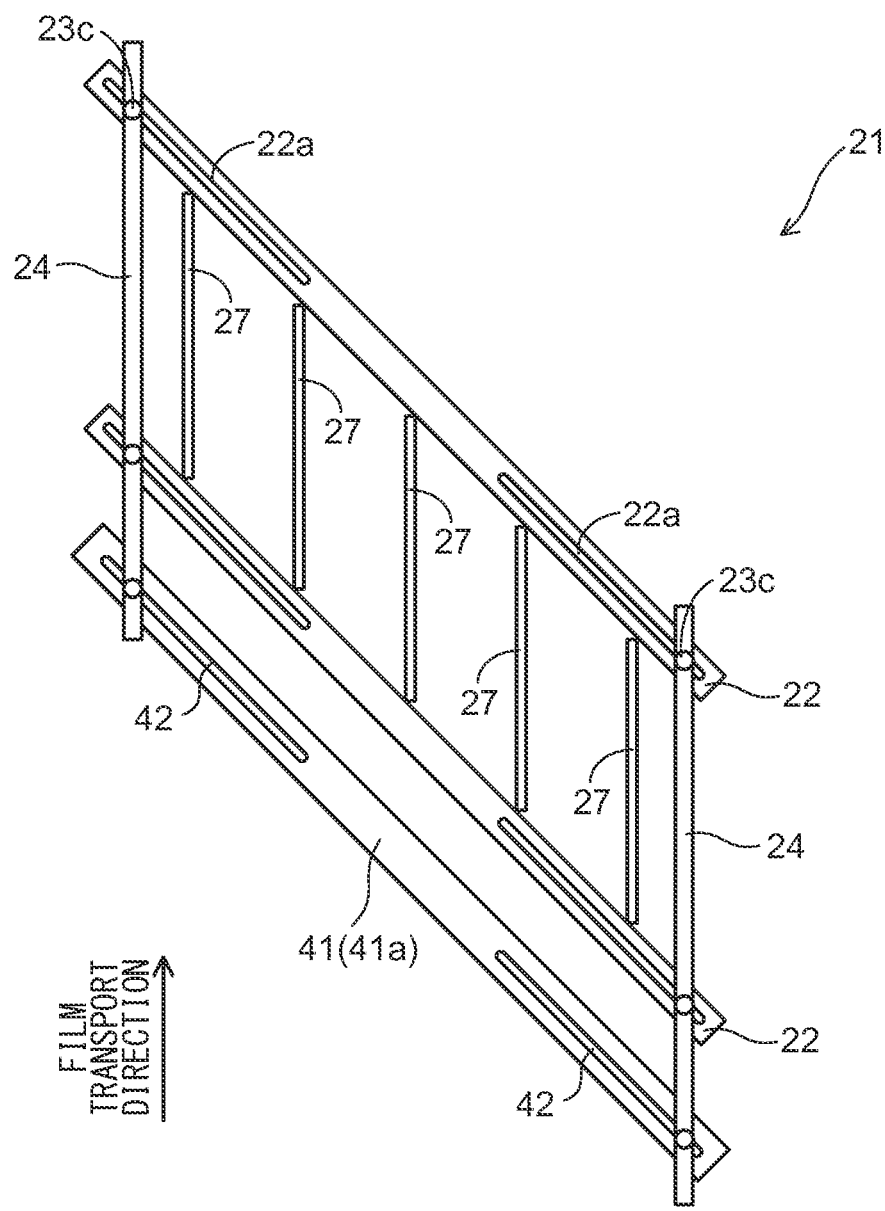
FIG. 17 is a plan view of the above adjustment mechanism as observed when the intersection angle equals 45°.

FIGS. 16 and 17 are plan views of the adjustment mechanism 21 for adjusting the intersection angle φ of the heating region H, FIG. 16 showing a case where the intersection angle φ equals 15° and FIG. 17 showing a case where the intersection angle φ equals 45°. Here, as distinct from in the configuration shown in FIG. 8, the adjustment mechanism 21 has, between two support members 22 arranged side by side in the transport direction of the film F, slide elements 27 which slide in the transport direction while supporting lamp heaters 12. Each slide element 27 is formed in a shape elongate in the transport direction, and its ends make contact with at least one of the support members 22. Each slide element 27 is guided by an unillustrated guide element so as to slide in the transport direction.

With this configuration, as the support members 22 rotate, the slide elements 27 slide in the transport direction, and hence the lamp heaters 12 supported on the slide elements 27 slide in the transport direction. Thus, with the adjustment mechanism 21 configured as described above, it is possible to adjust the intersection angle φ of the heating region H according to the orientation direction of the film F.

Figure 18:
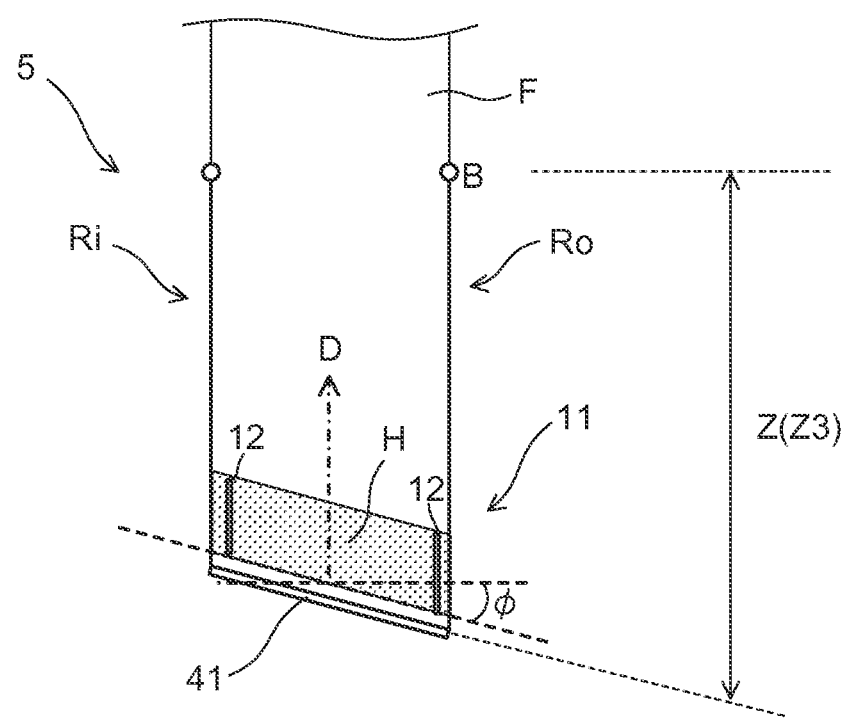
FIG. 18 is a plan view showing yet another configuration of the above heating portion.
Figure 19:
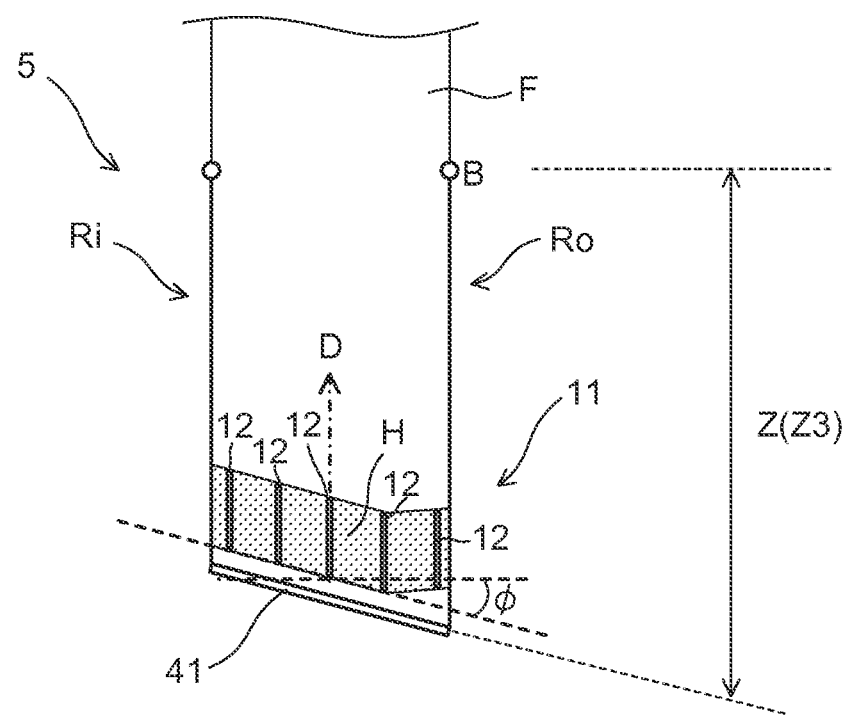
FIG. 19 is a plan view showing still another configuration of the above heating portion.

FIGS. 18 and 19 are plan views showing yet another configuration of the heating portion 11. In a case where the heating region H is formed by arranging a plurality of lamp heaters 12 side by side such that their elongate direction runs along the transport direction D of the film F, so long as the line through one ends of the lamp heaters 12 runs along a direction intersecting the transport direction D of the film F at the intersection angle $\phi$, the number of lamp heaters 12 used may be two as shown in FIG. 18. In this case, the two lamp heaters 12 can be placed anywhere in the width direction of the film F. It is also possible, as shown in FIG. 19, to form the heating region H by arranging three or more lamp heaters 12 such that the line through one ends of part of, but not the rest of, the lamp heaters 12 runs along a direction intersecting the transport direction D of the film F at the intersection angle $\phi$. Also in these cases, by adjusting the intersection angle $\phi$ of the heating region H such that it equals the orientation angle $\theta$ of the film F, it is possible to heat the film F substantially along the orientation direction by the heating region H.

Figure 20:
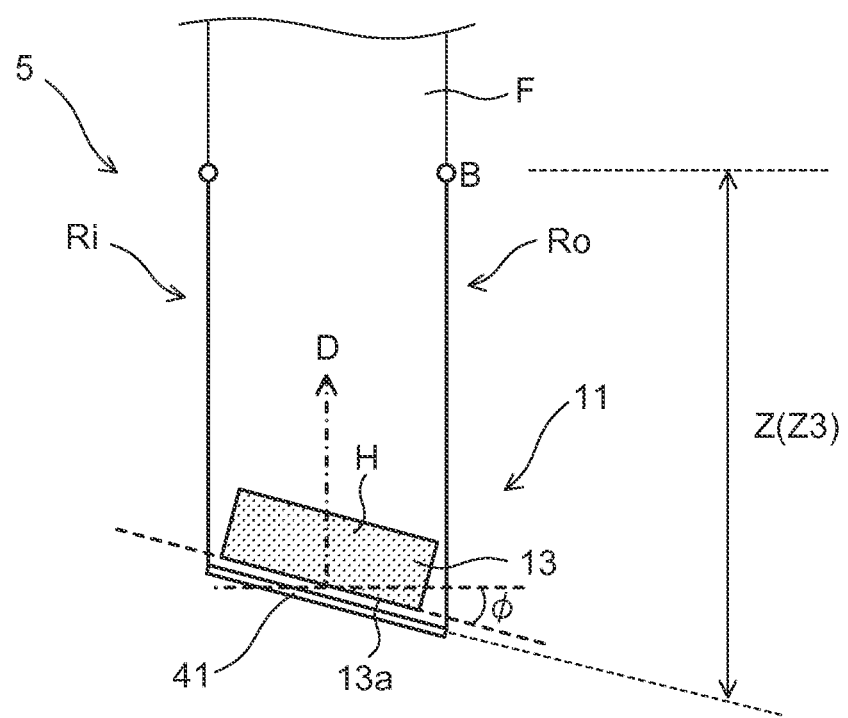
FIG. 20 is a plan view showing still another configuration of the above heating portion.

FIG. 20 is a plan view showing still another configuration of the heating portion 11. As shown there, the heating region H of the heating portion 11 may be formed by arranging a panel heater 13 such that a side edge 13a thereof runs along a direction intersecting the transport direction of the film F at the intersection angle $\phi$. The panel heater 13 has a rectangular panel surface which emits electromagnetic waves, and the size of the panel surface itself defines the size of the heating region H. The side edge 13a can well be considered a side edge of the panel surface. By arranging the panel heater 13 in this way, it is possible to realize a heating region H that is located along a direction intersecting the transport direction D at the intersection angle $\phi$.

In this case, as the adjustment mechanism 21, the adjustment mechanism 21 shown in FIG. 8 is so modified that it has one support member 22 and this support member 22 supports the bottom face of the panel heater 13; in that way, it is possible to obtain an adjustment mechanism 21 for adjusting the intersection angle $\phi$ of the heating region H.

Figure 21:
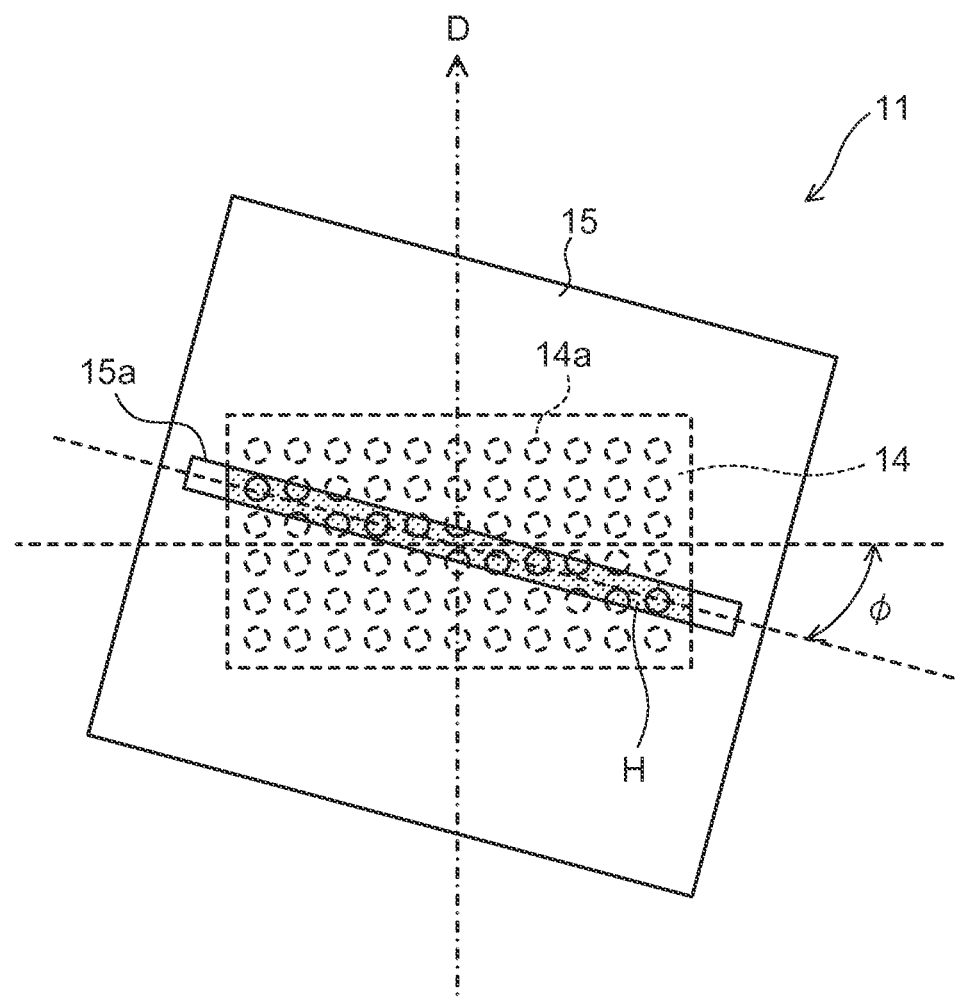
FIG. 21 is a plan view showing still another configuration of the above heating portion in a state where the intersection angle of the heating region equals 15°.

FIG. 21 is a plan view showing a further configuration of the heating portion 11. As shown there, the heating portion 11 may be configured to have a punched plate nozzle 14 and a wind shield plate 15. The punched plate nozzle 14 is a nozzle in which a plurality of blowout holes 14a are formed (arranged) two-dimensionally to blow out hot air therethrough. The punched plate nozzle 14 is located under the transported film F, and heats the film F in its vicinity by applying hot air from beneath. The punched plate nozzle 14 may instead be located over the film F so that it heats the film F in its vicinity by applying hot air from above.

The wind shield plate 15 has an opening 15a extending in one direction, and is provided on the blowout hole 14a side of the punched plate nozzle 14 such that it shields, in a region other than the opening 15a, part of the hot air blown out through the plurality of blowout hole 14a. Thus, only the hot air that is blown out through the blowout holes 14a in the punched plate nozzle 14 and passes through the opening 15a in the wind shield plate 15 strikes and heats the film F. That is, in this configuration, the overlap region between the region where the blowout holes 14a of the blowout hole 14a are formed and the region where the opening 15a of the wind shield plate 15 is formed constitutes the heating region H. Accordingly, by arranging the wind shield plate 15 such that the above-mentioned one direction in which the opening 15a extends runs along a direction intersecting the transport direction of the film F at the intersection angle $\phi$, it is possible to realize a heating region H that extends in the intersection direction. Incidentally, FIG. 21 shows a case where the intersection angle of the heating region H equals 15°.

The intersection angle $\phi$ of this heating region H can be adjusted by rotating the wind shield plate 15 in a plane parallel to the film F with the adjustment mechanism 21. To enable the adjustment mechanism 21 to rotate the wind shield plate 15, the adjustment mechanism 21 can be configured, for example, as described below.

Specifically, in the adjustment mechanism 21 shown in FIG. 8, the wind shield plate 15 is, in a region other than the opening 15a, supported on the bottom face of at least one support member 22. The suspension elements 23 at both sides of the support member 22 are located outward of the transported film F in the width direction, and the support member 22 is suspended from the support element 24 via the suspension elements 23 such that the support member 22 and the wind shield plate 15 are located between the transported film F and the punched plate nozzle 14.

Figure 22:
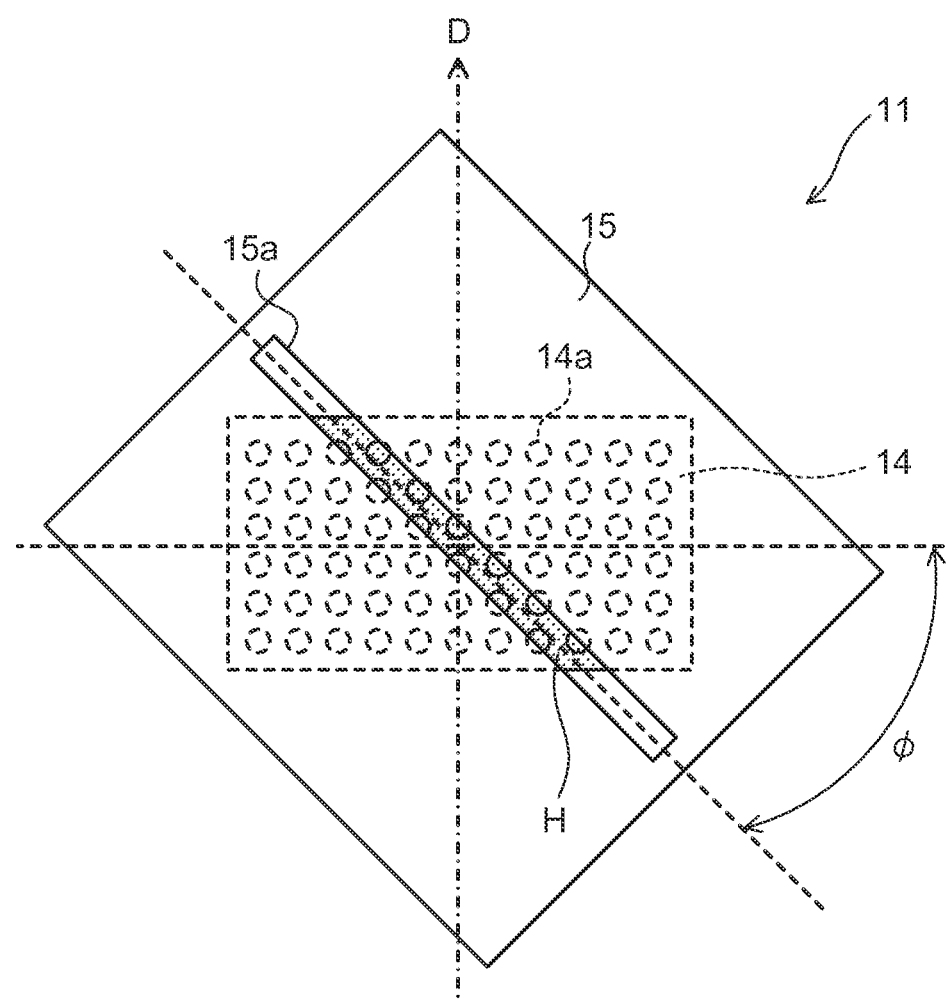
FIG. 22 is a plan view showing the heating portion in FIG. 21 in a state where the intersection angle of the heating region equals 45°.

With the adjustment mechanism 21 configured as described above, when, in a fashion coordinated with the movement of the partition wall 41, the support element 24 applies an external force in the rotation direction to the support member 22 via the suspension elements 23, the support member 22, and hence the wind shield plate 15 along with it, rotates in a plane parallel to the film F. Thus, for example, in a case where the orientation angle of the film F equals 45°, the wind shield plate 15 can be rotated such that the intersection angle $\phi$ equals 45° as shown in FIG. 22. In this way, also with a configuration using a punched plate nozzle 14 and a wind shield plate 15, it is possible to adjust the intersection angle $\phi$ of the heating region H by rotating the wind shield plate 15 according to the orientation angle of the film F.

Figure 23:
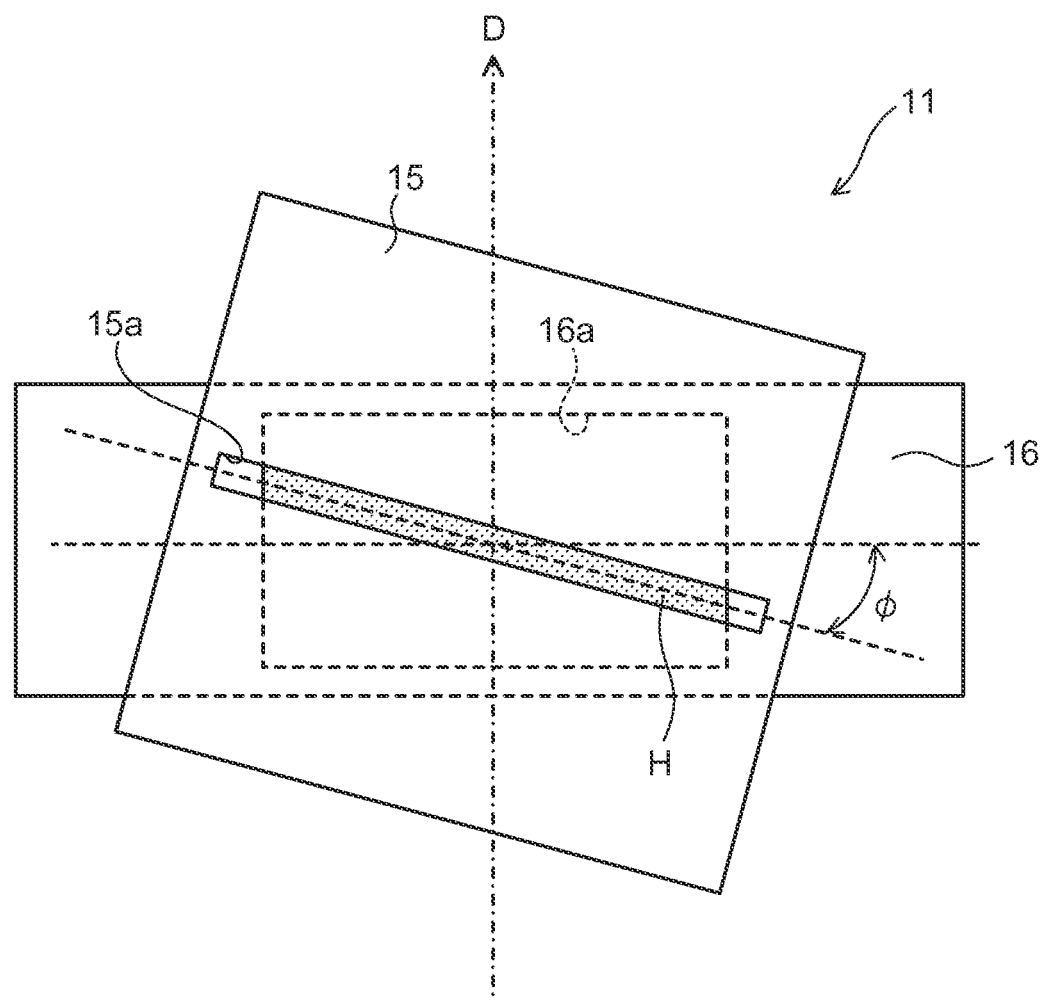
FIG. 23 is a plan view showing still another configuration of the above heating portion in a state where the intersection angle of the heating region equals 15°.

FIG. 23 is a plan view showing still another configuration of the heating portion 11. The heating portion 11 has, in place of the above-described punched plate nozzle 14, a slit nozzle 16. That is, the heating portion 11 may be configured to have a slit nozzle 16 in combination with the above-described wind shield plate 15. The slit nozzle 16 is a nozzle that has a rectangular blowout hole 16a as a single slit and that through the rectangular blowout hole 16a blows out hot air. When a slit nozzle 16 like this is used, the wind shield plate 15 is provided on the rectangular blowout hole 16a side of the slit nozzle 16, and serves to shield part of the hot air blown out through the rectangular blowout hole 16a in a region other than the opening 15a formed to extend in one direction.

That is, in this configuration, of the hot air blown out through the rectangular blowout hole 16a in the slit nozzle 16, only the part that passes through the opening 15a of the wind shield plate 15 strikes and heats the film F. Thus, the overlap region between the region where the rectangular blowout hole 16a of the slit nozzle 16 is formed and the region where the opening 15a of the wind shield plate 15 is formed constitutes the heating region H for heating the film F. Accordingly, also in this case, by arranging the wind shield plate 15 such that the above-mentioned one direction in which the opening 15a extends runs along a direction intersecting the transport direction of the film F at the intersection angle $\phi$, it is possible to realize a heating region H that extends in the intersection direction. Incidentally, FIG. 23 shows a case where the intersection angle $\phi$ of the heating region H equals 15°.

Figure 24:
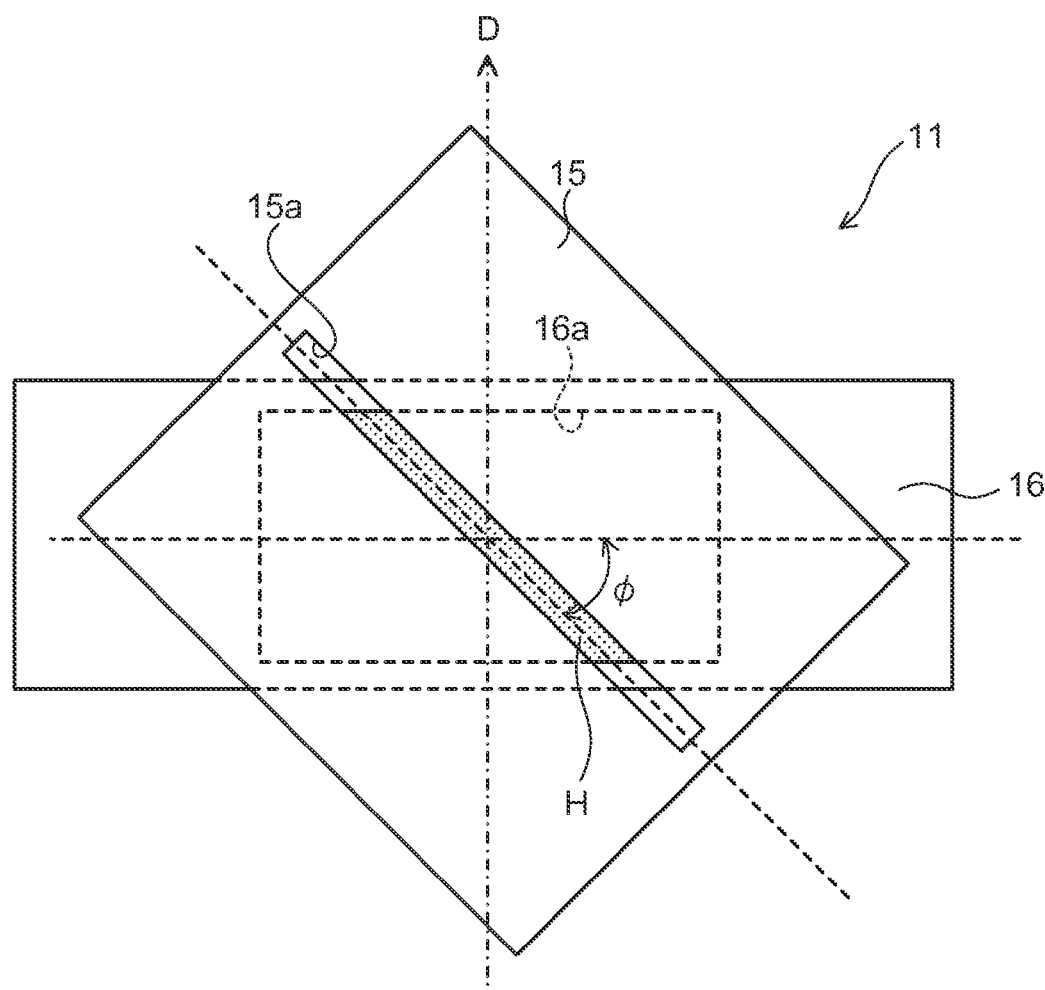
FIG. 24 is a plan view showing the heating portion in FIG. 23 in a state where the intersection angle of the heating region equals 45°.

FIG. 24 shows a state where, with the adjustment mechanism 21 described above, the wind shield plate 15 has been rotated such that the intersection angle $\phi$ of the heating region H equals 45°. In this way, also with a configuration using a slit nozzle 16 and a wind shield plate 15, it is possible to adjust the intersection angle $\phi$ of the heating region H by rotating the wind shield plate 15 with the adjustment mechanism 21 according to the orientation direction of the film F.

Figure 25:
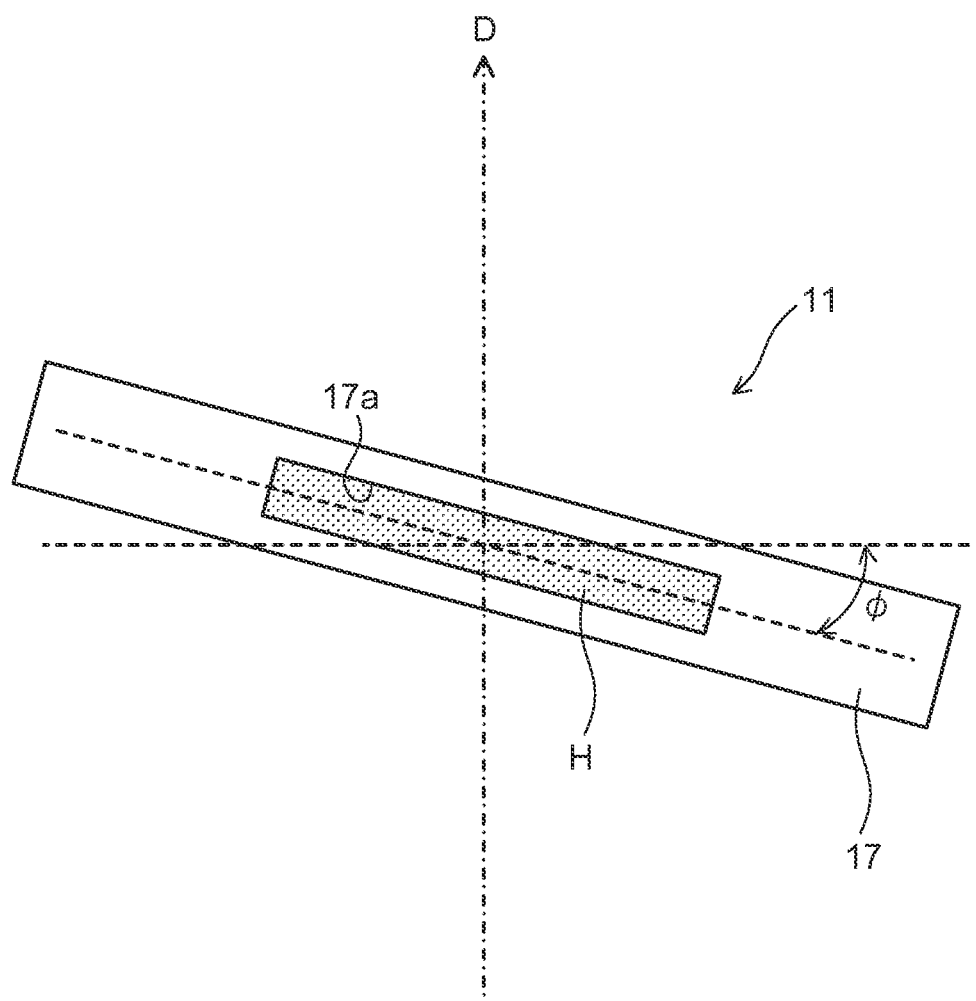
FIG. 25 is a plan view showing still another configuration of the above heating portion in a state where the intersection angle of the heating region equals 15°.

FIG. 25 is a plan view showing a further configuration of the heating portion 11. The heating portion 11 may be composed of a single slit nozzle 17. The slit nozzle 17 has as the heating region H a rectangular slit 17a extending in one direction, and heats the film F by blowing out hot air through the slit 17a. The slit nozzle 17 may be provided under the transported film F so as to heat the film F by blowing out hot air upward from beneath, or may be provided over the transported film F so as to heat the film F by blowing out hot air downward from above. In a case where a slit nozzle 17 is used as the heating portion 11, by arranging the slit nozzle 17 such that the above-mentioned one direction in which the slit 17a extends runs along a direction intersecting the transport direction of the film F at the intersection angle φ, it is possible to realize a heating region H that extends in the intersection direction. Incidentally, FIG. 25 shows a case where the intersection angle of the heating region H equals 15°.

The intersection angle φ of the heating region H can be adjusted by rotating the slit nozzle 17 in a plane parallel to the film F with the adjustment mechanism 21. To enable the adjustment mechanism 21 to rotate the slit nozzle 17, the adjustment mechanism 21 is configured, for example, as described below.

Figure 26:
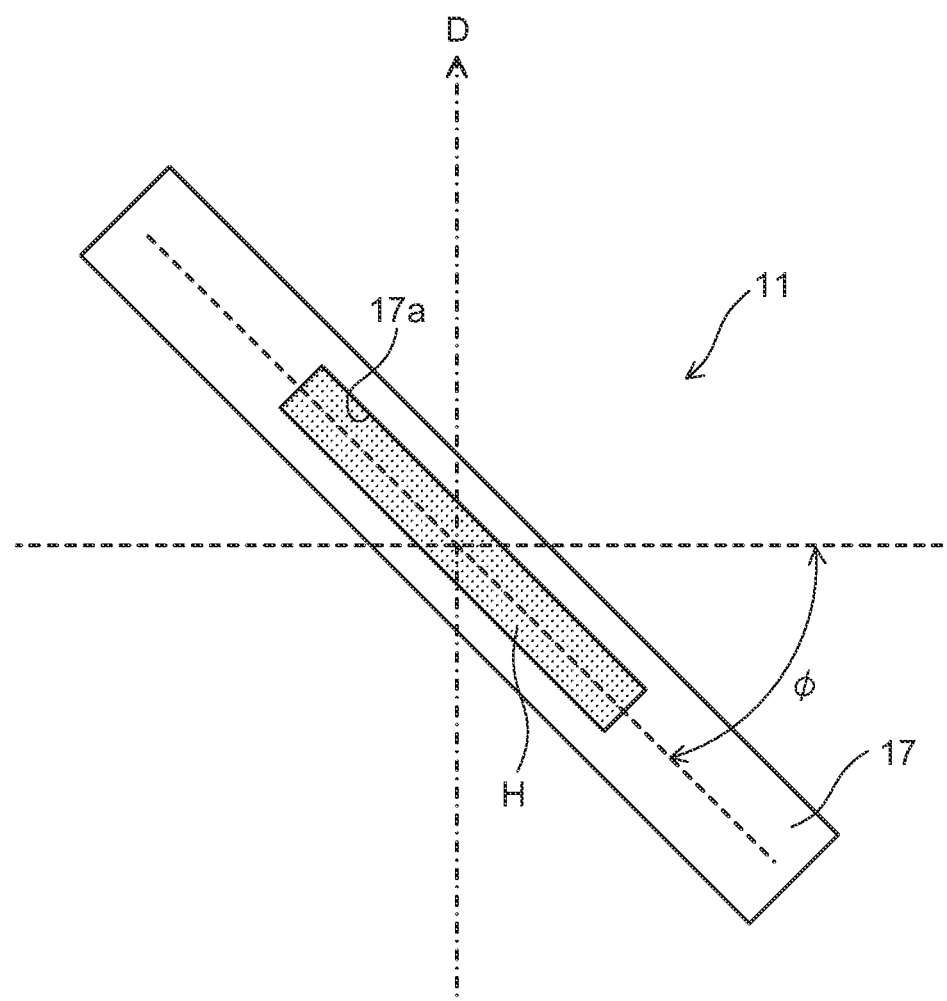
FIG. 26 is a plan view showing the heating portion in FIG. 25 in a state where the intersection angle of the heating region equals 45°.

In the adjustment mechanism 21 shown in FIG. 8, the slit nozzle 17 is, in a region other than the slit 17a, supported on the bottom face of at least one support member 22. Here, so that hot air can be blown out upward from beneath through the slit 17a, the slit nozzle 17 is supported on the bottom face of the support member 22. The suspension elements 23 at both sides of the support member 22 are located outward of the transported film F in the width direction, and the support member 22 is suspended from the support element 24 via the suspension elements 23 such that the support member 22 and the slit nozzle 17 are located under the transported film F With the adjustment mechanism 21 configured as described above, in a fashion coordinated with the movement of the partition wall 41, the slit nozzle 17 can be rotated in a plane parallel to the film F. For example, in a case where the orientation angle of the film F equals 45°, the slit nozzle 17 can be rotated such that the intersection angle φ equals 45° as shown in FIG. 26. In this way, also with a configuration using a slit nozzle 17 as the heating portion 11, it is possible to adjust the intersection angle φ of the heating region H by rotating the slit nozzle 17 according to the orientation angle of the film F.

Although this embodiment deals with an example where the heating portion 11 is provided in the heat-fixing zone Z3 in the stretching portion 5, it may instead be provided in the stretching zone Z2, or may be provided in both of the two zones. That is, the heating portion 11 can be provided in, out of the plurality of zones constituting the heating zone Z, at least one of the stretching zone Z2 and any zone located on the downstream side thereof with respect to the transport direction of the film F.

PRACTICAL EXAMPLES

Hereinafter, in connection with the production of a stretched film according to the embodiment, practical examples will be described specifically along with comparative examples. The practical examples presented below are in no way meant to limit the present invention. In the practical examples described below, first a thermoplastic resin film was formed, and then the thermoplastic resin film was stretched by the stretching portion 5 shown in FIG. 4 to produce an obliquely stretched optical film. In the following description, the notations "part(s)" and "%" mean "part(s) by mass" and "% by mass" respectively unless otherwise indicated.

Practical Example 1-1

Production Method of a Cycloolefin Film

In a nitrogen atmosphere, 500 parts of dehydrated cyclohexane was mixed with 1.2 parts of 1-hexene, 0.15 parts of dibutylether, and 0.30 parts of triisobutylaluminum in a reactor vessel at room temperature. Then, while the mixture was kept at 45° C., a norbornene monomer mixture composed of 20 parts of tricyclo[4.3.0.1 2,5]deca-3,7-diene (dicyclopentadiene, hereinafter abbreviated to DCP), 140 parts of 1,4-methano-1,4,4a,9a-tetrahydrofluorene (hereinafter abbreviated to MTF), and 40 parts of 8-methyl-tetracyclo[4.4.0.1 2, 5.1 7,10]-dodeca-3-ene (hereinafter abbreviated to MTD) as well as 40 parts of tungsten hexachloride (a 0.7% solution in toluene) were added to the solution continuously for two hours to achieve polymerization. To the polymerized solution, 1.06 parts of butyl glycidyl ether and 0.52 parts of isopropyl alcohol were added to inactivate the polymerization catalyst and stop the polymerization reaction.

Next, to 100 parts of the obtained reaction solution containing an open-ring polymer, 270 parts of cyclohexane was added, and moreover, as a hydrogenation catalyst, 5 parts of nickel-alumina catalyst (manufactured by Nikki Chemicals Co.) was added. Then, under application of a pressure of 5 MPa with hydrogen accompanied by stirring, the mixture was heated up to 200° C. and subjected to a reaction for four hours to obtain a reaction solution containing 20% of a hydrogenated polymer of DCP/MTF/MTD open ring polymers. After removal of the hydrogenation catalyst by filtration, a soft polymer (SEPTON 2002 manufactured by Kuraray Co., Ltd.) and an antioxidant (IRGANOX 1010 manufactured by Ciba Specialty Chemicals plc.) were added to and dissolved in the obtained solution (0.1 parts of each in 100 parts of the polymer).

Next, cyclohexane as the solvent and other volatile components were removed from the solution by use of a cylindrical concentration dryer (manufactured by Hitachi Ltd.), and the hydrogenated polymer in a melted state was extruded from an extruder in the form of a strand, and was, after cooling, pelletized and collected. The copolymerization ratio of the respective norbornene monomers in the polymer was calculated based on the composition of the residual norbornene species in the solution after polymerization (by gas chromatography), and the result, DCP/MTF/MTD=10/70/20, was approximately equal to the charged composition. The obtained hydrogenated polymer of open-ring polymers had a weight-average molecular weight (Mw) of 31,000, a molecular weight distribution (Mw/Mn) of 2.5, a hydrogenation ratio of 99.9%, and a Tg of 134° C.

The obtained pellets of the hydrogenated polymer of open-ring polymers were dried for two hours at 70° C. by use of a hot wind drier through which air was circulated, to remove moisture. Next, the pellets were subjected to melt extrusion molding on a single-axis extruder (manufactured by Mitsubishi Heavy Industry Co., Ltd., with a screw diameter of 90 mm, with a T die rip part formed of tungsten carbide, and with a release strength of 44 N with respect to the melted resin) having a coat hunger-type T die to prepare a cycloolefin polymer film with a thickness of 75 μm. Extrusion molding was performed in a clean room of class 10,000 or less, under the molding conditions of a melted resin temperature of 240° C. and a T-die temperature of 240° C., so as to obtain a long unstretched film A with a width of 1000 mm. The unstretched film A was wound up into a roll.

The unstretched film A of the norbornene resin obtained as described above was stretched, by the stretching portion 5 (see FIG. 4 etc.) of the production system 1 according to the embodiment, in the following manner to obtain a stretched film A'. Here, in the stretching portion 5 shown in FIG. 4, the angle θi between the dispensing direction D1 and the winding direction D2 of the film was 48°.

First, in the upstream-side vicinity of the heating zone Z, both ends of the unstretched film A dispensed from the film dispensing portion 2 were held with a first clip as the advanced-side holding member Ci and a second clip as the delayed-side holding member Co. The holding of the unstretched film A was achieved by moving clip levers of the first and second clips with a clip closer. And the clip-holding was done such that both ends of the unstretched film A were simultaneously held by the first and second clips, and that the line connecting the held positions at both ends was parallel to an axis parallel to the width direction of the film.

Next, the held unstretched film A was, in the state held by the first and second clips, transported, and was meanwhile heated by being passed through the preheating zone Z1, the stretching zone Z2, and the heat-fixing zone Z3 in the heating zone Z, and thus a stretched film A' stretched in a direction oblique to (in a direction at 45° relative to) the width direction was obtained.

The film movement speed during heating and stretching was 30 m/minute. The temperatures in the preheating zone Z1, the stretching zone Z2, and the heat-fixing zone Z3 were 140° C., 140° C., and 137° C. respectively. The stretching factor of the film before and after stretching was 2.0, so that the film after stretching had a thickness of 52 µm and a width of 2000 mm.

In the heat-fixing zone Z3, as the heating portion 11, the slit nozzle 17 shown in FIGS. 25 and 26 was arranged, and the stretched film A' was heated in its vicinity. Here, the partition wall 41 was rotated so as to be substantially parallel to the orientation direction (at an orientation angle of 45°) of the stretched film A', and in addition, in a fashion coordinated with such rotation of the partition wall 41, the intersection angle φ of the heating region H of the heating portion 11 was adjusted by the adjustment mechanism 21 such that the orientation direction of the stretched film A' was substantially parallel to the intersection direction of the heating region H relative to the transport direction D.

Next, both ends of the obtained stretched film A' were trimmed off, so that the film eventually had a width of 1500 mm. The average value of the in-plane retardation Ro was 140 nm, and the average value of the orientation angle θ was 45°.

The cycloolefin polymer film described above is also called a COP film.

[Fabrication of a Circular Polarizing Plate]

A film of polyvinyl alcohol with a thickness of 120 µm was subjected to single-axis stretching (at a temperature of 110° C., at a stretching factor of 5), was then immersed in a water solution containing 0.075 g of iodine, 5 g of potassium iodide, and 100 g of water for 60 seconds, and was subsequently immersed in a water solution containing 6 g of potassium iodide, 7.5 g of boric acid, and 100 g of water at 68° C. After immersion, the film was cleaned with water and dried to obtain a polarizer.

Subsequently, the stretched film (λ/4 phase-difference film) prepared by the previously described method was bonded to one side of the above polarizer, by use of a 5% water solution of polyvinyl alcohol as an adhesive. The bonding was done such that the transmission axis of the polarizer and the slow axis of the λ/4 phase-difference film were so oriented as to form an angle of 45°. In a similar manner, an alkali-saponified Konica Minolta TAC film KC6UA (manufactured by Konica Minolta Opto, Inc.) was bonded to the other side of the polarizer, and thus a circular polarizing plate was prepared.

[Fabrication of an Organic EL Image Display Device]

On a glass substrate, by sputtering, a film of chromium with a thickness of 80 nm was formed as a reflective electrode. Next, on the reflective electrode, as an anode, a film of ITO (indium tin oxide) was formed by sputtering with a thickness of 40 nm. Subsequently, on the anode, as a hole transport layer, a film of poly(3,4-ethylenedioxythiophene)-polystyrenesulfonate (PEDOT:PSS) was formed with a thickness of 80 nm by sputtering. Thereafter, on the hole transport layer, by use of a shadow mask, light emission layers of R, G, and B were formed each with a thickness of 100 nm.

For the red light emission layer, tris(8-hydroxyquinolinato)aluminum ($Alq_3$) as a host and the luminescent compound [4-(dicyanomethylene)-2-methyl-6(p-dimethylaminostyryl)-4H-pyran] (DCM) were co-deposited (in a ratio of 99:1 by mass) into a film with a thickness of 100 nm. For the green light emission layer, $Alq_3$ as a host and the luminescent compound coumarin 6 were co-deposited (in a ratio of 99:1 by mass) into a film with a thickness of 100 nm. For the blue light emission layer, BAlq expressed by the structural formula below as a host and the luminescent compound perylene were co-deposited (in a ratio of 90:10 by mass) into a film with a thickness of 100 nm.

[Chemical Formula 6]

BAlq

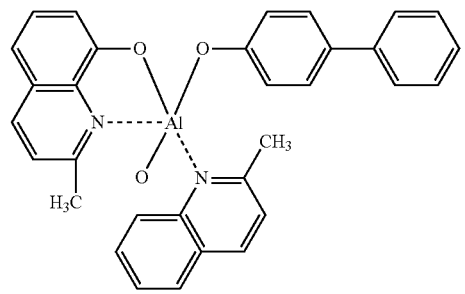

Further on the light emission layers, as a first cathode having so low a work function as to allow efficient injection of electrons, a film of calcium was formed with a thickness of 4 nm. Thereafter, on the first cathode, as a second cathode, a film of aluminum was formed with a thickness of 2 nm. Here, the aluminum as the second cathode serves to prevent chemical alteration of the calcium as the first cathode when a film to serve as a transparent electrode is formed further on top by sputtering. Thus, an organic light emission layer was obtained.

Next, on the cathode, by sputtering, a transparent electrically conductive film was formed with a thickness of 80 nm. Here, for the transparent electrically conductive film, ITO was used. Further on the transparent electrically conductive film, by CVD (chemical vapor deposition), a film of boron nitride was formed with a thickness of 200 nm as an insulating film. Thus, an organic EL element was fabricated. The organic EL element fabricated as described above had a size of 1296 mm×784 mm.

On the insulating film of the organic EL element fabricated as described above, the circular polarizing plate fabricated as described previously was fixed with an adhesive with the surface of the λ/4 phase-difference film facing the insulating film of the organic EL element. Thus, an organic EL image display device was fabricated.

Practical Example 1-2

In Practical Example 1-2, the angle θi between the dispensing direction D1 and the winding direction D2 of the film was changed such that the stretching direction of the film was at 15° relative to the width direction (an orientation angle of 15°). Otherwise, Practical Example 1-2 was the same as Practical Example 1-1.

Practical Example 2-1

In Practical Example 2-1, as the heating portion 11 arranged in the heat-fixing zone Z3, the halogen lamps 12 shown in FIG. 6 were used to heat the stretched film A' (with an orientation angle of 45°) in its vicinity. Otherwise, Practical Example 2-1 was the same as Practical Example 1-1.

Practical Example 2-2

In Practical Example 2-2, the angle θi between the dispensing direction D1 and the winding direction D2 of the film was changed such that the stretching direction of the film was at 15° relative to the width direction (an orientation angle of 15°). Otherwise, Practical Example 2-2 was the same as Practical Example 2-1.

Comparative Example 1-1

In Comparative Example 1-1, no heating portion 11 was arranged in the heat-fixing zone Z3, and no heating of the stretched film A' (with an orientation angle of 45°) by a heating portion 11 was performed. Otherwise, Comparative Example 1-1 was the same as Practical Example 1-1.

Comparative Example 1-2

In Comparative Example 1-2, the angle θi between the dispensing direction D1 and the winding direction D2 of the film was changed such that the stretching direction of the film was at 15° relative to the width direction (an orientation angle of 15°). Otherwise, Comparative Example 1-2 was the same as Comparative Example 1-1.

<Method of Evaluating Variation in the Orientation Angle>

Long stretched films (COP films) prepared in similar manners as Practical Examples 1-1 to 2-2 and Comparative Examples 1-1 to 1-2 were, while the film width of the just prepared film is maintained in the width direction, each cut into a film strip measuring 10 cm in the length direction. The film strip was left standing in a room of 23° C., 55% RH for 24 hours; thereafter, on a phase-difference tester (KOBRA-WXK manufactured by Oji Scientific Instruments), the orientation angle was measured at intervals of 50 mm in the width direction of the long stretched film, and the difference between the maximum and minimum values was taken as the variation (°) in the orientation angle.

<Method of Evaluating Variation in the In-Plane Retardation>

Long stretched films (COP films) prepared in similar manners as Practical Examples 1-1 to 2-2 and Comparative Examples 1-1 to 1-2 were, while the film width of the just prepared film is maintained in the width direction, each cut into a film strip measuring 10 cm in the length direction. The film strip was left standing in a room of 23° C., 55% RH for 24 hours; thereafter, on a phase-difference tester (KOBRA-WXK manufactured by Oji Scientific Instruments), the in-plane retardation Ro was measured at intervals of 50 mm in the width direction of the long stretched film, and the difference between the maximum and minimum values was taken as the variation (nm) in the in-plane retardation Ro.

<Method of Evaluating Unevenness in the Amount of Reflected Light>

The organic EL image display device fabricated as described above was placed under the sun light, and unevenness in the amount of reflected light over the entire display area during display of black was visually evaluated. Table 1 shows the results of evaluation of the amount of reflected light with Practical Examples 1-1 and 2-1 and Comparative Example 1-1, along with optical values (orientation angle and in-plane retardation) observed in Practical Examples 1-1 to 2-2 and Comparative Examples 1-1 to 1-2. No evaluation of the amount of reflected light was done with Practical Examples 1-2 and 2-2 and Comparative Example 1-2, because a polarizing plate fabricated by a roll-to-roll method does not function as a circular polarizing plate on its own (due to the orientation angle being 15° relative to the width direction).

TABLE 1

|  | Practical Example 1-1 | Practical Example 1-2 | Practical Example 2-1 | Practical Example 2-2 | Comparative Example 1-1 | Comparative Example 1-2 |
| --- | --- | --- | --- | --- | --- | --- |
| Orientation Angle (°) | 45 | 15 | 45 | 15 | 45 | 15 |
| Change in Partition Angle | Yes | Yes | Yes | Yes | Yes | Yes |
| Heating in Film's Vicinity | Yes (Hot Air) | Yes (Hot Air) | Yes (Electromagnetic Waves) | Yes (Electromagnetic Waves) | | |
| Variable Heating Region | Yes | Yes | Yes | Yes | | |
| Variation in Orientation Angle (°) | 0.3 | 0.3 | 0.1 | 0.1 | 1.3 | 1.0 |
| Variation in In-Plane Retardation (nm) | 2 | 2 | 1 | 1 | 3 | 3 |

TABLE 1-continued

| | Practical Example 1-1 | Practical Example 1-2 | Practical Example 2-1 | Practical Example 2-2 | Comparative Example 1-1 | Comparative Example 1-2 |
|---|---|---|---|---|---|---|
| Uneven Reflected Light | FAIR | — | GOOD | — | BAD | — |

The criteria for evaluation of the amount of reflected light by visual check were as follows:

GOOD: on viewing the fabricated organic EL image display device, 10% or less of people perceived unevenness in the amount of reflected light from place to place;

FAIR: on viewing the fabricated organic EL image display device, more than 10% but not more than 20% of people perceived unevenness in the amount of reflected light from place to place;

POOR: on viewing the fabricated organic EL image display device, more than 20% but not more than 50% of people perceived unevenness in the amount of reflected light from place to place; and BAD: on viewing the fabricated organic EL image display device, more than 50% of people perceived unevenness in the amount of reflected light from place to place.

The results in Table 1 reveal the following. When the vicinity of the film F was heated substantially parallel to the orientation direction by the heating portion 11 as in Practical Examples 1-1 to 2-2, irrespective of whether the orientation direction of the film equaled 15° or 45°, variation in the orientation angle in the width direction of the film was as small as 0.3° or less, and variation in the in-plane retardation Ro was as small as 2 nm or less, that is, variations in optical values were suppressed. Consequently, it is also revealed, in Practical Examples 1-1 and 2-1, unevenness in the amount of reflected light during display of black was suppressed as compared with Comparative Example 1-1, where no heating by a heating portion 11 was performed.

In the Practical Examples and Comparative Examples presented above, the transport speed of the film in the oblique stretching step was 30 m/minute. In a case where the transport speed of the film is comparatively high, as in the range from 15 m/minute to 150 m/minute, unevenness in temperature tends to occur in the vicinity of the film resulting from the air in an upstream-side zone being drawn into a downstream-side zone as the film is transported. Thus, the configuration of this embodiment, which can suppress variations in optical values resulting from unevenness in temperature, is extremely effective when the film is transported at a speed in the above-mentioned range.

As to unevenness in the amount of reflected light in an organic EL image display device using a cellulose film, the cellulose film was prepared through the process described below; then, under similar conditions as in Practical Examples 1-1 to 2-2 and Comparative Examples 1-1 to 1-2, a stretched film, a circular polarizing plate and an organic EL image display device were fabricated, and unevenness in the amount of reflected light was evaluated. The results were similar to those shown in Table 1 obtained by use of a COP film

[Method for Production of Cellulose Ester Film]
<Fine Particle-Dispersed Liquid>

| Fine Particles (Aerosil R927V manufactured by Nippon Aerosil Co., Ltd.) | 11 parts by mass |
|---|---|
| Ethanol | 89 parts by mass |

These were stirred and mixed in a dissolver for 50 minutes, and then dispersion was performed by a Munton Gorlin process.

<Fine Particle-Containing Liquid>

Based on the composition shown below, the above fine particle-dispersed liquid was added slowly into a dissolution tank containing methylene chloride under sufficient stirring. Then, dispersion was performed with an attritor such that the secondary particles had a predetermined size. The product was filtered with a FINEMET NF manufactured by Nippon Seisen Co., Ltd., and thus a fine particle-containing liquid was prepared.

| Methylene chloride | 99 parts by mass |
|---|---|
| Fine particle-dispersed liquid 1 | 5 parts by mass |

<Main Dope Liquid>

A main dope liquid of the composition shown below was prepared. Specifically, first, methylene chloride and ethanol were added into a pressurized dissolution tank. Then, cellulose acetate was added into the pressurized dissolution tank containing the solvent under stirring. The solution was heated, stirred to complete dissolution, and filtered by use of Azumi filter paper No. 244 manufactured by Azumi Filter Paper Co., Ltd., and thus the main dope liquid was prepared. As a sugar ester compound and an ester compound, those synthesized according to an example of synthesis noted below were used. As compound (B), one noted below was used.

(Composition of Main Dope Liquid)

| Methylene chloride | 340 parts by mass |
|---|---|
| Ethanol | 64 parts by mass |
| Cellulose acetate propionate (with degrees of substitution by acetyl group 1.39 and by propionyl group 0.50, the total degree of substitution 1.89) | 100 parts by mass |
| Compound (B) | 5.0 parts by mass |
| Sugar ester compound | 5.0 parts by mass |
| Ester compound | 2.5 parts by mass |
| Fine Particle-Containing Liquid 1 | 1 parts by mass |

[Chemical Formula 7]

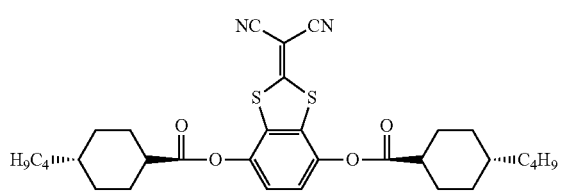

(B)

(Synthesis of Sugar Ester Compound)

A sugar ester compound was synthesized through the following process.

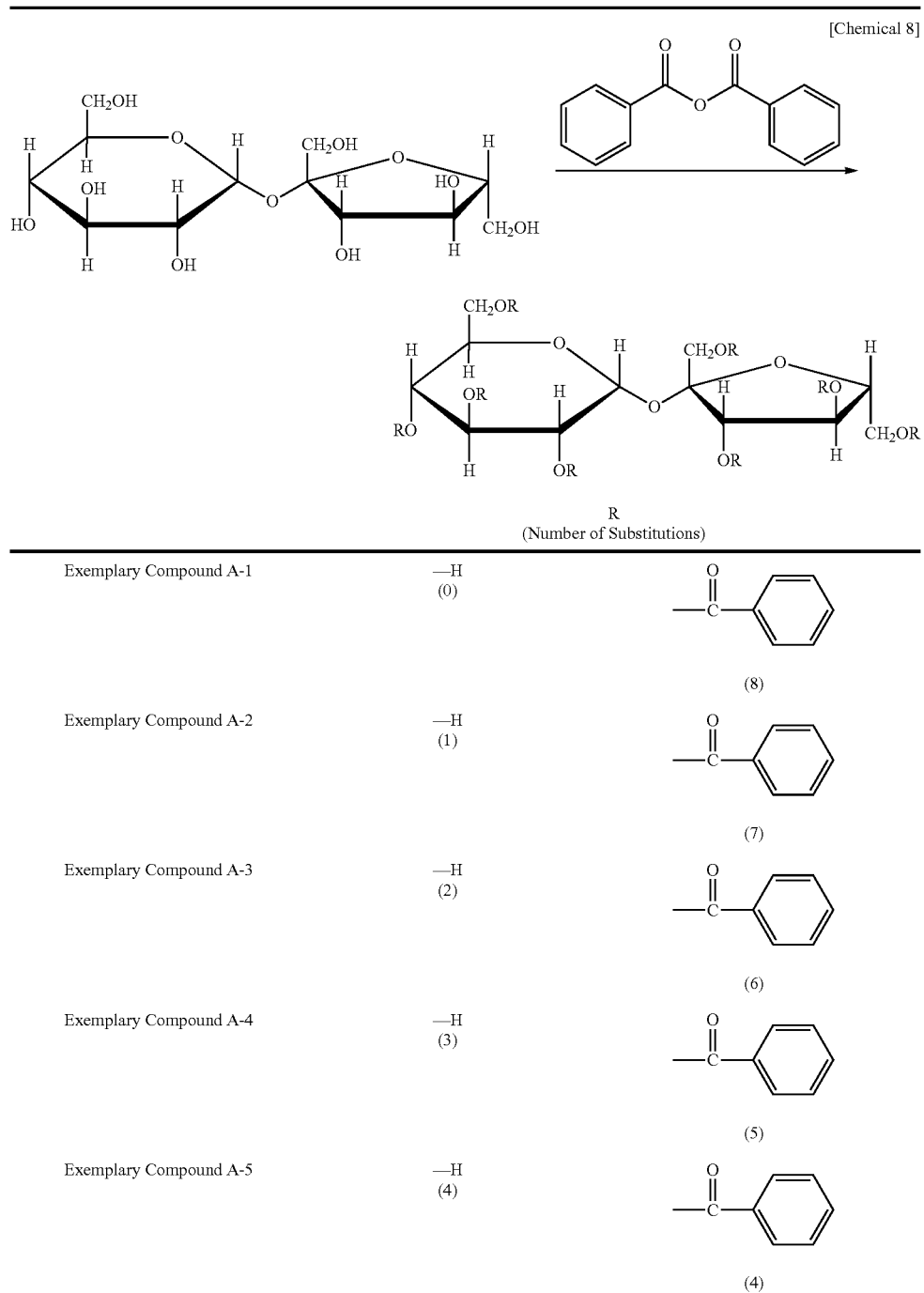

A four-necked flask provided with a stirring device, a reflux condenser, a thermometer, and a nitrogen gas introduction pipe was charged with 34.2 g (0.1 mol) of sucrose, 180.8 g (0.6 mol) of benzoic anhydride, and 379.7 g (4.8 mol) of pyridine. Under stirring, with nitrogen gas bubbling from the nitrogen gas introduction pipe, temperature was raised, and an esterification reaction was performed for five hours at 70° C.

Next, the interior of the flask was depressurized down to $4 \times 10^2$ Pa or less, and excess pyridine was distilled away at 60° C.; then the interior of the flask was depressurized down to $1.3 \times 10$ Pa or less and heated up to 120° C., and the greater part of the benzoic anhydride and of the benzoic acid produced was distilled away.

Lastly, 100 g of water was added to the isolated toluene layer, which was then washed with the water for 30 minutes at room temperature; then the toluene layer was isolated, and the toluene was distilled away under reduced pressure ($4 \times 10^2$ Pa or less), at 60° C. Thus, a mixture of compounds A-1, A-2, A-3, A-4, and A-5 (sugar ester compounds) were obtained.

The obtained mixture was analyzed by HPLC and LC-MASS, and it was found that the content of A-1 was 1.3% by mass, the content of A-2 was 13.4% by mass, the content of A-3 was 13.1% by mass, the content of A-4 was 31.7% by mass, and the content of A-5 was 40.5% by mass. The average degree of substitution was 5.5.

(Measurement Conditions for HPLC-MS)
1) LC Part
Equipment: a column oven (JASCO CO-965), a detector (JASCO UV-970-240 nm), a pump (JASCO PU-980), a degasser (JASCO DG-980-50), all manufactured by JASCO Corporation.
Column: Inertsil ODS-3, particle diameter 5 μm, 4.6×250 mm (manufactured by GL Sciences Inc.)
Column Temperature: 40° C.
Flow Rate: 1 ml/minute
Movement Phase: TFH (1% acetic acid):$H_2O$ (50:50)
Injected Volume: 3 μl
2) MS Part
Equipment: an LCQ DECA (manufactured by Thermo Quest Inc.)
Ionization Method: Electrospray Ionization (ESI)
Spray Voltage: 5 kV
Capillary Temperature: 180° C.
Vaporizer Temperature: 450° C.
(Synthesis of Ester Compounds)
An ester compound was synthesized through the following process.

A 2 L four-necked flask provided with a thermometer, a stirrer, and a bulb condenser was charged with 251 g of 1,2-propylene glycol, 278 g of phthalic anhydride, 91 g of adipic acid, 610 g of benzoic acid, and 0.191 g of tetraisopropyl titanate as an esterization catalyst, and the mixture was heated gradually under stirring in a stream of gaseous nitrogen until the temperature reached 230° C. A dehydration condensation reaction was performed for 15 hours, and after the completion of the reaction, unreacted 1,2-propylene glycol was distilled away at 200° C. under reduced pressure. Thus, an ester compound was obtained. The ester compound had an ester of benzoic acid at an end of a polyester chain formed by condensation of 1,2-propylene glycol, phthalic anhydride, and adipic acid. The ester compound had an acid number of 0.10 and a number average molecular weight of 450.

(Flow Casting of the Dope Liquid)
The above composition was put in a sealed container and was dissolved under stirring to prepare the dope liquid. Next, on an endless belt flow casting machine, the above dope liquid was evenly flow-cast with a width of 1000 mm on a stainless steel belt support member. On the stainless steel belt support member, the solvent was evaporated until the residual amount of solvent in the flow-cast film was 75%, and then the film was released from the stainless steel belt support member.

The released cellulose ester film was stretched by a factor of 1.1 in the width direction on a lateral-stretching tenter. The temperature conditions in the lateral-stretching tenter oven at that time were adjusted as follows: 160° C. in the pre-heating zone, 165° C. in the stretching zone, 172° C. in the holding zone, and 110° C. in the cooling zone.

Next, both end portions of the film where marks of the tenter clips are left are trimmed off; then at a drying temperature of 130° C., the long film was transported through the drying zone by use of a large number of rolls to complete drying, and was then wound into a roll in the winding step. In this way, a roll of long film (a full-width long film roll) with a dried film thickness of 75 μm was obtained.

The long film of cellulose resin obtained as described above was obliquely stretched by use of the stretching portion 5 shown in FIG. 4, and thus a long stretched film was obtained. Here, the long stretched film was produced under the same conditions as those for the production of the previously described cycloolefin film except that the film movement speed was 30 m/minute, the temperature in the preheating zone Z1 was 187° C., the temperature in the stretching zone Z2 was 185° C., the temperature in the heat-fixing zone Z3 was 170° C., the stretching factor was 2.0 so that the thickness was 52 μm and that the final film width after trimming was 1500 mm.

INDUSTRIAL APPLICABILITY

The present invention is useful in the production of a long obliquely stretched film applied to a circular polarizing plate for external light reflection prevention in an organic EL image display device.

LIST OF REFERENCE SIGNS 1 production system
2 film dispensing portion
5 stretching portion
11 heating portion
12 lamp heater
13 panel heater
13a side edge
14 punched plate nozzle
14a blowout hole
15 wind shield plate
15a opening
16 slit nozzle
16a blowout hole
17 slit nozzle
17a slit
21 adjustment mechanism
41 partition wall
Ci holding member
Co holding member
H heating region
Z heating zone
Z2 stretching zone
Z3 heat-fixing zone
φ intersection angle

The invention claimed is:
1. A method for production of a stretched film, involving stretching a film in a direction oblique to a width direction in a stretching zone included in a plurality of zones arranged in a film transport direction where temperature control is performed to heat or cool the film,
the method comprising:
a heating step of heating the film by a heating portion having a heating region, the heating region being located in at least one of the stretching zone and any zone located on a downstream side thereof with respect to a transport direction so as
to face the film being transported and in addition
to extend along a direction intersecting the transport direction at an intersection angle φ in a plane of the film; and
an adjusting step of adjusting the intersection angle φ of the heating region according to an orientation direction of the film stretched in the stretching zone.
2. The method according to claim 1,
wherein, in the adjusting step, the intersection angle φ of the heating region is adjusted such that the orientation direction of the stretched film is substantially parallel to the intersection direction of the heating region with respect to the film transport direction.
3. The method according to claim 1,
wherein, in the adjusting step, the intersection angle φ of the heating region is adjusted in a fashion coordinated with movement, in accordance with the orientation direction of the stretched film, of a partition wall having a gap through which the film can pass and provided between the zone where the heating portion is arranged and a zone on an upstream side of said zone.

4. The method according to claim 3, wherein the partition wall moves substantially parallel to the orientation direction of the stretched film.

5. The method according to claim 1, wherein, in the stretching zone, both end portions of the film in the width direction are held by respective holding members, the film is transported while the holding members are moved, and the film transport direction is changed meanwhile, so that the film is stretched in the direction oblique to the width direction.

6. The method according to claim 5, wherein, in the stretching zone, the film is obliquely stretched while the film is transported at a speed of 15 m/min. to 150 m/min.

7. The method according to claim 1, wherein the intersection angle $\phi$ of the heating region is measured relative to a width direction of the film in a plane of the film.

8. The method according to claim 1, wherein the heating region of the heating portion is formed by arranging at least one stick-form lamp heater such that a longitudinal direction thereof runs along a direction intersecting the film transport direction at an intersection angle $\phi$, and the adjusting step includes adjusting the intersection angle $\phi$ of the longitudinal direction of the at least one stick-form lamp heater.

9. The method according to claim 1, wherein the heating region of the heating portion is formed by arranging a plurality of stick-form lamp heaters parallel to one another such that a longitudinal direction thereof runs along the film transport direction and in addition that a direction of a line through ends of at least two of the lamp heaters runs along a direction intersecting the film transport direction at an intersection angle $\phi$, and the adjusting step includes adjusting the intersection angle $\phi$ of the longitudinal direction of the at least two of the lamp heaters.

10. The method according to claim 1, wherein the heating region of the heating portion is formed by arranging a panel heater such that a side edge thereof runs along a direction intersecting the film transport direction at an intersection angle $\phi$, and the adjusting step includes adjusting the intersection angle $\phi$ of the side edge of the panel heater.

11. The method according to claim 1, wherein the heating portion comprises:
a punched plate nozzle in which a plurality of blowout holes are formed two-dimensionally to blow out hot air therethrough; and
a wind shield plate having an opening extending in one direction, the wind shield plate being provided on a blowout-hole side of the punched plate nozzle so as to shield, in a region other than the opening, part of the hot air blown out through the plurality of blowout holes, and
wherein the heating region is formed by arranging the wind shield plate such that the one direction in which the opening extends runs along a direction intersecting the film transport direction at an intersection angle $\phi$, and the adjusting step includes adjusting the intersection angle $\phi$ of the one direction in which the opening extends.

12. The method according to claim 1, wherein the heating portion comprises:
a slit nozzle in which a single blowout hole is formed to blow out hot air therethrough; and
a wind shield plate having an opening extending in one direction, the wind shield plate being provided on a blowout-hole side of the slit nozzle so as to shield, in a region other than the opening, part of the hot air blown out through the blowout hole, and
wherein the heating region is formed by arranging the wind shield plate such that the one direction in which the opening extends runs along a direction intersecting the film transport direction at an intersection angle $\phi$, and the adjusting step includes adjusting the intersection angle $\phi$ of the one direction in which the opening extends.

13. The method according to claim 1, wherein the heating portion comprises a slit nozzle having as the heating region a slit extending in one direction so as to heat the film by blowing out hot air through the slit, and
wherein the slit nozzle is arranged such that the one direction in which the slit extends runs along a direction intersecting the film transport direction at an intersection angle $\phi$, and the adjusting step includes adjusting the intersection angle $\phi$ of the one direction in which the slit extends.

* * * * *